US008060925B2

(12) United States Patent
Yoshii et al.

(10) Patent No.: US 8,060,925 B2
(45) Date of Patent: Nov. 15, 2011

(54) PROCESSOR, MEMORY, COMPUTER SYSTEM, AND METHOD OF AUTHENTICATION

(75) Inventors: Kenichiro Yoshii, Tokyo (JP); Tatsunori Kanai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 961 days.

(21) Appl. No.: 11/508,935

(22) Filed: Aug. 24, 2006

(65) Prior Publication Data

US 2007/0050852 A1 Mar. 1, 2007

(30) Foreign Application Priority Data

Sep. 1, 2005 (JP) ................................. 2005-254048

(51) Int. Cl.
*G06F 15/16* (2006.01)

(52) U.S. Cl. .......... 726/11; 713/168; 713/169; 713/170; 713/171; 713/172; 713/173; 713/174; 713/182; 713/183; 713/184; 713/185; 713/186; 726/2; 726/3; 726/4; 726/5; 726/6; 726/7; 726/8; 709/225; 709/229

(58) Field of Classification Search .................. 709/225, 709/229; 713/155–159, 168–174, 182–186; 455/411, 68, 418; 726/2–8, 11
See application file for complete search history.

(56) References Cited

U.S. PATENT DOCUMENTS

| | | | | |
|---|---|---|---|---|
| 5,179,517 | A | * | 1/1993 | Sarbin et al. ...................... 463/25 |
| 5,237,609 | A | * | 8/1993 | Kimura .......................... 713/193 |
| 6,240,517 | B1 | * | 5/2001 | Nishioka ......................... 726/20 |
| 2002/0064074 | A1 | * | 5/2002 | Kamise et al. ................. 365/200 |
| 2003/0056107 | A1 | | 3/2003 | Cammack et al. |
| 2003/0140234 | A1 | * | 7/2003 | Noda et al. ..................... 713/186 |
| 2005/0037736 | A1 | * | 2/2005 | Jung ............................. 455/411 |

FOREIGN PATENT DOCUMENTS

| | | |
|---|---|---|
| JP | 6-332731 | 12/1994 |
| JP | 2001-325580 | 11/2001 |
| JP | 2002-25278 | 1/2002 |
| JP | 2002-236667 | 8/2002 |

(Continued)

OTHER PUBLICATIONS

Notice of Rejection issued by the Japanese Patent Office on Dec. 22, 2009, for Japanese Patent Application No. 2005-254048, and Partial English Translation thereof.
Notice of Rejection, dated Jun. 1, 2010, issued by the Japanese Patent Office in Japanese Patent Application No. 2005-254048 (6 pages).

(Continued)

*Primary Examiner* — Taghi Arani
*Assistant Examiner* — Josnel Jeudy
(74) *Attorney, Agent, or Firm* — Finnegan, Henderson, Farabow, Garrett & Dunner, L.L.P.

(57) ABSTRACT

A processor communicating with a first memory configured to store first information and first data, and communicating with a second memory configured to store second information and second data, includes a computing unit configured to perform computation using the first data and the second data; an storing unit configured integrally with the computing unit to store first authentication information and second authentication information; a reading unit configured to read out the first information and the second information; an authenticating unit configured to authenticate the first memory by comparing the first information and the first authentication information, and to authenticate the second memory by comparing the second information and the second authentication information; and an controlling unit configured to control an access of the computing unit to the first memory and the second memory based on a result of the authentications.

24 Claims, 29 Drawing Sheets

FOREIGN PATENT DOCUMENTS

| | | |
|---|---|---|
| JP | 2003-108257 | 4/2003 |
| JP | 2005-65222 | 3/2005 |
| JP | 2005-157542 | 6/2005 |
| WO | WO 03/058412 A2 | 7/2003 |
| WO | WO2005048111 * | 5/2005 |

OTHER PUBLICATIONS

Kanai, "Processor, Memory, Computer System, System LSI, and Method of Authentication", U.S. Appl. No. 11/350,798, filed Feb. 10, 2006.

* cited by examiner

FIG.2

| MEMORY IDENTIFIER | PROCESSOR AUTHENTICATION INFORMATION STORING POSITION INFORMATION | PROCESSOR AUTHENTICATION INFORMAITON | MEMORY AUTHENTICATION INFORMATION |
|---|---|---|---|
| "MEMORY01" | X | KEY1 | KEY3 |
| "MEMORY02" | Y | KEY2 | KEY4 |

| MEMORY IDENTIFIER | PROCESSOR AUTHENTICATION INFORMATION STORING POSITION INFORMATION | PROCESSOR AUTHENTICATION INFORMATION LENGTH | BUS INFORMATION (DATA WIDTH, CONNECTION INFORMATION) | PROCESSOR AUTHEN-TICATION INFORMATION | MEMORY AUTHEN-TICATION IN-FORMATION LENGTH | MEMORY AUTHEN-TICATION IN-FORMATION |
|---|---|---|---|---|---|---|
| "MEMORY 01" | X | N | (N,N) | KEY1 | N | KEY3 |
| "MEMORY 02" | Y | N | (N,N) | KEY2 | N | KEY4 |

FIG.19

| MEMORY IDENTIFIER | PROCESSOR AUTHENTICATION INFORMATION STORING POSITION INFORMATION | PROCESSOR AUTHEN- TICATION INFORMATION LENGTH | BUS INFORMATION (DATA WIDTH, CONNECTION INFORMATION) | PROCESSOR AUTHEN- TICATION IN- FORMATION | MEMORY AUTHEN- TICATION IN- FORMATION LENGTH | MEMORY AUTHEN- TICATION INFOR- MATION |
|---|---|---|---|---|---|---|
| "MEMORY 01" | X | N | (N/2, UPPER N/2) | KEY1 | N | KEY3 |
| "MEMORY 02" | Y | N | (N/2, LOWER N/2) | KEY2 | N | KEY4 |

FIG.29

| PROCESSOR IDENTIFIER | MEMORY AUTHENTICATION INFORMATION | PROCESSOR AUTHENTICATION INFORMATION |
|---|---|---|
| "PROCESSOR01" | KEY11 | KEY13 |
| "PROCESSOR02" | KEY12 | KEY14 |

PROCESSOR, MEMORY, COMPUTER SYSTEM, AND METHOD OF AUTHENTICATION

CROSS-REFERENCE TO RELATED APPLICATIONS

This application is based upon and claims the benefit of priority from the prior Japanese-Patent Application No. 2005-254048, filed on Sep. 1, 2005; the entire contents of which are incorporated herein by reference.

BACKGROUND OF THE INVENTION

1. Field of the Invention

The present invention relates to a processor, memory, computer system, and method of authentication.

2. Description of the Related Art

Computer is incorporated into various devices such as digital cameras, digital televisions, digital versatile disk (DVD) players, DVD/HDD recorders, game consoles, portable telephones, portable audio players, and controlling units of automotives. The devices or systems incorporating the computer handle data contents that are under copyrights protection, as well as important information such as personal information and charging information.

Illegal act using these devices or systems causes a serious problem; for example, one can illegally alter the device/system to decrypt and illegally copy the contents, run an illegal program to obtain personal information, or falsify charging information.

Conventionally, the device/system is protected from such illegal acts by physical means, for example, a substrate carrying a large scale integration (LSI) chip is covered by resin or the like in the device, or a casing of the device is fabricated in such a manner as to make disassembly difficult. Thus, the alteration of the device/system is made difficult.

According to another conventional technique, a digital signal processor (DSP) reads out boot software from a read only memory (ROM) inside the device to perform authentication based on a device identification code and a manufacturer identification code, and executes booting only when the authentication is successful (see for example, Japanese Patent Application Laid-Open No. 2003-108257).

According to still another conventional technique, secure booting is performed to prevent an execution of an illegally overwritten program code, and an execution of a program code other than authenticated program code is blocked. According to one known method, a security chip called Trusted Platform Module (TPM) is employed for the implementation of secure booting.

The physical solution as described above such as resin-coating or casing reinforcement, however, increases manufacturing cost and tends to be nullified by special processing technique.

On the other hand, technique such as secure booting needs a special hardware module like TPM. In addition, since TPM of each device has a peculiar encryption key which is different from each other, to update an execution program, a newly configured program must be distributed to each device so that the program can be authenticated by a peculiar encryption key of each device. Hence, maintenance cost becomes astronomical.

Still further, though capable of checking the authenticity of a predetermined program at the activation, the secure booting technique has difficulties in detecting the leakage of the program or the hardware alteration.

SUMMARY OF THE INVENTION

According to one aspect of the present invention, a processor communicating with a first memory configured to store first information and first data, and communicating with a second memory configured to store second information and second data, includes a computing unit configured to perform computation using the first data and the second data, a first storing unit configured integrally with the computing unit to store first authentication information and second authentication information, a reading unit configured to read out the first information and the second information, an authenticating unit configured to authenticate the first memory by comparing the first information and the first authentication information, and to authenticate the second memory by comparing the second information and the second authentication information, and a controlling unit configured to control an access of the computing unit to the first memory and the second memory based on a result of the authentications.

According to another aspect of the present invention, a memory communicating with a first processor configured to store first information and a second processor, configured to store second information, includes a memory element configured to store information utilized by the first processor and the second processor, a storing unit configured integrally with the memory element, to store first authentication information and second authentication information, a reading unit configured to read out the first information from the first processor and to read out the second information from the second processor, an authenticating unit configured to authenticate the first processor by comparing the first information and the first authentication information, and to authenticate the second processor by comparing the second information and the second authentication information, a controlling unit configured to control an access from the first processor and the second processor based on a result of authentication by the processor authenticating unit.

According to still another aspect of the present invention, a computer system includes a processor, a first memory configured to store information used by the processor, and a second memory configured to store information used by the processor. The first memory includes a first memory element configured to store the information used by the processor, a first storing unit configured integrally with the first memory element to store first information. The second memory includes a second memory element configured to store the information used by the processor, a second storing unit configured integrally with the second memory element to store second information. The processor includes a computing unit configured to perform computation using the information stored in the first memory element and the second memory element, a third storing unit configured integrally with the computing unit to store first authentication information and to store the second authentication information, a first reading unit configured to read out the first information and the second information, a first authenticating unit configured to authenticate the first memory by comparing the first information and the first authentication information and to authenticate the second memory by comparing the second information and the second authentication information, and a first controlling unit configured to control an access to the first memory and the second memory based on a result of authentication by the memory authenticating unit.

According to still another aspect of the present invention, a computer system includes a first processor, a second processor, and a memory configured to store information used by the first processor and the second processor. The first processor includes a first computing unit configured to perform computation using the information stored in the memory, and a first storing unit configured integrally with the first computing unit to store first information. The second processor includes a second computing unit configured to perform computation using the information stored in the memory, and a second storing unit configured integrally with the second computing unit to store second information. The memory includes a memory element configured to store information used by the first processor and the second processor, a third storing unit configured integrally with the memory element to store first authentication information and the second authentication information, a first reading unit configured to read out the first information and the second information, a first authenticating unit configured to authenticate the first processor by comparing the first information and the first authentication information, and to authenticate the second processor by comparing the second information and the second authentication information, and a first access controlling unit configured to control an access from the first processor and the second processor based on a result of authentication by the processor authenticating unit.

According to still another aspect of the present invention, a method of authentication includes reading out first information from the first non-volatile memory, and second information from the second memory, authenticating the first memory by comparing first authentication information stored in an authentication information storing unit with the first information red out from the first memory, and authenticating the second memory by comparing the second authentication information stored in the authentication information storing unit with the second information red out from the second memory, the authentication information storing unit being configured integrally with a computing unit to store the first authentication information and the second authentication information, the computing unit performing computation using information stored in the first memory and the second memory, and controlling an access to the first and the second memories based on a result of authentication in the authenticating.

According to still another aspect of the present invention, a method of authentication, includes reading out first information for authentication of a first processor from the first processor, and second information for authentication of a second processor from the second processor, authenticating the first processor by comparing the first authentication information stored by an authentication information storing unit with the first information red out from the first processor, and authenticating the second processor by comparing the second authentication information stored by the authentication information storing unit with the second information red out from the second processor, the authentication information storing unit being configured integrally with the memory element to store the first authentication information and the second authentication information, the memory element storing information used by the first processor and the second processor, and controlling an access from the first processor and the second processor based on a result of authentication in the authenticating.

BRIEF DESCRIPTION OF THE DRAWINGS

FIG. 2 is a schematic table of data structure of a processor-side authentication information storage table;

FIG. 8 is a table of data structure of a processor-side authentication information storage table according to the second embodiment;

FIG. 19 is a table of data structure of the processor-side authentication information storage table according to the third embodiment;

FIG. 29 is a schematic diagram of data structure of a memory-side authentication information storage table;

DETAILED DESCRIPTION OF THE INVENTION

Exemplary embodiments of a processor, a memory, a computer system, and a method of authentication according to the present invention will be described in detail below with reference to the accompanying drawings. It should be noted that the present invention is not limited by the embodiments.

Figure 1:
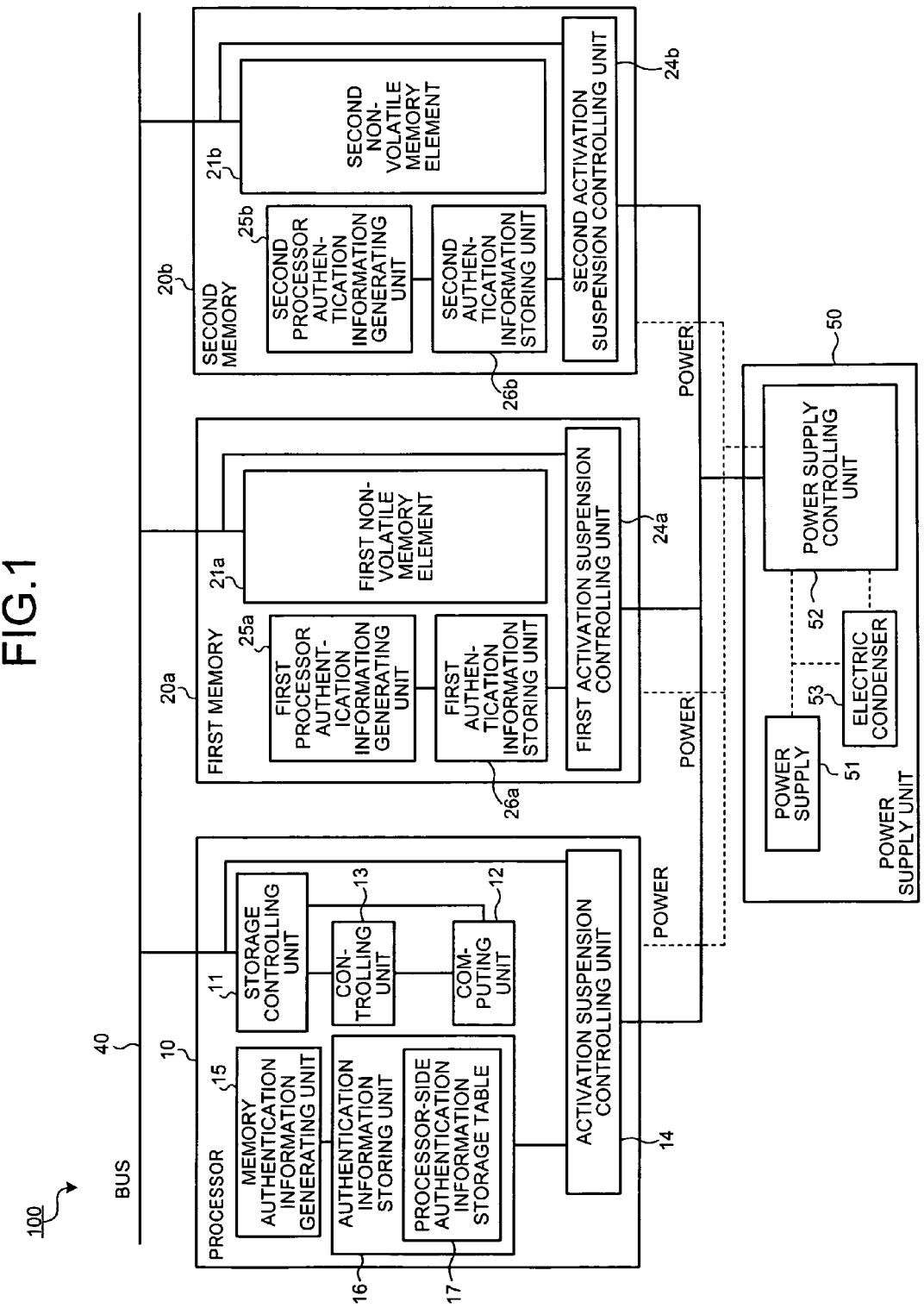
FIG. 1 is a diagram of an overall configuration of a computer system according to a first embodiment.

FIG. 1 is a diagram of an overall configuration of a computer system 100 according to a first embodiment. The computer system 100 includes a processor 10, a first memory 20a, a second memory 20b, a power supply unit 50, and a bus 40.

The processor 10 includes a storage controlling unit 11, a computing unit 12, a controlling unit 13, an activation suspension controlling unit 14, a memory authentication information generating unit 15, and an authentication information storing unit 16. The storage controlling unit 11 reads out a program or data from the first memory 20a and the second memory 20b, and writes data into the first memory 20a and the second memory 20b. The computing unit 12 has a register to temporarily store data. The computing unit 12 acquires data from the first memory 20a and the second memory 20b, and processes data utilizing the register. The controlling unit 13 administers execution of program in the computing unit 12.

The activation suspension controlling unit 14 performs processing when the processor 10 either starts or stops the operation. Specifically, the activation suspension controlling unit 14 administers the memory authentication information generating unit 15 and the authentication information storing unit 16, and authenticates the first and the second memories 20a and 20b when the processor 10 starts the operation. On the other hand, when the processor 10 stops the operation, the activation suspension controlling unit 14 generates first memory authentication information to authenticate the first memory 20a, and second memory authentication information to authenticate the second memory 20b. Additionally, the activation suspension controlling unit 14 transmits/receives information to/from the first memory 20a and the second memory 20b over the bus 40.

Thus, the activation suspension controlling unit 14 serves to acquire memory authentication information, to authenticate the memory, to perform access control, and to transfer data.

The memory authentication information generating unit 15 generates the first memory authentication information and the second memory authentication information, respectively to authenticate the first memory 20a and the second memory 20b according to instructions from the activation suspension controlling unit 14. The authentication information storing unit 16 has a processor-side authentication information storage table 17. The processor-side authentication information storage table 17 stores first processor authentication information red out from the first memory 20a and the second processor authentication information red out from the second memory 20b. The processor-side authentication information storage table 17 further stores the first memory authentication information and the second memory authentication information generated by the memory authentication information generating unit 15. Here, the first processor authentication information is information for authentication of the processor 10 by the first memory 20a, whereas the second processor authentication information is information for authentication of the processor 10 by the second memory 20b. Further, the first memory authentication information is information for authentication of the first memory 20a by the processor 10, whereas the second memory authentication information is information for authentication of the second memory 20b by the processor 10.

Here, the first memory authentication information, the second memory authentication information, the first processor authentication information, and the second processor authentication information are secret information for mutual authentication between the processor 10 and the first memory 20a or between the processor 10 and the second memory 20b. Hence, these pieces of information may be information which cannot be known to components other than the processor 10, the first memory 20a, and the second memory 20b.

The authentication information storing unit 16 is a non-volatile memory. Hence, even when the power supply stops, the data stored in the authentication information storing unit 16 is not erased but held. An Electronically Erasable and Programmable Read Only Memory (EEPROM) or a flash memory, for example, can be employed as the non-volatile memory for the authentication information storing unit 16, though any non-volatile memory can be employed as the authentication information storing unit 16. An employable memory is not limited by the embodiment.

Respective units in the processor 10 are integrally fabricated. More specifically, the respective units of the processor 10 are mounted on one chip. Alternatively, the respective units of the processor 10 are incorporated into one package. Thus, when the respective units of the processor 10 are referred to as being integrally fabricated, it means that the respective units are formed integrally in terms of physical configuration. Preferably, the processor 10 is formed so that the respective units do not function when they are separated from each other.

The first memory 20a has a first non-volatile memory element 21a, a first activation suspension controlling unit 24a, a first processor authentication information generating unit 25a, and a first authentication information storing unit 26a.

The first non-volatile memory element 21a is a high-speed memory. Specifically, the first non-volatile memory element 21a is a Magnetic Random Access Memory (MRAM), a Ferroelectric RAM (FeRAM), or a Phase-Change RAM (PRAM), for example. Hence, even when the power supply stops, data stored in the first non-volatile memory element 21a is not erased but held. Thus, the state of the first non-volatile memory element 21a before the power suspension can be stored therein, and the operation can be resumed from the state at the power suspension when the power supply resumes.

The first non-volatile memory element 21a is connected to the processor 10 by the bus 40. The first activation suspension controlling unit 24a performs processing when the first memory 20a either starts or stops the operation. Specifically, the first activation suspension controlling unit 24a administers the first processor authentication information generating unit 25a and the first authentication information storing unit 26a, authenticates the processor 10 when the first memory 20a starts the operation, and generates the processor authentication information for the authentication of the processor 10 when the first memory 20a stops the operation. Further, the first activation suspension controlling unit 24a transmits/receives information to/from the processor 10 over the bus 40.

The first processor authentication information generating unit 25a generates the first processor authentication information for the authentication of the processor 10 according to an instruction from the first activation suspension controlling unit 24a. The first authentication information storing unit 26a stores the first processor authentication information generated by the first processor authentication information generating unit 25a. The first processor authentication information storing unit 26a further stores the first memory authentication information. The first activation suspension controlling unit 24a acquires the first memory authentication information from the processor 10. The first authentication information storing unit 26a is a non-volatile memory similar to the authentication information storing unit 16. Similarly to the processor 10, the respective units in the first memory 20a are integrally fabricated.

The second memory 20b includes a second non-volatile memory element 21b, a second activation suspension controlling unit 24b, a second processor authentication information generating unit 25b, and a second authentication information storing unit 26b. Functional structures of respective units are similar to those of the respective units of the first memory 20a.

Over the bus 40, three different signals are transmitted; i.e., an "address" signal which designates an address of a memory, a "data" signal which designates data corresponding to the designated address, and a "control" signal which designates one of a reading operation and a writing operation. Specifically, these signals are transmitted over plural signal lines.

The power supply unit 50 has a power supply 51, a power supply controlling unit 52, and an electric condenser 53. The electric condenser 53 stores electricity supplied from the power supply 51. The electric condenser 53 has a sufficient capacity to supply the electricity for a sufficient amount of time to the processor 10, the first memory 20a, and the second memory 20b, to perform a suspending process, which will be described later. The power supply controlling unit 52 controls the power supply 51 and the electric condenser 53.

The computer system 100 further includes various input/output devices not shown. The input/output device is, for example, a video processor which displays video data stored and processed in the first memory 20a on a display.

FIG. 2 is a schematic diagram of a data structure of the processor-side authentication information storage table 17. As can be seen from FIG. 2, the processor-side authentication information storage table 17 stores memory identifiers "MEMORY01" and "MEMORY02" to identify the first memory 20a and the second memory 20b, processor authentication information storing position information "X" and "Y" that respectively indicate storing positions of the processor authentication information in the first and the second memories 20a and 20b, processor authentication information "KEY1" and "KEY2" employed for authentication of the processor 10, first memory authentication information "KEY3" generated by the memory authentication information generating unit 15 for authentication of the first memory 20a, and second memory authentication information "KEY4" for authentication of the second memory 20b, in association with each other.

Specifically, the processor authentication information storing position information is an address which allows access to the first processor authentication information and the second processor authentication information held in the first and the second memories 20a and 20b, respectively.

Here, the address may be an actual address inside each of the non-volatile memory elements 21a and 21b. Alternatively, the address may be a special address for the access to each of the first and the second memories 20a and 20b. Thus, the form of the address is not limited by the embodiment as far as the address can identify the storing position of each piece of the processor authentication information.

Further, though the processor-side authentication information storage table 17 stores the first processor authentication information "KEY1" and the second processor authentication information "KEY2", alternatively, the processor-side authentication information storage table 17 may store only the information indicating the storing position of each piece of the processor authentication information in the authentication information storing unit 16. Similarly, though the processor-side authentication information storage table 17 stores the first memory authentication information "KEY3" and the second memory authentication information "KEY4", the processor-side authentication information storage table 17 may store only the information indicating the storing position of each piece of the memory authentication information in the authentication information storing unit 16.

Among the information stored in the processor-side authentication information storage table 17, the memory identifiers and the processor authentication information storing position information can be set through inspection of system configuration when the computer system 100 is first activated.

In view of security, for example, for the prevention of overwriting through illegal access, it is desirable that the memory identifiers and the processor authentication information storing position information be prohibited from overwriting after they are set in a predetermined manner at the time of manufacturing or at the time of shipment. It is also desirable that the processor-side authentication information storage table 17 be stored in the non-volatile memory similarly to the processor authentication information.

Figure 3:
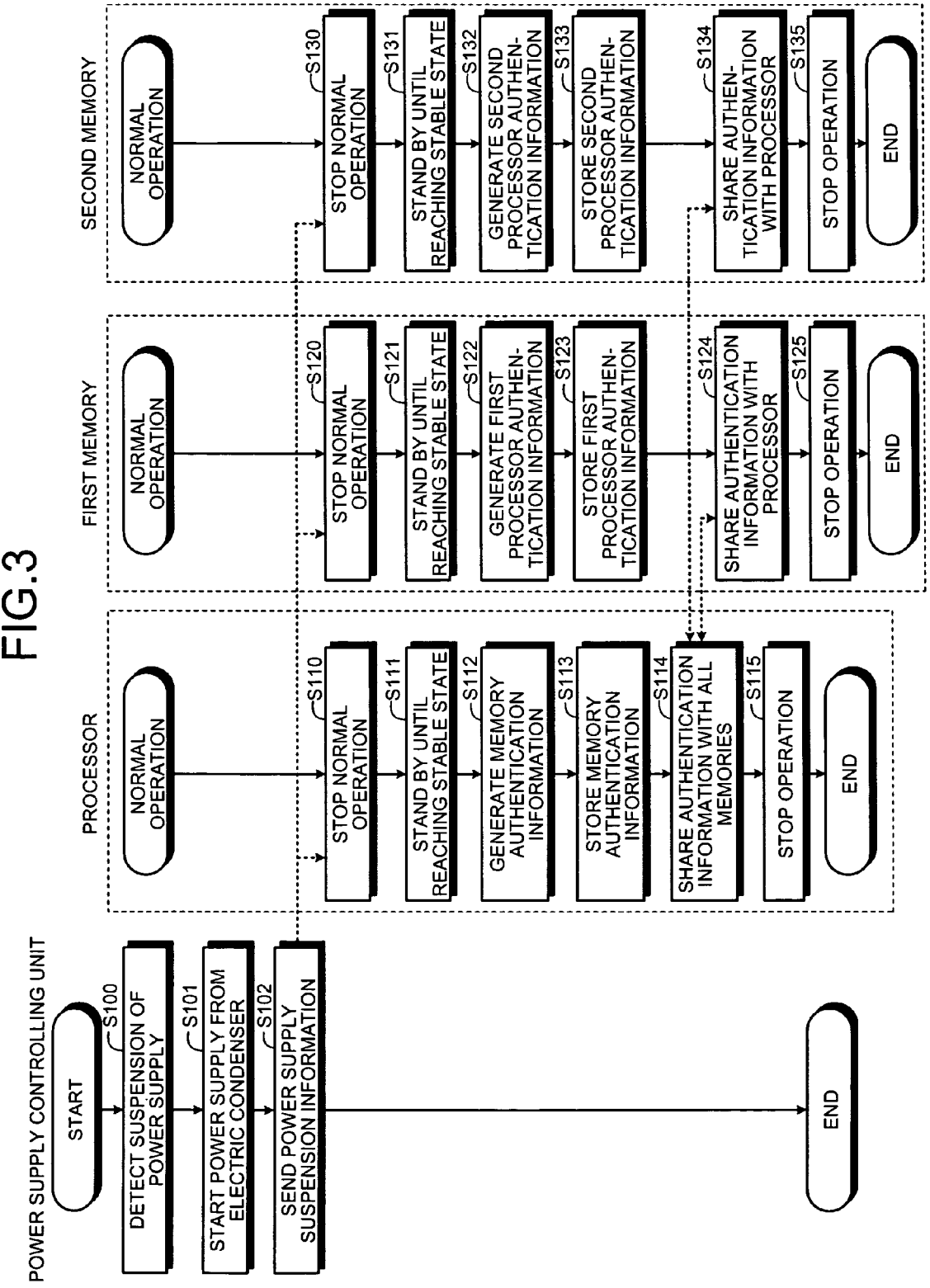
FIG. 3 is a flowchart of a suspending process which is executed by the computer system of the first embodiment when power supply is stopped.

FIG. 3 is a flowchart of the suspending process which is executed in the computer system 100 according to the first embodiment when the power supply stops.

When the power supply controlling unit 52 detects power-off, i.e., the suspension of power supply from the power supply unit 50 (step S100), the power supply controlling unit 52 supplies the electricity stored in the electric condenser 53 to the processor 10, the first memory 20a, and the second memory 20b (step S101), to make the processor 10, the first memory 20a, and the second memory 20b continue the operation. Further, the power supply controlling unit 52 sends power supply suspension information to the activation suspension controlling unit 14, the first activation suspension controlling unit 24a, and the second activation suspension controlling unit 24b (step S102).

The activation suspension controlling unit 14, the first activation suspension controlling unit 24a, and the second activation suspension controlling unit 24b, on receiving the power supply suspension information from the power supply controlling unit 52, recognize the suspension of power supply, and stop normal operations that are underway at the reception of the power supply suspension information (step S110, S120, S130).

Then, the activation suspension controlling unit 14, the first activation suspension controlling unit 24a, and the second activation suspension controlling unit 24b stand by until they reach a stable state, in other words, a state that would allow them to resume the normal operation from the state at the reception of the power supply suspension information (step S111, step S121, step S131) when the power is turned on again.

For example, if the computer system 100 is executing an operation of memory access cycle when the power supply suspension information is received, the respective units stand by until the operation of memory access cycle finishes. When the computer system 100 is executing an instruction in the middle of a processor pipeline, the respective units stand by until the execution of the instruction finishes.

Further, when a register or a cache memory in the processor 10 is a volatile memory, an internal state of the register or the cache memory is saved in the first memory 20a or the second memory 20b so that the operation can be properly resumed.

When the processor 10, the first memory 20a, and the second memory 20b stop the normal operation and enter stable states, the memory authentication information generating unit 15 newly generates the first memory authentication information and the second memory authentication information according to instructions from the activation suspension controlling unit 14 (step S112). The first processor authentication information generating unit 25a newly generates the first processor authentication information according to instruction from the first activation suspension controlling unit 24a (step S122).

Similarly, the second processor authentication information generating unit 25b newly generates the second processor authentication information according to an instruction from the second activation suspension controlling unit 24b (step S132).

Then, the authentication information storing unit 16 stores the first memory authentication information and the second memory authentication information generated by the memory authentication information generating unit 15 (step S113). Specifically, the authentication information storing unit 16 stores the first memory authentication information in the processor-side authentication information storage table 17 in association with the memory identifier "MEMORY01" which indicates the first memory 20a. More specifically, the authentication information storing unit 16 writes the first memory authentication information into a memory authentication information column of an entry identified by the identifier "MEMORY01" corresponding to the first memory 20a.

Further, the authentication information storing unit 16 stores the second memory authentication information generated by the memory authentication information generating unit 15 in the processor-side authentication information storage table 17 in association with the memory identifier "MEMORY02" which indicates the second memory 20b. More specifically, the authentication information storing unit 16 writes the second memory authentication information into a memory authentication information column of an entry identified by the identifier "MEMORY02" corresponding to the second memory 20b. The first authentication information storing unit 26a stores the first processor authentication information generated by the first processor authentication information generating unit 25a (step S123). The second authentication information storing unit 26b stores the second processor authentication information generated by the second processor authentication information generating unit 25b (step S133).

Then, the processor 10 and the first memory 20a share the first processor authentication information and the first memory authentication information, whereas the processor 10 and the second memory 20b share the second processor authentication information and the second memory authentication information (step S114, step S124, step S134).

Specifically, the activation suspension controlling unit 14 sends the first memory authentication information "KEY3" stored in association with the memory identifier "MEMORY01" of the first memory 20a in the processor-side authentication information storage table 17 of the authentication information storing unit 16 over the bus 40 to the first activation suspension controlling unit 24a. Similarly, the activation suspension controlling unit 14 sends the second memory authentication information "KEY4" stored in association with the memory identifier "MEMORY02" of the second memory 20b in the processor-side authentication information storage table 17 of the authentication information storing unit 16 over the bus 40 to the second activation suspension controlling unit 24b. The first activation suspension controlling unit 24a stores the first memory authentication information red out from the activation suspension controlling unit 14 in the first authentication information storing unit 26a. The second activation suspension controlling unit 24b stores the second memory authentication information red out from the activation suspension controlling unit 14 in the second authentication information storing unit 26b.

The first activation suspension controlling unit 24a sends the first processor authentication information stored in the first authentication information storing unit 26a over the bus 40 to the activation suspension controlling unit 14. The activation suspension controlling unit 14 stores the first processor authentication information red out from the first activation suspension controlling unit 24a in association with the memory identifier "MEMORY01" which indicates the first memory 20a in the processor-side authentication information storage table 17 of the authentication information storing unit 16.

Further, the second activation suspension controlling unit 24b sends the second processor authentication information stored in the second authentication information storing unit 26b over the bus 40 to the activation suspension controlling unit 14. The activation suspension controlling unit 14 stores the second processor authentication information red out from the second activation suspension controlling unit 24b in association with the memory identifier "MEMORY02" which indicates the second memory 20b in the processor-side authentication information storage table 17 of the authentication information storing unit 16.

In other words, the first processor authentication information red out from the first memory 20a is written into the processor-side authentication information storage table 17 at the processor authentication information column of the entry identified by the identifier "MEMORY01" of the first memory 20a. The second processor authentication information red out from the second memory 20b is written into the processor-side authentication information storage table 17 at the processor authentication information column of the entry identified by the identifier "MEMORY02" of the second memory 20b.

Through the above-described processes, the first processor authentication information and the first memory authentication information are shared by the processor 10 and the first memory 20a, whereas the second processor authentication information and the second memory authentication information are shared by the processor 10 and the second memory 20b. Then, the processor 10, the first memory 20a, and the second memory 20b stop the operation (steps S115, S125, and S135). Thus, the suspending process completes.

The first processor authentication information, the second processor authentication information, the first memory authentication information, and the second memory authentication information are transferred through a secure communication means, in order to prevent the leakage of information, for example, through illegal monitoring of the signals. Specifically, the authentication information may be encrypted before transmission.

Alternatively, the authentication information may be encrypted by a secret key. For example, a secret key for the processor 10 and the first memory 20a, and a secret key for the processor 10 and the second memory 20b may be determined in advance and shared. The corresponding devices utilize the shared secret key for the transmission of the authentication information.

Still alternatively, the authentication information may be encrypted by public key cryptosystem. When the information is to be transmitted between the processor 10 and the first memory 20a by public key cryptosystem, the processor 10 holds its own secret key and a public key of the counterpart, i.e., the first memory 20a, whereas the first memory 20a holds its own secret key and a public key of the counterpart, i.e., the processor 10. Then, each of the processor 10 and the first memory 20a encrypts the authentication information by the public key of the counterpart and transfers the encrypted information. Similarly, when the authentication information is to be transmitted between the processor 10 and the second memory 20b by public key cryptosystem, the processor 10 holds its own secret key and a public key of the second memory 20b, whereas the second memory 20b holds its own secret key and a public key of the processor 10. Each of the processor 10 and the second memory 20b encrypts the authentication information by the public key of the counterpart and transmits the encrypted information.

Figure 4:
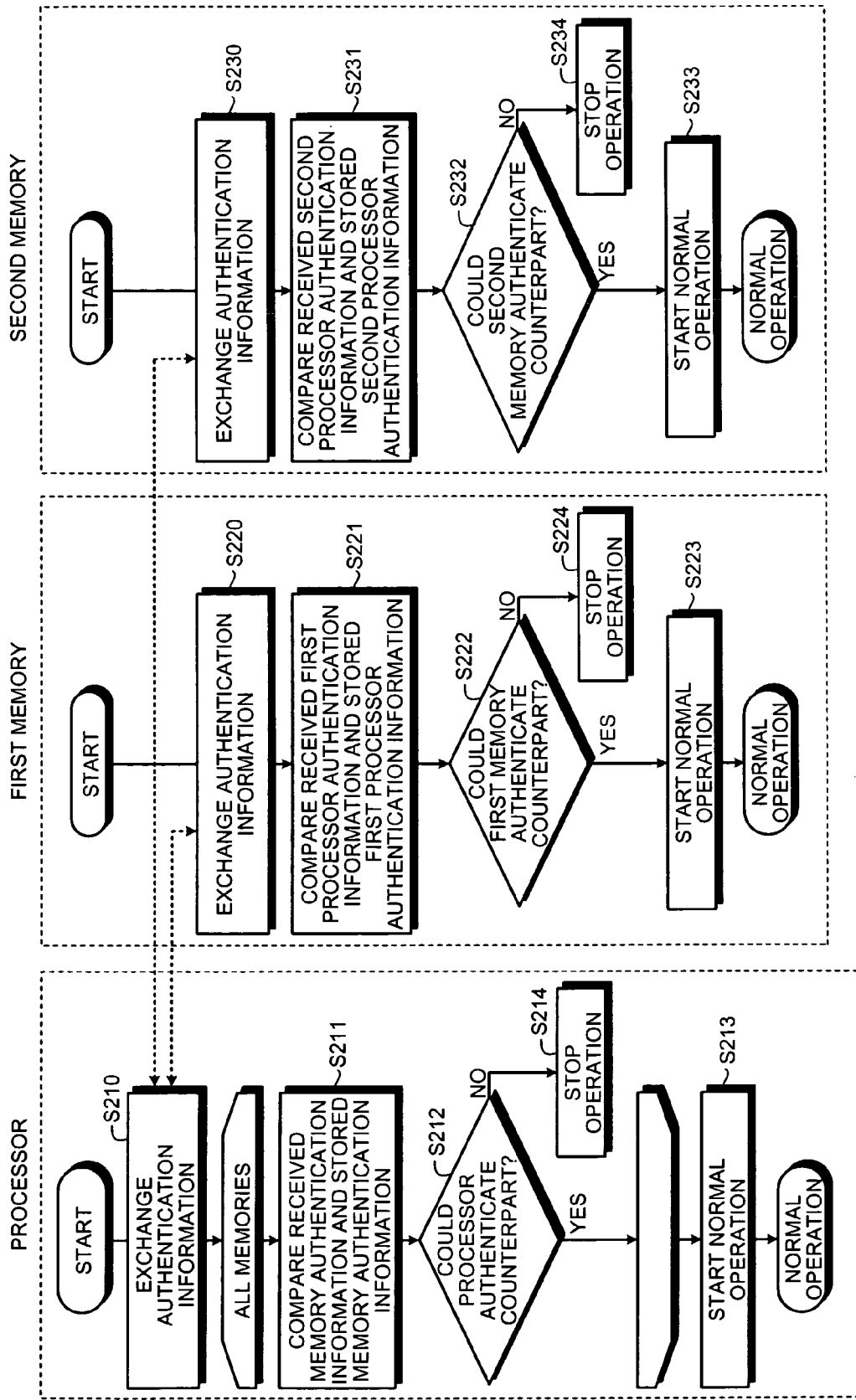
FIG. 4 is a flowchart of an authenticating process of the first embodiment when power supply resumes after the suspension of the power supply.

FIG. 4 is a flowchart of an authenticating process which is executed in the computer system 100 according to the first embodiment when the power supply resumes after the suspension of power supply. The processor 10, when the power supply resumes, exchanges the first memory authentication information and the first processor authentication information that are shared with the first memory 20a in the power supply suspending process over the bus 40 (step S210, step S220).

Further, the processor 10, when the power supply resumes, exchanges the second memory authentication information and the second processor authentication information that are shared with the second memory 20b in the power supply suspending process over the bus 40 (step S210, step S230).

Specifically, the activation suspension controlling unit 14 sends the first processor authentication information to the first activation suspension controlling unit 24a over the bus 40. Here, the first processor authentication information is the processor authentication information stored in association with the identifier "MEMORY01" of the first memory 20a in the processor-side authentication information storage table 17. Additionally, the activation suspension controlling unit 14 sends the second processor authentication information to the second activation suspension controlling unit 24b over the bus 40. Here, the second processor authentication information is the processor authentication information stored in association with the identifier "MEMORY02" of the second memory 20b in the processor-side authentication information storage table 17.

On the other hand, the first activation suspension controlling unit 24a sends the first memory authentication information stored in the first authentication information storing unit 26a to the activation suspension controlling unit 14 over the bus. The second activation suspension controlling unit 24b sends the second memory authentication information stored in the second authentication information storing unit 26b to the activation suspension controlling unit 14 over the bus 40.

Here, similarly to the description above, the first memory authentication information, the second memory authentication information, the first processor authentication information, and the second processor authentication information are sent by a secure communication means, for example, by encryption.

Then, the activation suspension controlling unit 14 performs the authentication of the first memory 20a and the second memory 20b. Specifically, the activation suspension controlling unit 14 compares the first memory authentication information sent from the first activation suspension controlling unit 24a with the first memory authentication information generated by the memory authentication information generating unit 15 and stored in the processor-side authentication information storage table 17 of the authentication information storing unit 16 in association with the memory identifier "MEMORY01" of the first memory 20a (step S211). When two pieces of information match with each other, the activation suspension controlling unit 14 determines that the first memory 20a is successfully authenticated (Yes in step S212).

Further, the activation suspension controlling unit 14 compares the second memory authentication information sent from the second activation suspension controlling unit 24b with the second memory authentication information generated by the memory authentication information generating unit 15 and stored in the processor-side authentication information storage table 17 of the authentication information storing unit 16 in association with the memory identifier "MEMORY02" of the second memory 20b (step S211).

When two pieces of information match with each other, the activation suspension controlling unit 14 determines that the second memory 20b is successfully authenticated (Yes in step S212). When the authentications of the first memory 20a and the second memory 20b are successful as described above, the normal operation resumes (step S213). Specifically, access to the first memory 20a and the second memory 20b by the processor 10 is permitted, and the data reading and data writing from/to the first memory 20a and the second memory 20b start.

On the other hand, when the first memory authentication information red out from the first activation suspension controlling unit 24a does not match with the first memory authentication information stored in the processor-side authentication information storage table 17 of the authentication information storing unit 16 in association with the memory identifier "MEMORY01" of the first memory 20a, the activation suspension controlling unit 14 determines that the authentication of the first memory 20a is not successful (No in step S212) and stops the operation (step S214).

When two pieces of memory authentication information do not match with each other, it means that the first memory 20a is in a different state from the state before the power suspension. Hence, there is a possibility of illegal acts, such as an illegal access to the first memory 20a by a third party in bad faith. If not, the first memory 20a may have been replaced with other memory. Hence, the processor 10 stops operation. Specifically, the processor 10 does not access the first memory 20a. Thus, illegal acts such as an illegal intrusion into the processor 10 via the first memory 20a can be prevented.

Similarly, when the second memory authentication information red out from the second activation suspension controlling unit 24b does not match with the second memory authentication information stored in the processor-side authentication information storage table 17 of the authentication information storing unit 16 in association with the memory identifier "MEMORY02" of the second memory 20*b*, the activation suspension controlling unit 14 determines that the authentication of the second memory 20*b* is not successful (No in step S212), and stops the operation (step S214). The processor 10 can prevent the illegal acts from being performed thereto through the second memory 20*b* by suspending the operation, when the second memory 20*b* is in a different state from the state before the power suspension.

The first activation suspension controlling unit 24*a* of the first memory 20*a*, after exchanging the authentication information, compares the first processor authentication information sent from the activation suspension controlling unit 14 with the first processor authentication information generated by the first processor authentication information generating unit 25*a* and stored in the first authentication information storing unit 26*a* (step S221).

When two pieces of the first processor authentication information match with each other, the first activation suspension controlling unit 24*a* determines that the authentication of the processor 10 is successful (Yes in step S222) and resumes the normal operation (step S223). More specifically, the access to the first memory 20*a* by the processor 10 is permitted and the data reading and the data writing by the processor 10 start.

On the other hand, when two pieces of the first processor authentication information do not match with each other, the first activation suspension controlling unit 24*a* determines that the authentication of the processor 10 is not successful (No in step S222), and stops the operation (step S224). Thus, the authenticating process completes.

The second activation suspension controlling unit 24*b* of the second memory 20*b*, after exchanging the authentication information, compares the second processor authentication information sent from the activation suspension controlling unit 14 with the second processor authentication information generated by the second processor authentication information generating unit 25*b* and stored in the second authentication information storing unit 26*b* (step S231).

When two pieces of the second processor authentication information match with each other, the second activation suspension controlling unit 24*b* determines that the authentication of the processor 10 is successful (Yes in step S232), and resumes the operation (step S233). More specifically, the access to the second memory 20*b* by the processor 10 is permitted and the data reading and the data writing by the processor 10 resumes.

On the other hand, when two pieces of the second processor authentication information do not match with each other, the second activation suspension controlling unit 24*b* determines that the authentication of the processor 10 is not successful (No in step S232), and stops the operation (step S234). Thus, the authenticating process completes.

As can be seen from the above, in the authenticating process, when the processor 10 succeeds in authentication of the first memory 20*a* and the second memory 20*b*, and the first memory 20*a* and the second memory 20*b* each succeed in authentication of the processor 10, the access to the first memory 20*a* and the second memory 20*b* by the processor 10 is permitted.

When two pieces of the first processor authentication information do not match with each other, it means that the processor 10 is in a different state from the state before the power suspension. In other words, there is a possibility that illegal acts has been performed to the processor 10, for example, the processor 10 might be illegally accessed by a third party in bad faith, or the processor 10 might be replaced with other processor.

Hence, in such case, the first memory 20*a* stops the operation. In other words, the first memory 20*a* does not accept the access from the processor 10 thereafter, whereby the illegal acts such as illegal intrusion to the first memory 20*a* via the processor 10 can be prevented.

Similarly, when two pieces of the second processor authentication information do not match with each other, the second memory 20*b* stops the operation. Specifically, the second memory 20*b* does not accept the access from the processor 10 thereafter, whereby the illegal acts such as an illegal intrusion to the second memory 20*b* via the processor 10 can be prevented.

The present invention has been described with reference to the first embodiment. The first embodiment described above, however, can be modified or improved in various manners.

For example, the information generated in the processor 10 and the information generated in the first memory 20*a*, that are employed respectively as the first memory authentication information and the first processor authentication information can be utilized in a different manner as far as they contribute to the mutual authentication of the processor 10 and the first memory 20*a*.

The same applies to the authentication between the processor 10 and the second memory 20*b*. The information generated in the processor 10 and the information generated in the second memory 20*b* can be utilized in a different manner as far as they contribute to the mutual authentication of the processor 10 and the second memory 20*b*.

The authentication between the processor 10 and the first memory 20*a* according to a first modification of the first embodiment will be described below. The description below similarly applies to the authentication between the processor 10 and the second memory 20*b*.

For example, the first memory 20*a* can authenticate the processor 10 utilizing the information generated in the processor 10, i.e., the first memory authentication information, whereas the processor 10 can authenticate the first memory 20*a* utilizing the information generated in the memory, i.e., the first processor authentication information.

Alternatively, the processor 10 may authenticate the first memory 20*a* utilizing both the first processor authentication information and the first memory authentication information. Similarly, the first memory 20*a* may authenticate the processor 10 utilizing both the first processor authentication information and the first memory authentication information.

Still alternatively, only one of the processor 10 and the first memory 20*a* may generate information for the mutual authentication between the processor 10 and the first memory 20*a*, and the mutual authentication between the processor 10 and the first memory 20*a* may be performed based thereon.

Figure 5:
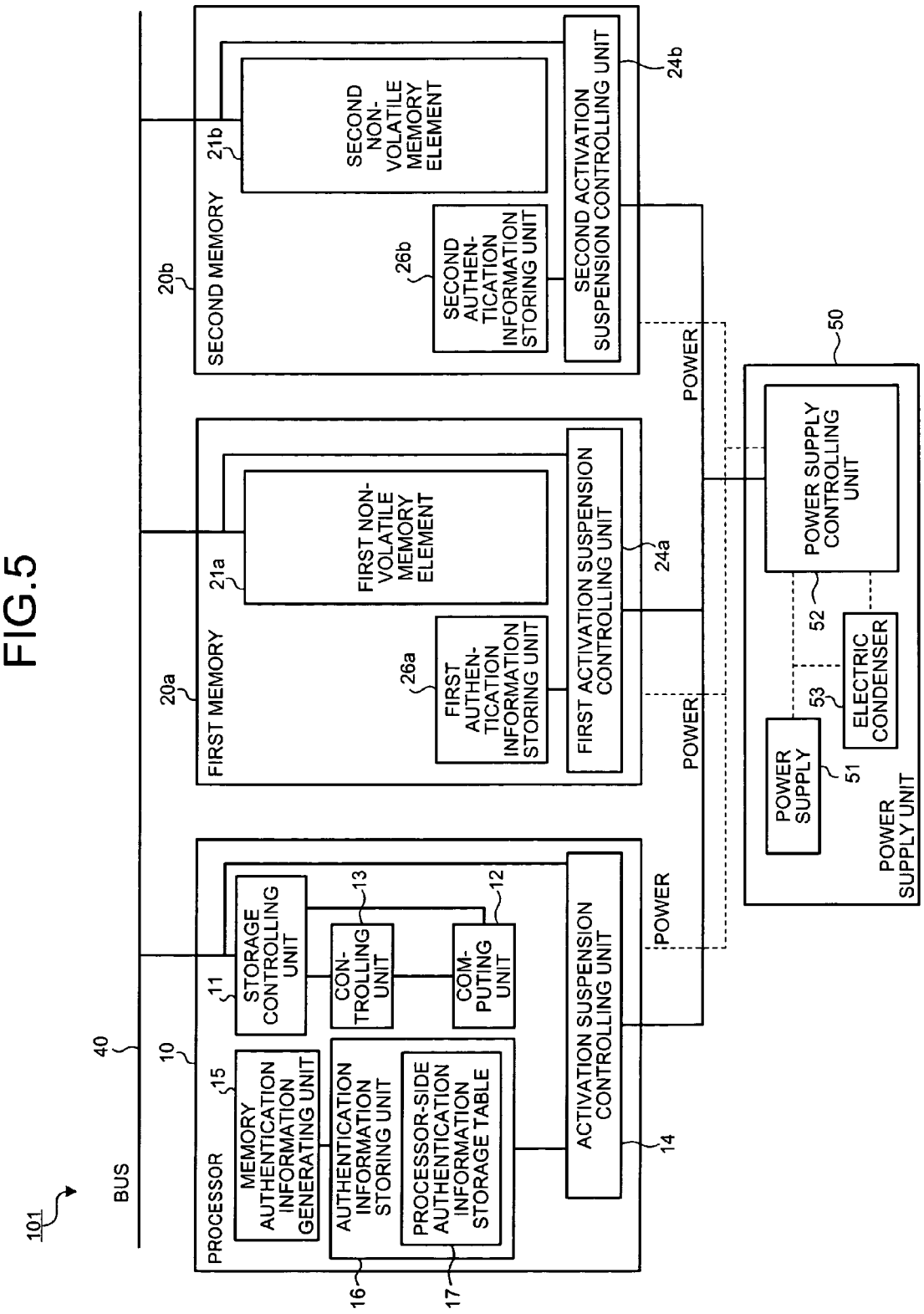
FIG. 5 is a diagram of an overall configuration of a computer system in which only a processor generates authentication information.

FIG. 5 shows an overall configuration of a computer system 101 in which only the processor 10 generates the information for the authentication. In this case, the memory authentication information generating unit 15 of the processor 10 generates the first memory authentication information and the second memory authentication information and stores the same in the processor-side authentication information storage table 17 of the authentication information storing unit 16. Further, the first activation suspension controlling unit 24*a* of the first memory 20*a* stores the first memory authentication information red out from the activation suspension controlling unit 14 in the first authentication information storing unit 26*a*.

At the resumption of power supply, the processor 10 acquires the first memory authentication information stored in the first authentication information storing unit 26*a*. When the authentication is successful, the processor 10 starts the normal operation. Similarly, the first memory 20a acquires the first memory authentication information stored in the processor-side authentication information storage table 17 of the authentication information storing unit 16. When the authentication is successful, the first memory 20a starts the normal operation.

Still alternatively, only the first memory 20a may generate the information for authentication between the processor 10 and the first memory 20a. In this case, the authentication between the first memory 20a and the processor 10 is performed based on the authentication information generated by the first memory 20a. Specifically, the first memory 20a authenticates the processor 10 utilizing the authentication information generated by the first memory 20a. The processor 10, similarly, authenticates the first memory 20a utilizing the authentication information generated by the first memory 20a.

No matter whether both the processor 10 and the first memory 20a generate the authentication information or only one of the processor 10 and the first memory 20a generates the authentication information, the generated information is sent to the counterpart device and the processor 10 and the first memory 20a share the generated authentication information.

In the first embodiment, the activation suspension controlling unit 14 authenticates the memory connected to the processor 10, i.e., the first memory 20a, whereas the first activation suspension controlling device 24a authenticates the processor 10 connected to the first memory 20a. As a second modification, only one of the activation suspension controlling device 14 and the first activation suspension controlling device 24a may perform the authentication. Similarly, the authentication between the processor 10 and the second memory 20b may be performed by only one of the processor 10 and the second memory 20b.

For example, only the activation suspension controlling unit 14 may authenticate the first memory 20a. In this case, the activation suspension controlling unit 14 compares the first memory authentication information stored in the processor-side authentication information storage table 17 of the authentication information storing unit 16 and the first memory authentication information stored in the first authentication information storing unit 26a, to authenticate the first memory 20a. The first memory 20a, however, does not need to authenticate the processor 10.

In other words, the first activation suspension controlling unit 24a does not need to compare the first processor authentication information stored in the first authentication information storing unit 26a and the first processor authentication information stored in the processor-side authentication information storage table 17 of the authentication information storing unit 16. When the activation suspension controlling unit 14 succeeds in authenticating the first memory 20a, the first memory 20a as well as the processor 10 starts the normal operation.

In the first embodiment, the first processor authentication information, the second processor authentication information, the first memory authentication information, and the second memory authentication information are transferred over the bus 40. As a third modification, the computer system 100 may further include a signal line dedicated for the transfer of the authentication information. Then, the first processor authentication information, the second processor authentication information, the first memory authentication information, and the second memory authentication information may be transferred over the dedicated signal line for the authentication information transfer.

In the computer system 100 of the first embodiment, the first processor authentication information and the first memory authentication information are stored in the first authentication information storing unit 26a in the first memory 20a. As a fourth modification, the first processor authentication information and the first memory authentication information may be stored in a portion of the first non-volatile memory element 21a of the first memory 20a.

Similarly, in the second memory 20b, the second processor authentication information and the second memory authentication information may be stored in a portion of the second non-volatile memory element 21b of the second memory 20b.

In the first embodiment, the computer system 100 includes two memories 20a and 20b. As a fifth modification, the computer system 100 may includes three or more memories. Thus, the number of the memories included in the computer system 100 is not limited by the first embodiment.

In the computer system 100 of the first embodiment, the processor 10 first exchanges the authentication information with all of the memories 20a and 20b. Only after the information exchanging process finishes, the processor 10 performs the authenticating process. As a sixth modification, the processor 10 may perform the authenticating process and the authentication information exchanging process simultaneously. Specifically, when the processor 10 finishes the authentication information exchanging operation with one memory, the processor 10 may start the authenticating process of this memory no matter whether the authentication information exchanging process with other memory has finished or not. Then, failure of authentication can be detected at earlier timing compared with the case of sequential processing. Such parallel processing is particularly advantageous when many memories are incorporated in the computer system 100.

In the computer system 100 of the first embodiment, the first memory authentication information generated by the memory authentication information generating unit 15 is shared by the processor 10 and the first memory 20a, whereas the second memory authentication information generated by the memory authentication information generating unit 15 is shared by the processor 10 and the second memory 20b. In the first embodiment, the processor 10 authenticates the first memory 20a based on the shared first memory authentication information, and authenticates the second memory 20b based on the shared second memory authentication information. As a seventh modification, the processor 10 may use the same memory authentication information for the authentication of both the first memory 20a and the second memory 20b.

Then, when the power supply stops, the memory authentication information generating unit 15 in the processor 10 generates only one piece of the memory authentication information for the authentication of the first memory 20a and the second memory 20b according to the instruction from the activation suspension controlling unit 14. Only one piece of the memory authentication information is stored in the processor-side authentication information storage table 17 of the authentication information storing unit 16.

More specifically, the memory authentication information "KEY3" stored in the memory authentication information column of the entry associated with the identifier "MEMORY01" of the first memory 20a in the processor-side authentication information storage table 17 comes to have the same contents as the contents of the memory authentication information "KEY4" stored in the memory authentication information column of the entry associated with the identifier "MEMORY02" of the second memory 20b. The activation suspension controlling unit 14 transfers the memory authentication information to the first activation suspension controlling units 24a and 24b at the authentication information exchanging process at the suspension of power supply.

Thus, since the same memory authentication information is utilized for the authentication of plural memories, the prevention of illegal access can be achieved with the small number of generated pieces of memory authentication information, even when the number of mounted memories increases, whereby the time required for the generation of the memory authentication information can be reduced.

Further, if the processor-side authentication information storage table 17 is configured so that the memory authentication information column stores only the information indicating the storing position of the memory authentication information, the memory authentication information columns of entries of all memories designate the same storing position. Then, the storage area necessary for the storage of the memory authentication information can be reduced.

Still further, since it is not necessary to distinguish the memory authentication information for one memory from the memory authentication information for another memory, it may be possible to store one piece of the memory authentication information for all memories instead of storing the same memory authentication information for each of the identifiers "MEMORY01" of the first memory 20a and "MEMORY02" of the second memory 20b as in the above described embodiment.

Figure 6:
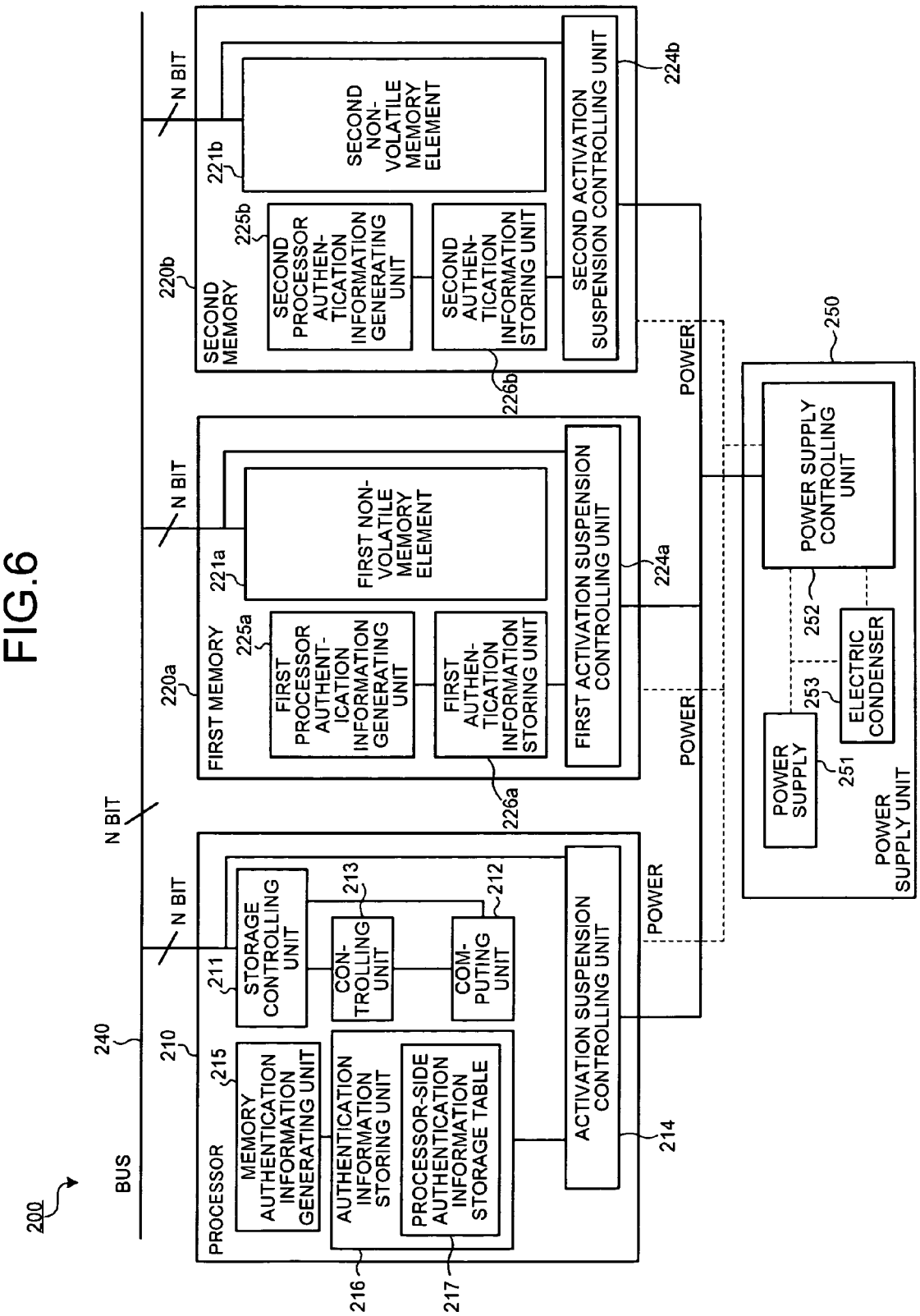
FIG. 6 is a diagram of an overall configuration of a computer system according to a second embodiment.

FIG. 6 is a diagram of an overall configuration of a computer system 200 according to a second embodiment. Configuration of the computer system 200 according to the second embodiment is basically the same as the configuration of the computer system 100 according to the first embodiment of FIG. 1. The computer system 200 includes a processor 210, a first memory 220a, a second memory 220b, a power supply unit 250, and a bus 240. The processor 210 includes a storage controlling unit 211, a computing unit 212, a controlling unit 213, an activation suspension controlling unit 214, a memory authentication information generating unit 215, and an authentication information storing unit 216 which has a processor-side authentication information storage table 217. The first memory 220a has a first non-volatile memory element 221a, a first activation suspension controlling unit 224a, a first processor authentication information generating unit 225a, and a first authentication information storing unit 226a. The second memory 220b includes a second non-volatile memory element 221b, a second activation suspension controlling unit 224b, a second processor authentication information generating unit 225b, and a second authentication information storing unit 226b. The power supply unit 250 has a power supply 251, a power supply controlling unit 252, and an electric condenser 253.

In the computer system 200 according to the second embodiment, each of the processor 210, the first non-volatile memory element 221a, the second non-volatile memory element 221b, and the bus 240 has the same number of data lines. In the second embodiment, the number of data lines is N. Specifically, the data lines of the processor 210 are connected with the data lines of the bus 240, respectively. The data lines of the second non-volatile memory element 221b are connected to the data lines of the bus 240, respectively. The data lines of the second non-volatile memory element 221b are connected to the data lines of the bus 240, respectively. In other words, each of the data width of the processor 210, the data width of the bus 240, the data width of the first non-volatile memory element 221a, and the data width of the second non-volatile memory element 221b is the same, i.e., N-bit.

Figure 7:
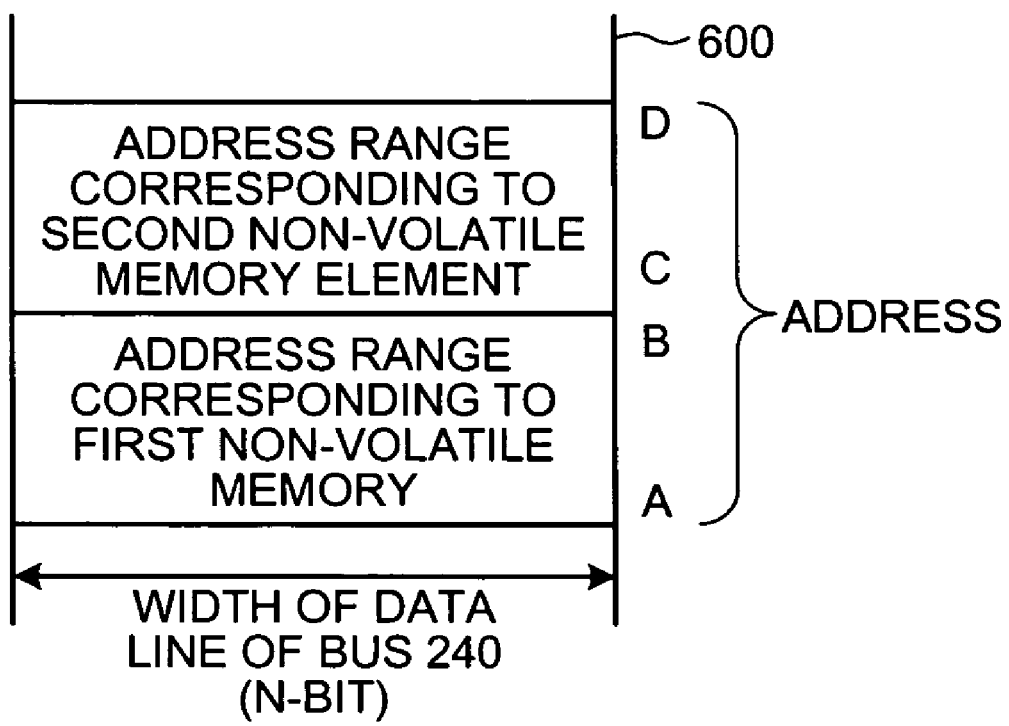
FIG. 7 is a diagram of an address space which indicates correspondence between addresses in the processor and respective non-volatile memories.

FIG. 7 shows an address space 600 which indicates the correspondence between addresses and each of the non-volatile memories 221a and 221b in the computer system 200 of the second embodiment. The address space 600 is determined by a manner of connection of the memories 220a and 220b and the bus 240 in the computer system 200 of the second embodiment.

The first non-volatile memory element 221a corresponds to addresses A to B of the address space 600. The second non-volatile memory element 221b corresponds to addresses C to D of the address space 600. Specifically, when the processor 210 performs reading/writing from/to the addresses A to B, the reading/writing is performed from/to the first non-volatile memory element 221a. Similarly, when the processor 210 performs reading/writing from/to the addresses C to D, the reading/writing is performed from/to the second non-volatile memory element 221b.

FIG. 8 shows a data structure of the processor-side authentication information storage table 217 of the authentication information storing unit 216 of the processor 210 in the computer system 200 of the second embodiment. The processor-side authentication information storage table 217 of the second embodiment stores processor authentication information length, memory authentication information length, and bus information in association with the memory identifier, in addition to the data stored in the processor-side authentication information storage table 17 of the first embodiment.

Here, the processor authentication information length is a data length of the processor authentication information. In the second embodiment, the data length of each of the first processor authentication information and the second processor authentication information is N-bit, which is equal to the data width thereof.

Similarly, the memory authentication information length is a data length of the memory authentication information. In the second embodiment, the data length of each of the first memory authentication information and the second memory authentication information is N-bit, which is equal to the data width thereof.

The bus information includes data width and connection information. The data width is the number of data lines of the bus connected to the memory identified by the memory identifier. In the second embodiment, the data width of each of the first memory 220a and the second memory 220b is N-bit. Hence, "N" is stored as the data width of the bus information. The connection information is identification information of the data line connected to the memory.

In the second embodiment, the processor 210 is connected to each of the first memory 220a and the second memory 220b via all of the N data lines. Hence, the connection information for each of the first memory 220a and the second memory 220b is N.

In the second embodiment, the data length of each of the first processor authentication information, the second processor authentication information, the first memory authentication information, and the second memory authentication information is set to N-bit, merely for the simplicity of the description. It should be noted that the data length of the authentication information is not limited by the embodiment. Preferably, the data length of the authentication information is basically determined according to required level of system security, or the like.

Here, address X is stored in the processor-side authentication information storage table 217 as the processor authentication information storing position information and represents an address between the address A to the address B, whereas an address Y similarly stored in the processor-side authentication information storage table 217 represents an address between the address C to the address D.

Next, a suspending process will be described which is executed in the computer system 200 of the second embodiment when the power supply stops. Only different process steps from the process steps in the suspending process in the computer system 100 of the first embodiment will be described below. In the second embodiment, the processes in step S100 to step S113, step S120 to step S123, and step S130 to step S133 as described above with reference to FIG. 3 of the first embodiment are performed in the same manner. In the second embodiment, the authentication information sharing process performed in steps S114, S124, and S134 in the first embodiment is replaced with an authentication information sharing process of step S2114 shown in FIG. 9, step S2124 shown in FIG. 11, and step S2134 which is performed in the same manner as step S2124.

Figure 9:
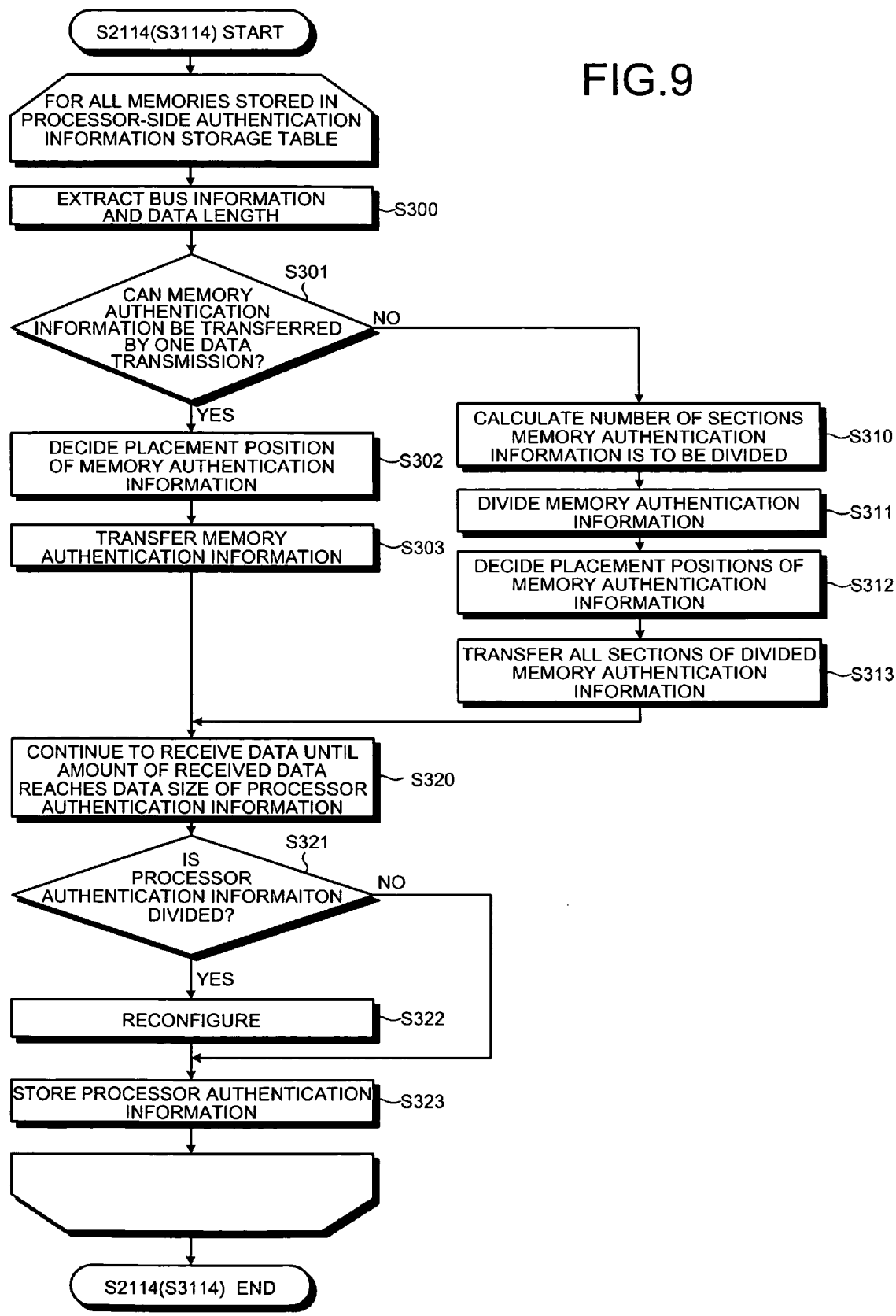
FIG. 9 is a flowchart of an authentication information sharing process in the second embodiment to share the authentication information with all memories.

FIG. 9 is a flowchart of the authentication information sharing process (step S2114) with all the memories by the processor 210 in the computer system 200 of the second embodiment. The authentication information sharing process (step S2114) of the second embodiment is performed in place of the authentication information sharing process (step S114) of the first embodiment described with reference to FIG. 3.

The activation suspension controlling unit 214 performs a following process to all the memories stored in the processor-side authentication information storage table 217 in order to transfer the first memory authentication information and the second memory authentication information respectively to the first activation suspension controlling unit 224*a* and the second activation suspension controlling unit 224*b*.

First, the activation suspension controlling unit 214 extracts the memory authentication information length of the first memory authentication information, i.e., the data length, from the processor-side authentication information storage table 217, and the bus information of the first memory 220*a*, i.e., the data width and the connection information (step S300). Then, the activation suspension controlling unit 214 compares the extracted data width and the extracted data length of the first memory authentication information. Then, the activation suspension controlling unit 214 determines whether the first memory authentication information can be transferred by one transmission over the bus 240 or not.

Specifically, if the data width is wider than the size of the memory authentication information, the activation suspension controlling unit 214 decides that the first memory authentication information can be transferred by one data transmission, whereas if the data width is narrower than the size of the memory authentication information, the activation suspension controlling unit 214 decides that the first memory authentication information cannot be transferred by one data transmission.

When the activation suspension controlling unit 214 decides that the first memory authentication information can be transferred by one data transmission (Yes in step S301), the activation suspension controlling unit 214 decides a position where the first memory authentication information to be placed (also referred to as placement position) based on the connection information extracted from the processor-side authentication information storage table 217 in step S300 (step S302).

Here, the placement position indicates to which data line among N data lines connected to the processor 210 the data should be assigned. In other words, it is decided in step S302 to which data line among the N data lines the first memory authentication information is to be assigned.

Then, the activation suspension controlling unit 214 places the first memory authentication information at the decided placement position and creates data for transfer. Then the activation suspension controlling unit 214 transfers the data for transfer, i.e., the first memory authentication information to the first activation suspension controlling unit 224*a* of the first memory 220*a* over the bus 240 (step S303).

When the activation suspension controlling unit 214 decides that the memory authentication information cannot be transferred by one data transmission (No in step S301), the activation suspension controlling unit 214 calculates the number of sections the first memory authentication information is to be divided into based on the bus information and the data length of the first memory authentication information (step S310). The number of sections the first memory authentication information is to be divided into is the number of necessary data transmissions for the transfer of the first memory authentication information over the bus 240.

Then, the activation suspension controlling unit 214 divides the first memory authentication information to be transferred into the sections of the number calculated in step S310 (step S311). The activation suspension controlling unit 214 decides placement positions of the sections of the divided first memory authentication information (step S312). The activation suspension controlling unit 214 then places the sections of the divided first memory authentication information at the decided placement positions and creates corresponding data, to transfer the created data to the first activation suspension controlling unit 224*a* of the first memory 220*a* over the bus 240 (step S313). The processor 210 similarly performs the above-described process with the second memory 220*b* using the second memory authentication information as the authentication information to be transferred.

In the computer system 200 according to the second embodiment, each of the first memory authentication information and the second memory authentication information is N-bit in size. The data width of the bus 240 is N-bit, and the data width of each of the first memory 220*a* and the second memory 220*b* is also N-bit.

Hence, when the bus 240 is employed for data transfer, the first memory authentication information and the second memory authentication information can be transferred respectively to the first activation suspension controlling unit 224*a* and the second activation suspension controlling unit 224*b* by one data transmission. Since the data transfer can be completed by one data transmission (Yes in step S301), the process proceeds to step S302 and then to step S303.

Since the data width of each of the first memory 220*a* and the second memory 220*b* is N-bit, when the memory authentication information is placed over the data lines of the bus 240, the first memory authentication information and the second memory authentication information can be transferred respectively to the first activation suspension controlling unit 224*a* and the second activation suspension controlling unit 224*b*. More specifically, the activation suspension controlling unit 214 configures N-bit data to be transferred over the bus 240 by placing the N-bit first memory authentication information over the entire N-bit data, to transfer the configured data to the first activation suspension controlling unit 224*a*. Similarly, the activation suspension controlling unit 214 configures N-bit data to be transferred over the bus 240 by placing the N-bit second memory authentication information over the entire N-bit data, to transfer the configured data to the second activation suspension controlling unit 224*b*.

On transferring the data, the activation suspension controlling unit 214 designates an address based on the processor authentication information storing position information stored in the processor-side authentication information storage table 217. Thus, the activation suspension controlling unit 214 can designate the first activation suspension controlling unit 224a and the second activation suspension controlling unit 224b as addresses to which the data is to be transferred.

Figure 10:
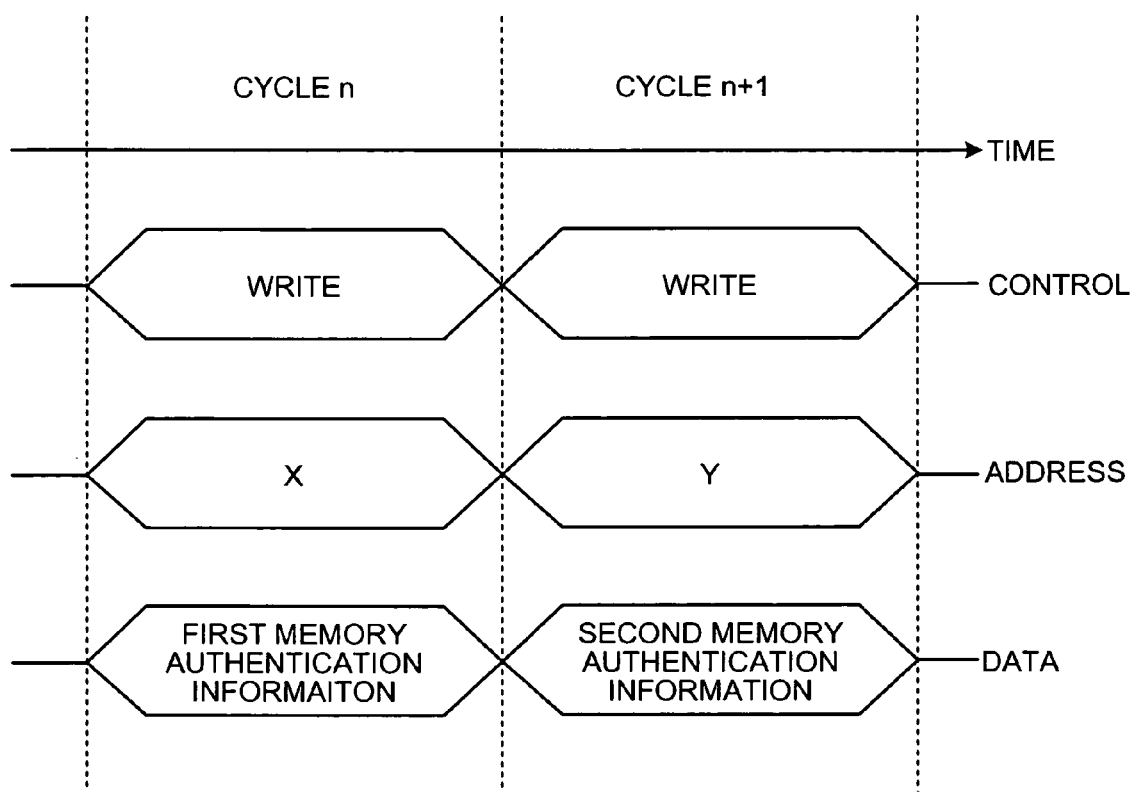
FIG. 10 is a schematic diagram showing how memory authentication information is transferred.

FIG. 10 schematically shows how the bus 240 is used when the first memory authentication information or the second memory authentication information is transferred to the first activation suspension controlling unit 224a or the second activation suspension controlling unit 224b from the activation suspension controlling unit 214.

The activation suspension controlling unit 214 allocates X, the first memory authentication information, and a write instruction (WRITE) respectively as an address signal, a data signal, and a control signal in a cycle n. Thus, the activation suspension controlling unit 214 transfers the first memory authentication information to the first activation suspension controlling unit 224a. Further, the activation suspension controlling unit 214 allocates Y, the second memory authentication information, and the write instruction (WRITE) respectively as the address signal, the data signal, and the control signal in a cycle n+1. Thus, the activation suspension controlling unit 214 transfers the second memory authentication information to the second activation suspension controlling unit 224b.

Returning to FIG. 9, when the transfer is completed (step S303, step S313), the activation suspension controlling unit 214 receives the first processor authentication information "KEY1" from the first memory 220a (step S320). Specifically, the activation suspension controlling unit 214 continues to receive the data transferred from the first activation suspension controlling unit 224a until the amount of received data reaches the data size of the first processor authentication information "KEY1".

Then, the activation suspension controlling unit 214 decides whether the received first processor authentication information "KEY1" is transferred in plural divided sections. When the first processor authentication information is transferred in plural divided sections (Yes in step S321), the activation suspension controlling unit 214 takes out the sections of the first processor authentication information "KEY1" from the transferred data from positions identified by the connection information associated with the memory identifier of the first memory 220a in the processor-side authentication information storage table 217, i.e., from the data lines.

Then, the activation suspension controlling unit 214 reconfigures the first processor authentication information from the taken-out pieces of data (step S322). The activation suspension controlling unit 214 then stores the reconfigured first processor authentication information "KEY1" in the processor authentication information column of the entry associated with the memory identifier of the first memory 220a in the processor-side authentication information storage table 217 (step S323).

When the activation suspension controlling unit 214 decides that the first processor authentication information "KEY1" is not transferred in plural divided sections (No in step S321), the activation suspension controlling unit 214 stores the transferred first processor authentication information "KEY1" in the processor authentication information column of the entry associated with the memory identifier of the first memory 220a in the processor-side authentication information storage table 217 (step S323). The processor 210 similarly performs the above-described process with the second memory 220b, and stores the second processor authentication information "KEY2" in the processor authentication information column of the entry associated with the memory identifier of the second memory 220b in the processor-side authentication information storage table 217.

Figure 11:
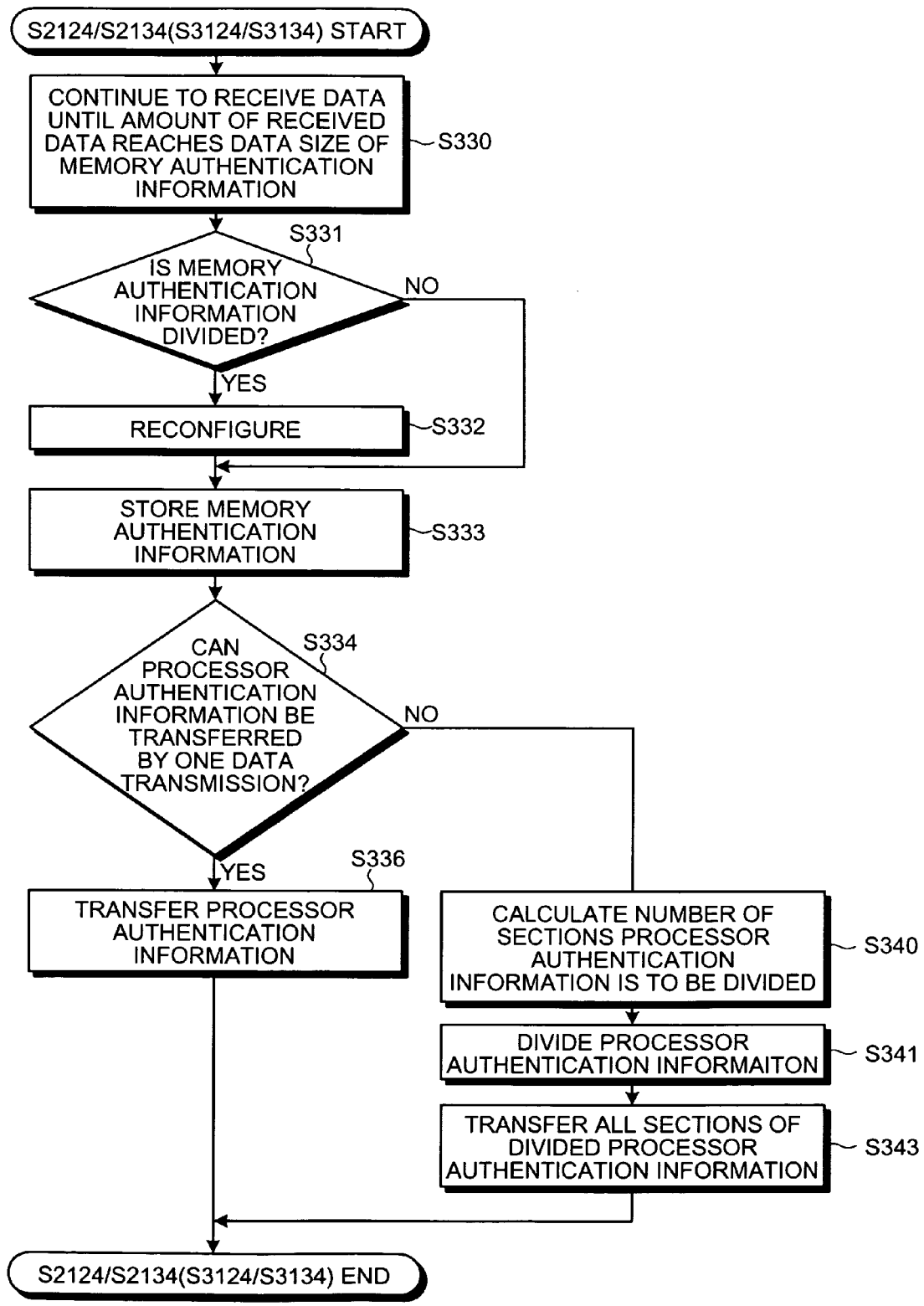
FIG. 11 is a flowchart of an authentication information sharing process according to the second embodiment.

FIG. 11 is a flowchart of the authentication information exchanging process (step S2124) with the processor 210 by the first memory 220a in the computer system 200 of the second embodiment. The authentication information exchanging process (step S2124) is performed in place of the authentication information exchanging process (step S124) with the processor 10 of the first embodiment described with reference to FIG. 3.

The first activation suspension controlling unit 224a continues to receive data transferred from the activation suspension controlling unit 214 until the amount of received data reaches the size of the first memory authentication information (step S330). Then, the first activation suspension controlling unit 224a decides whether the first memory authentication information "KEY3" is transferred in plural divided sections from the activation suspension controlling unit 214 or not. When the first memory authentication information "KEY3" is transferred in plural divided sections (Yes in step S331), the first activation suspension controlling unit 224a reconfigures the first memory authentication information from the divided sections (step S332). The reconfigured first memory authentication information is stored in the first authentication information storing unit 226a (step S333).

On the other hand, when the first memory authentication information is not transferred in plural divided sections from the activation suspension controlling unit 214 (No in step S331), the transferred data is stored in the first authentication information storing unit 226a as it is as the first memory authentication information (step S333).

Then, the first activation suspension controlling unit 224a decides whether the first processor authentication information "KEY1" can be transferred by one data transmission over the bus 240 based on the data length of the first processor authentication information "KEY1" and the number of data lines connected to the bus 240 and the first memory 220a, i.e., the data width.

When the first activation suspension controlling unit 224a decides that the first processor authentication information "KEY1" can be transferred by one data transmission (Yes in step S334), the first processor authentication information "KEY1" is transferred to the activation suspension controlling unit 214 of the processor 210 over the bus 240 (step S336).

When the first activation suspension controlling unit 224a decides that the first processor authentication information "KEY1" cannot be transferred by one data transmission (No in step S334), the first activation suspension controlling unit 224a calculates the number of sections the first processor authentication information "KEY1" is to be divided based on the bus information and the data length of the first processor authentication information "KEY1" (step S340). The number of sections is the number of necessary transmissions for the transfer of the first processor authentication information "KEY1" over the bus 240.

Then the first processor authentication information "KEY1" to be transferred is divided into sections of the number calculated in step S340 (Step S341).

Thereafter, the first activation suspension controlling unit 224a creates data for transfer from the divided first processor authentication information "KEY1". The data for transfer is transferred to the activation suspension controlling unit 214 of the processor 210 over the bus 240 (step S343). Thus, the processing by the first memory 220a completes in the authentication information sharing process between the processor 210 and the first memory 220a (step S2124).

The authentication information sharing process between the second memory 220b and the processor 210 (step S2134) is similar to the authentication information sharing process (step S2124) between the first memory 220a and the processor 210 described with reference to FIG. 11. Through the authentication information sharing process, the second memory 220b acquires the second memory authentication information from the processor 210 and stores the second memory authentication information in the second authentication information storing unit 226b. Further, the second memory 220b transfers the second processor authentication information to the processor 210.

In the second embodiment, each of the first processor authentication information and the second processor authentication information is N-bit in size. Further, the data width of each of the bus 240, the first memory 220a, and the second memory 220b is N-bit. Hence, when the bus 240 is used for data transfer, both the first processor authentication information and the second processor authentication information can be transferred to the activation suspension controlling unit 214 by one data transmission. Since the information can be transferred by one data transmission (Yes in step S334), the process proceeds to step S336.

Figure 12:
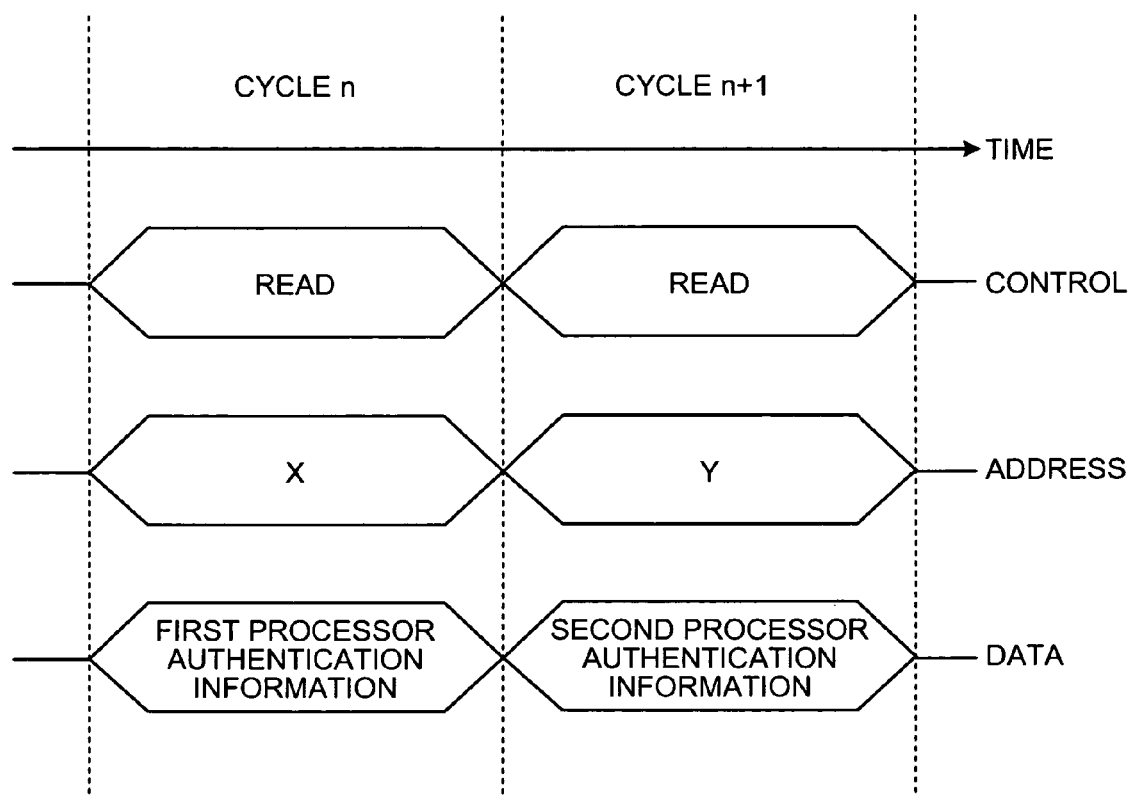
FIG. 12 is a schematic diagram showing how first processor authentication information is transferred, and second processor authentication information is transferred.

FIG. 12 schematically shows how the bus 240 is used when the first processor authentication information is transferred from the first activation suspension controlling unit 224a to the activation suspension controlling unit 214 and the second processor authentication information is transferred from the second activation suspension controlling unit 224b to the activation suspension controlling unit 214.

The activation suspension controlling unit 214 allocates X, and the reading instruction (READ) respectively as the address signal and the control signal in cycle n. Accordingly, the first activation suspension controlling unit 224a transfers the first processor authentication information to the activation suspension controlling unit 214. The activation suspension controlling unit 214 further allocates Y and the reading instruction (READ) as the address signal and the control signal in cycle n+1. Accordingly, the second activation suspension controlling unit 224b transfers the second processor authentication information to the activation suspension controlling unit 214. Through the above-described process, the processor 210 acquires the first processor authentication information and the second processor authentication information respectively from the first memory 220a and the second memory 220b.

Figure 13:
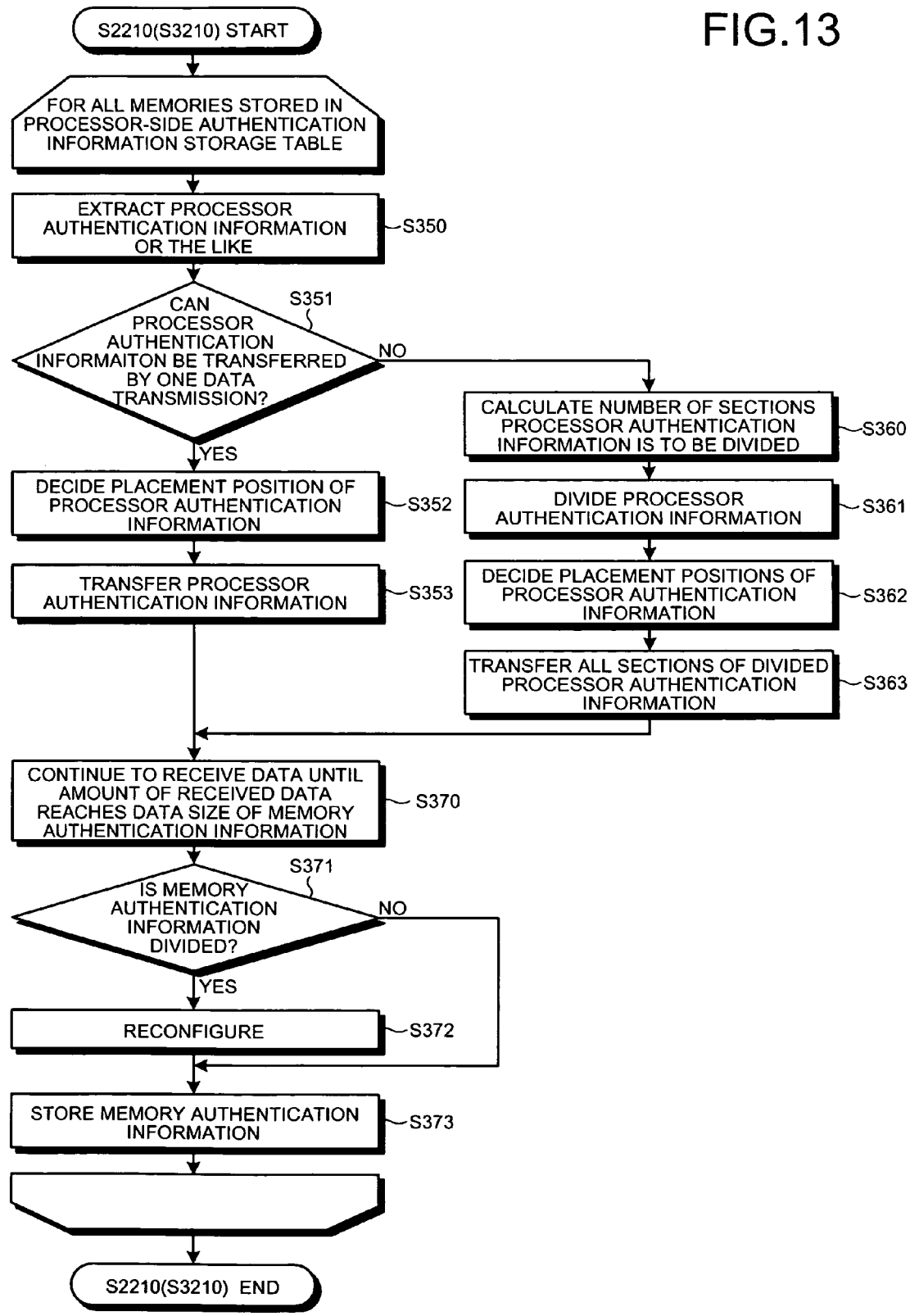
FIG. 13 is a flowchart of an authentication information exchanging process in the second embodiment.

FIG. 13 is a flowchart of an authentication information exchanging process (step S2210) performed with all memories by the processor 210 when the power supply resumes in the computer system 200 of the second embodiment. The authentication information exchanging process (step S2210) is performed in place of the authentication information exchanging process (step S210) of the first embodiment described with reference to FIG. 4.

The activation suspension controlling unit 214 performs a following process to transfer the processor authentication information corresponding to all memories stored in the processor-side authentication information storage table 217. In the second embodiment, the process is performed so that the first processor authentication information "KEY1" and the second processor authentication information "KEY2" are transferred to the memories connected to the processor 210, i.e., the first activation suspension controlling unit 224a and the second activation suspension controlling unit 224b, respectively.

First, the processor authentication information stored in association with the first memory 220a, i.e., the first processor authentication information "KEY1", the processor authentication information length of the first processor authentication information, i.e., data length, and the bus information are extracted from the processor-side authentication information storage table 217 (step S350). Then, the data width in the extracted bus information is compared with the data length of the first processor authentication information "KEY1". The activation suspension controlling unit 214 decides whether the first processor authentication information "KEY1" can be transferred by one data transmission over the bus 240 or not.

When the activation suspension controlling unit 214 decides that the first processor authentication information "KEY1" can be transferred by one data transmission (Yes in step S351), the activation suspension controlling unit 214 decides a placement position of the first processor authentication information "KEY1" based on the connection information included in the bus information (step S352). The activation suspension controlling unit 214 creates data for transfer by placing the first processor authentication information "KEY1" at the decided placement position.

The created transfer data, i.e., the first processor authentication information "KEY1" is transferred to the first activation suspension controlling unit 224a of the first memory 220a over the bus 240 (step S353). The first memory 220a is designated as an address over the bus 240 when the processor authentication information storing position information stored in the processor-side authentication information storage table 217 is designated as an address.

When the activation suspension controlling unit 214 decides that the data cannot be transferred by one data transmission (No in step S351), the activation suspension controlling unit 214 calculates the number of sections the first processor authentication information "KEY1" is to be divided based on the connection information and the data length of the first processor authentication information "KEY1" (step S360). The number of sections is the number of necessary transmissions for the transfer of the first processor authentication information "KEY1" over the bus 240.

Then the activation suspension controlling unit 214 divides the first processor authentication information "KEY1" to be transferred into the number calculated in step S360 (step S361). Then, the activation suspension controlling unit 214 decides placement positions of the divided sections of the first processor authentication information "KEY1" in the data to be transferred over the bus 240 (step S362). Then, the divided first processor authentication information "KEY1" is placed at decided placement positions and transferred to the first activation suspension controlling unit 224a of the first memory 220a over the bus 240 (Step S363).

The processor 210 performs the above-described process with the second memory 220b, to transfer the second processor authentication information "KEY2" stored in association with the memory identifier "MEMORY02" of the second memory 220b in the processor-side authentication information storage table 217 to the second memory 220b.

In the computer system 200 of the second embodiment, each of the processor authentication information "KEY1" and "KEY2" is N-bit in size. Further, the data width of each of the bus 240, the first memory 220a, and the second memory 220b is N-bit. Hence, when the bus 240 is employed for data transfer, the processor authentication information "KEY1" and "KEY2" can be transferred respectively to the first activation suspension controlling unit 224a and the second activation suspension controlling unit 224b by one data transmission.

Since the data can be transferred by one data transmission (Yes in step S351), the processes in step S352 and step S353 are performed on both of the first activation suspension controlling unit 224a and the second activation suspension controlling unit 224b.

Here, since the data width of the first memory 220a is N-bit, when the first processor authentication information "KEY1" is placed over all of the data lines of the bus 240, the first processor authentication information "KEY1" can be transferred to the first activation suspension controlling unit 224a.

In other words, the activation suspension controlling unit 214 places the N-bit first processor authentication information "KEY1" over all of the data lines of the bus 240 to transfer the first processor authentication information "KEY1" to the first activation suspension controlling unit 224a. Similarly, the activation suspension controlling unit 214 places the N-bit second processor authentication information "KEY2" over all of the data lines of the bus 240 to transfer the second processor authentication information "KEY2" to the second activation suspension controlling unit 224b.

On data transfer, the activation suspension controlling unit 214 designates the processor authentication information storing position information stored in the processor-side authentication information storage table 217 as the address. Thus, the activation suspension controlling unit 214 can designate the first activation suspension controlling unit 224a and the second activation suspension controlling unit 224b as the addresses of the data transfer over the bus 240.

When the transfer is completed (step S353, step S363), the activation suspension controlling unit 214 continues to receive the memory authentication information until the amount of received data reaches the data size of the memory authentication information (step S370). Then, the activation suspension controlling unit 214 decides whether the received memory authentication information is transferred in plural divided sections.

When the memory authentication information is transferred in plural divided sections (Yes in step S371), the activation suspension controlling unit 214 takes out the divided sections of the memory authentication information from the received data from the placement positions determined by the connection information stored in the processor-side authentication information storage table 217, and reconfigures the memory authentication information (step S372). Then the reconfigured memory authentication information is stored in the memory authentication information column of the entry associated with the memory identifier of the pertinent memory in the processor-side authentication information storage table 217 of the authentication information storing unit 216 (step S373).

When the activation suspension controlling unit 214 decides that the memory authentication information is not transferred in plural divided sections in step S371 (No in step S371), the received memory authentication information is stored in the memory authentication information column of the entry associated with the memory identifier of the pertinent memory in the processor-side authentication information storage table 217 of the authentication information storing unit 216 (step S373).

The above-described process (from step S370 to step S373) is performed between the processor 210 and each of the first activation suspension controlling unit 224a and the second activation suspension controlling unit 224b. As a result, the processor acquires the first memory authentication information from the first activation suspension controlling unit 224a and the second memory authentication information from the second activation suspension controlling unit 224b.

Figure 14:
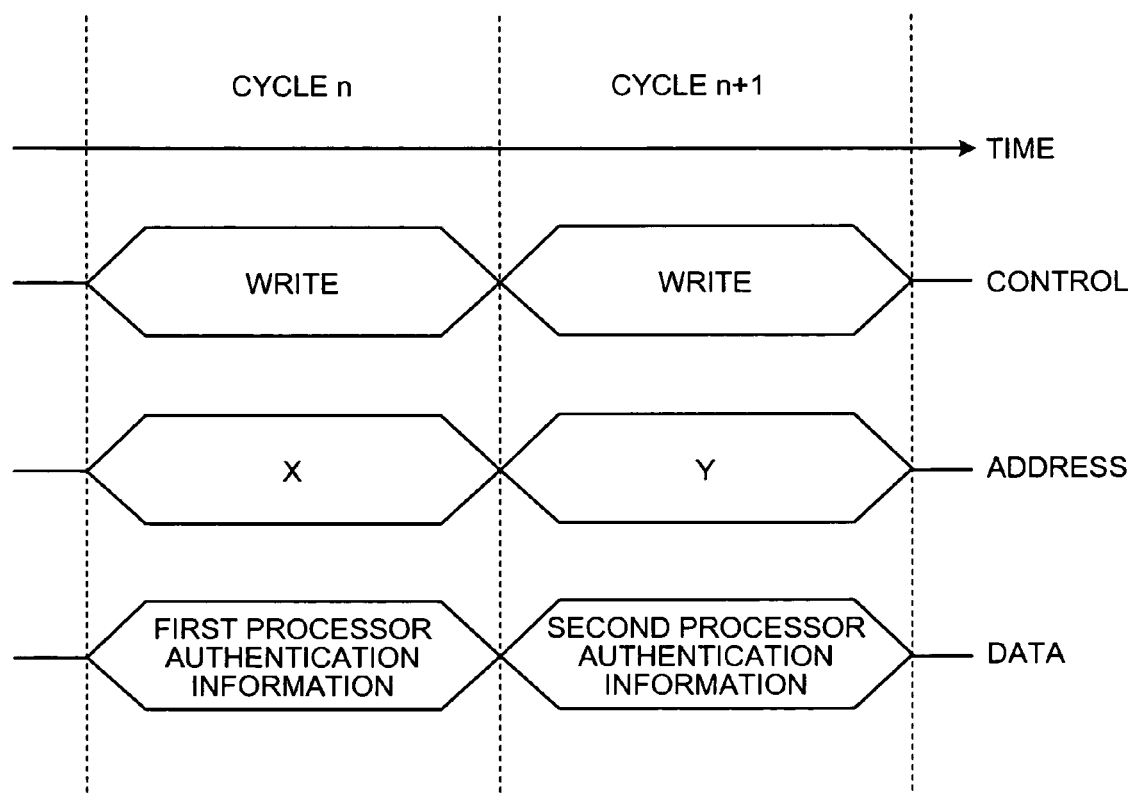
FIG. 14 is a schematic diagram showing how the activation suspension controlling unit transfers the processor authentication information.

FIG. 14 schematically shows how the bus 240 is used when the activation suspension controlling unit 214 transfers the processor authentication information to the first and the second activation suspension controlling units 224a and 224b.

The activation suspension controlling unit 214 allocates X, the first processor authentication information, and the writing instruction (WRITE) respectively as the address signal, the data signal, and the control signal. Accordingly, the first processor authentication information "KEY1" is transferred to the first activation suspension controlling unit 224a. Further, the activation suspension controlling unit 214 allocates Y, the second processor authentication information, and the writing instruction (WRITE) respectively as the address signal, the data signal, and the control signal. Accordingly, the second processor authentication information "KEY2" is transferred to the second activation suspension controlling unit 224b.

Figure 15:
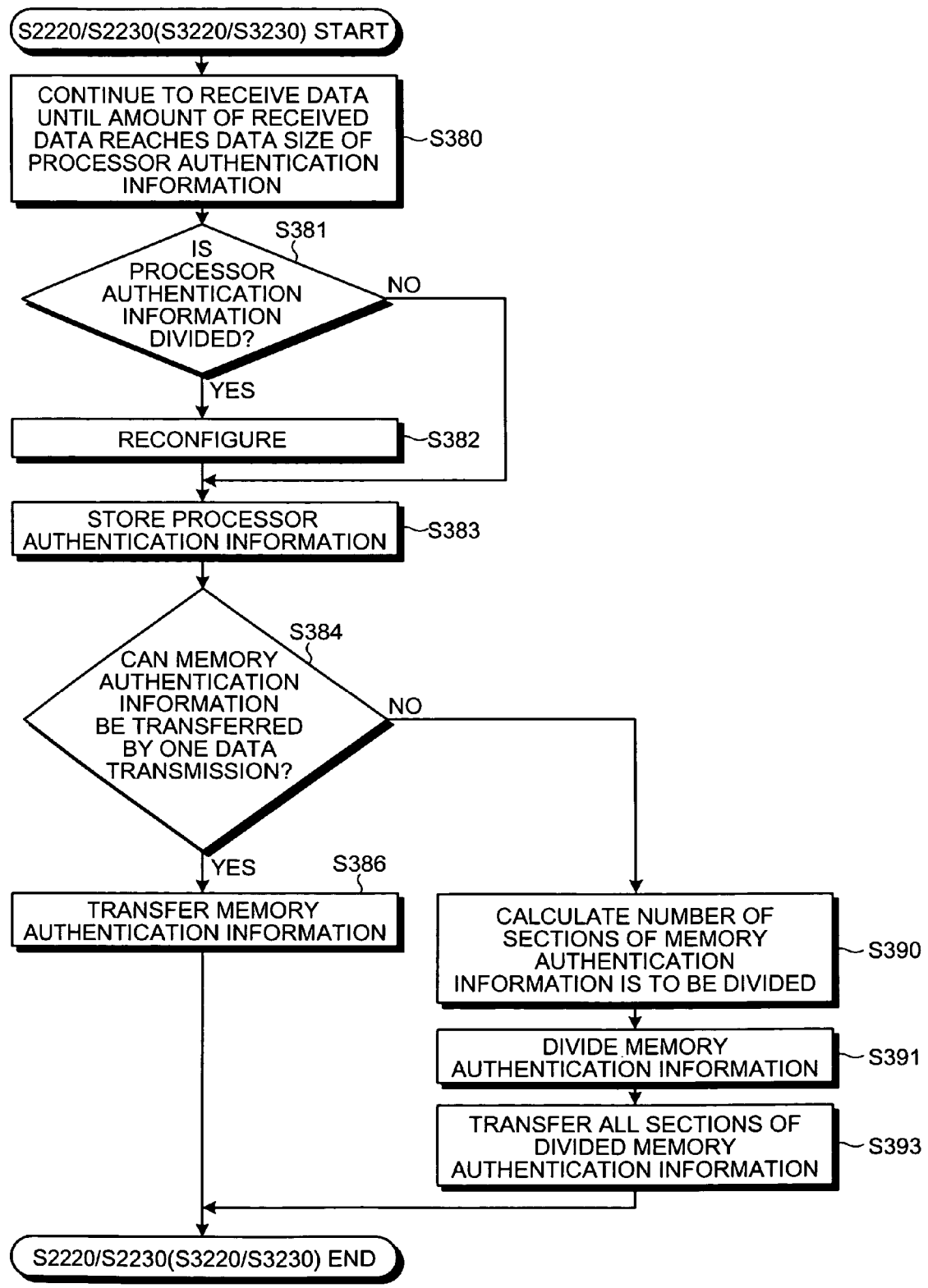
FIG. 15 is a flowchart of an authentication information exchanging process according to the second embodiment.

FIG. 15 is a flowchart of an authentication information exchanging process (step S2220) with the processor 210 performed by the first memory 220a when the power supply resumes in the computer system 200 of the second embodiment. The authentication information exchanging process (step S2220) is performed in place of the authentication information exchanging process (step S220) of the first embodiment described with reference to FIG. 4.

The first activation suspension controlling unit 224a continues to receive the data transferred from the activation suspension controlling unit 214 until the amount of received data reaches the size of the first processor authentication information "KEY1" (step S380). Then, the first activation suspension controlling unit 224a decides whether the first processor authentication information "KEY1" is transferred in plural divided sections from the activation suspension controlling unit 214 or not.

When the first processor authentication information "KEY1" is transferred in plural divided sections (Yes in step S381), the first activation suspension controlling unit 224a reconfigures the first processor authentication information "KEY1" from the divided sections (step S382). The reconfigured first processor authentication information "KEY1" is stored in the first authentication information storing unit 226a (step S383).

On the other hand, when the first processor authentication information "KEY1" is not transferred in plural divided sections from the activation suspension controlling unit 214 (No in step S381), the received data is stored in the first authentication information storing unit 226a as the first processor authentication information "KEY1" (step S383).

Then, the first activation suspension controlling unit 224a decides whether the first memory authentication information stored in the first authentication information storing unit 226a can be transferred to the processor 210 by one data transmission over the bus 240 based on the data length of the first memory authentication information stored in the first authentication information storing unit 226a and the connection information concerning the connection between the first memory 220a and the bus 240.

When the first activation suspension controlling unit 224a decides that the first memory authentication information can be transferred by one data transmission (Yes in step S384), the first memory authentication information is transferred to the activation suspension controlling unit 214 of the processor 210 over the bus 240 (step S386).

When the first activation suspension controlling unit 224a decides that the first memory authentication information cannot be transferred by one data transmission (No in step S384), the first activation suspension controlling unit 224a calculates the number of sections the first memory authentication information is to be divided into based on the connection information and the size of the first memory authentication information (step S390). The number of sections is the number of necessary transmissions for the transfer of the first memory authentication information over the bus 240.

The first activation suspension controlling unit 224a divides the first memory authentication information to be transferred into the number calculated in step S390 (step S391). Then, the first activation suspension controlling unit 224a creates data for transfer from the divided first memory authentication information and transfers the created data to the activation suspension controlling unit 214 of the processor 210 over the bus 240 (step S393).

The second memory 220b performs the above-described process with the processor 210 to acquire the second processor authentication information "KEY2" and stores the same in the second authentication information storing unit 226b. Further, the second memory 220b transfers the second memory authentication information stored in the second authentication information storing unit 226b to the processor 210.

An authentication information sharing process (step S2230) with the processor 210 executed by the second memory 220b in the second embodiment is similar to the authentication information sharing process (step S2220) with the processor 210 by the first memory 220a of the second embodiment.

In the second embodiment, each of the first memory authentication information and the second memory authentication information is N-bit in size, and the data width of each of the bus 240, the first memory 220a, the second memory 220b is N-bit. Hence, when the bus 240 is employed, each of the first memory authentication information and the second memory authentication information can be transferred to the activation suspension controlling unit 214 by one data transmission. Since the data can be transferred by only one transmission (Yes in step S384), the process proceeds to step S386.

Figure 16:
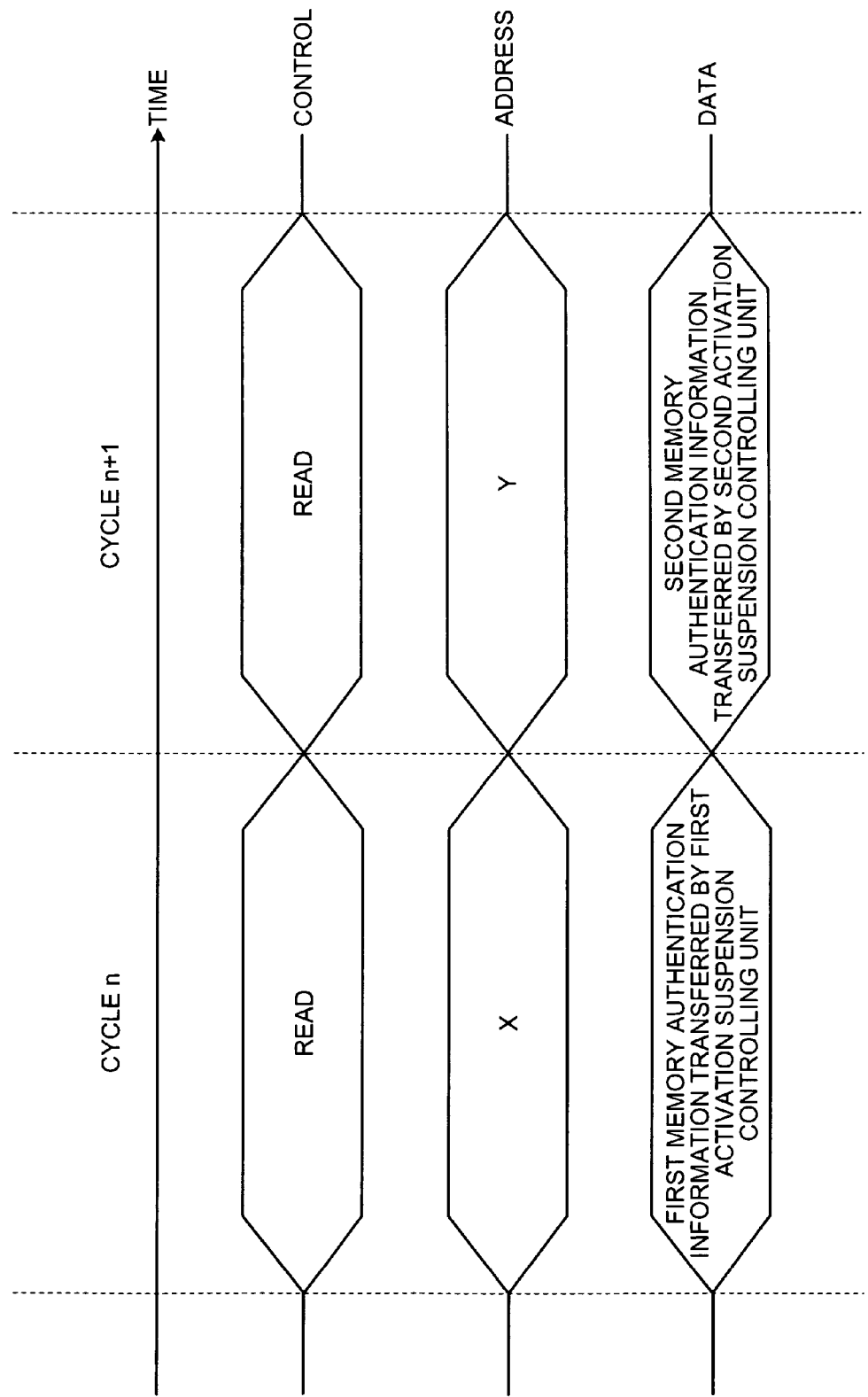
FIG. 16 is a schematic diagram showing how the memory authentication information is transferred.

FIG. 16 schematically shows how the bus 240 is used when the first memory authentication information is transferred from the first activation suspension controlling unit 224a to the activation suspension controlling unit 214 and the second memory authentication information is transferred from the second activation suspension controlling unit 224b to the activation suspension controlling unit 214.

The activation suspension controlling unit 214 allocates X, and the reading instruction (READ) respectively as the address signal and the control signal in cycle n. Accordingly, the first activation suspension controlling unit 224a transfers the first memory authentication information. Further, the activation suspension controlling unit 214 allocates Y and the reading instruction (READ) as the address signal and the control signal in cycle n+1. Accordingly, the second activation suspension controlling unit 224b transfers the second memory authentication information. Through the above-described process, the memory authentication information sharing process between the processor 210 and the first memory 220a, and between the processor 210 and the second memory 220b completes.

The configuration and the process of the computer system 200 according to the second embodiment are the same as those of the computer system 100 according to the first embodiment if not specified otherwise above.

In the computer system 200 according to the second embodiment, whether to divide the authentication information to be transferred or not is decided in step S301 and whether the received authentication information is divided or not is decided in step S321 as shown in FIG. 9 in the authentication information sharing process (step S2114) of the second embodiment.

As a modification of the second embodiment, the deciding processes of step S301 and step S302 may not be performed when it is known at the time of manufacture of the computer system 200 that the authentication information would not be divided and sent by one data transmission according to the connection state between the bus 240 and each of the processor 210, the first memory 220a, and the second memory 220b. In this case, the process proceeds from step S300 to step S302, and from step S320 to step S323.

Similarly, whether the authentication information is divided or not and whether to divide the authentication information are decided respectively in steps S331 and S334 in the authentication information sharing process (step S2124) as shown in FIG. 11. Alternatively, however, the process may proceed directly from step S330 to step S333, and further to step S336.

Similarly in the authentication information exchanging process (step S2210), step S351 and step S371 shown in FIG. 13 may be omitted, so that the process proceeds directly from step S350 to step S352, and from step S370 to step S373.

Similarly in the authentication information exchanging process (step S2220), step S381 and step S384 shown in FIG. 15 may be omitted, so that the process proceeds directly from step S380 to step S383, and further to step S386.

Figure 17:
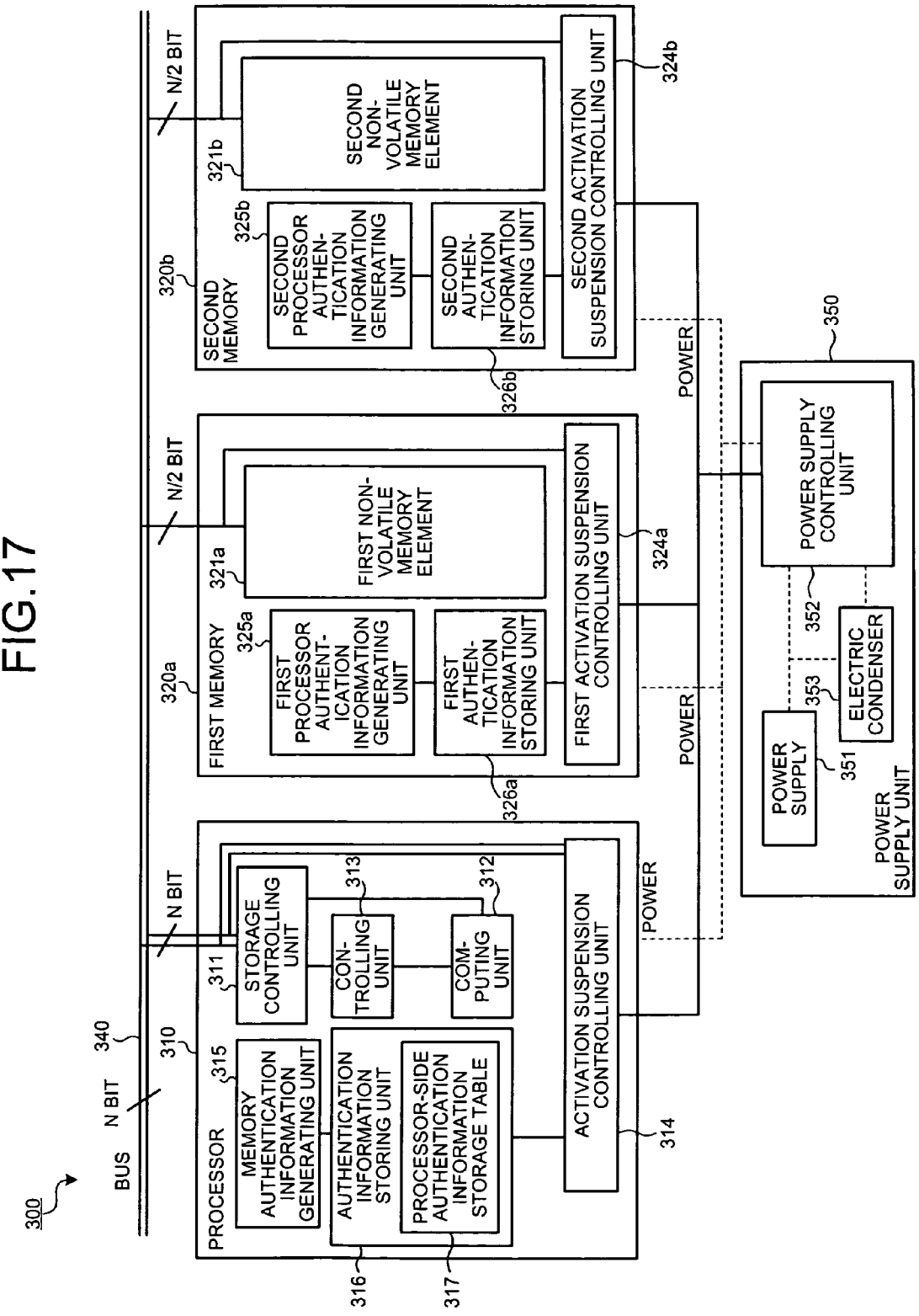
FIG. 17 is a diagram of an overall configuration of a computer system according to a third embodiment.

FIG. 17 is a diagram of an overall configuration of a computer system 300 according to a third embodiment. Configuration of the computer system 300 according to the third embodiment is basically the same as the configuration of the computer system 100 according to the first embodiment of FIG. 1. The computer system 300 includes a processor 310, a first memory 320a, a second memory 320b, a power supply unit 350, and a bus 340. The processor 310 includes a storage controlling unit 311, a computing unit 312, a controlling unit 313, an activation suspension controlling unit 314, a memory authentication information generating unit 315, and an authentication information storing unit 316 which has a processor-side authentication information storage table 317. The first memory 320a has a first non-volatile memory element 321a, a first activation suspension controlling unit 324a, a first processor authentication information generating unit 325a, and a first authentication information storing unit 326a. The second memory 320b includes a second non-volatile memory element 321b, a second activation suspension controlling unit 324b, a second processor authentication information generating unit 325b, and a second authentication information storing unit 326b. The power supply unit 350 has a power supply 351, a power supply controlling unit 352, and an electric condenser 353.

The computer system 300 according to the third embodiment includes N data lines of the bus 340. In other words, the data width of the bus is N-bit.

The processor 310 is connected to the bus 340 by N data lines, whereas the first non-volatile memory element 321a and the second non-volatile memory element 321b are connected to the bus 340 by N/2 data lines. In other words, the number of data lines connecting the bus 340 to each of the first and the second non-volatile memory elements 321a and 321b is half the number of data lines connecting the bus 340 to the processor 310.

More specifically, the data lines connected to the first non-volatile memory element 321a are upper N/2-bit data lines among N data line of the bus 340, which correspond to upper N/2-bit data lines among N data lines connecting the processor 310 and the bus 340. On the other hand, the data lines connected to the second non-volatile memory element 321b are lower N/2-bit data lines among N data lines of the bus 340, which correspond to lower N/2-bit data lines among N data lines connecting the processor 310 and the bus 340.

Figure 18:
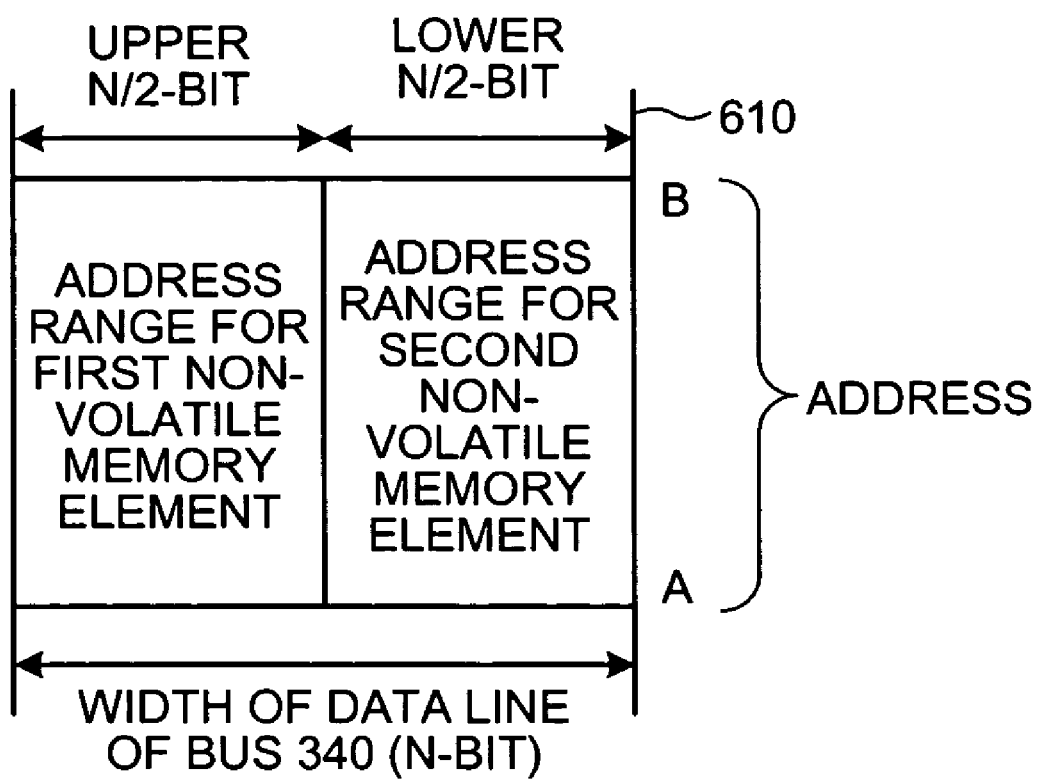
FIG. 18 is a diagram of an address space in the computer system according to the third embodiment.

FIG. 18 shows an address space 610 in the computer system 300 according to the third embodiment. The address space 610 is determined according to a connection manner of each of memories 320a and 320b and the bus 340.

In the address space 610, an N/2-bit address range in the data width direction is allocated to each of the first and the second non-volatile memory elements 321a and 321b as shown in FIG. 18.

When the number of data lines connected to each of the first non-volatile memory element 321a and the second non-volatile memory element 321b is equal to or less than the number of data lines of the bus 340, the address range in the data width direction is allocated to each of the first and the second non-volatile memory elements 321a and 321b based on the number of connected data lines.

In the computer system 300 according to the third embodiment, since the non-volatile memory elements 321a and 321b are connected to the upper N/2-bit and the lower N/2-bit of the bus 340, respectively, when the N-bit data is transmitted from the processor 310 to the bus 340, only the upper N/2-bit of the transmitted data is sent to the first non-volatile memory element 321a, while only the lower N/2-bit of the transmitted data is sent to the second non-volatile memory element 321b.

Further, N/2-bit data transmitted from the first non-volatile memory element 321a to the bus 340 is allocated in the upper N/2-bit of the N-bit data on the bus 340. Hence, the processor 310 must select and extract the upper N/2-bit data on the bus 340 in order to correctly receive the data. Similarly, N/2-bit data transmitted from the second non-volatile memory element 321b to the bus 340 is allocated in the lower N/2-bit of the N-bit data on the bus 340.

Hence, the processor 310 needs to select and extract the lower N/2-bit of the data on the bus 340 in order to correctly receive the data. The processor 310 according to the third embodiment can select and extract the upper N/2-bit or the lower N/2-bit of the data.

FIG. 19 shows a data structure of the processor-side authentication information storage table 317 in the authentication information storing unit 316 of the processor 310 in the computer system 300 according to the third embodiment. The processor-side authentication information storage table 317 according to the third embodiment has the same data structure as the processor-side authentication information storage table 217 according to the second embodiment.

The first memory 320a and the second memory 320b of the third embodiment, however, have different connection states of the bus 340 from the first memory 220a and the second memory 220b of the second embodiment as described with reference to FIG. 18. Hence, the content of the bus information stored in the processor-side authentication information storage table 317 is also different corresponding to the connection state of the bus 340.

Specifically, as shown in FIG. 19, the data width of the data stored in the processor-side authentication information storage table 317 according to the third embodiment is N/2 in each of the first memory 320a and the second memory 320b. Further, the connection information of the first memory 320a is the upper N/2, whereas the connection information of the second memory 320b is the lower N/2.

An authentication information sharing process (step S3114) which is performed by the processor 310 when the power supply stops in the computer system 300 according to the third embodiment will be described. The authentication information sharing process (step S3114) of the third embodiment is performed in place of the authentication information sharing process (step S114) of the first embodiment described with reference to FIG. 3. In the following, the description will be given with reference to FIG. 9.

The activation suspension controlling unit 314 extracts the bus information and the memory authentication information length, i.e., data length, of the first memory authentication information from the processor-side authentication information storage table 317. In the third embodiment, the data width of the bus 340 is N-bit, the data width of the first memory 320a is N/2-bit, and the data length of the first memory authentication information is N-bit. Hence, the first memory authentication information cannot be transferred to the first activation suspension controlling unit 324a by one data transmission over the bus 340 (No in step S301), and the number of sections the first memory authentication information is to be divided into is calculated (step S310).

Specifically, the data length of the first memory authentication information is N-bit, and the data width of the first memory 320a is N/2-bit. In other words, the bit number of the first memory authentication information is twice the data width of the first memory 320a. Hence, the number of sections the first memory authentication information is to be divided into is calculated as "2". Then, the first memory authentication information is actually divided into two sections (step S311).

Then, the placement position of the first memory authentication information is decided (step S312). Specifically, the placement position of the data is decided for the data transfer to the first activation suspension controlling unit 324a. Since the first activation suspension controlling unit 324a is connected to the upper N/2-bit of the bus 340, the upper N/2-bit of the N-bit data to be transmitted over the bus 340 is decided to be the placement position of the first memory authentication information for the data transfer to the first activation suspension controlling unit 324a (step S312). Then, the divided pieces of the first memory authentication information are allocated to the upper N/2-bit of the N-bit data, and the thus generated data is transferred (step S313).

The processor 310 further performs the above-described process with the second memory 320b, and transfers the second memory authentication information to the second memory 320b.

To designate the first activation suspension controlling unit 324a as the destination of data transfer over the bus 340, the activation suspension controlling unit 314 designates the processor authentication information storing position information stored in association with the first memory 320a in the processor-side authentication information storage table 317 as the address. Preferably, the lower N/2-bit where no data is stored in the N-bit data transmitted over the bus 340 is filled with zero (0) for security.

Then, the activation suspension controlling unit 314 performs a following process on the first processor authentication information "KEY1" transferred over the bus 340 from the first activation suspension controlling unit 324a. The activation suspension controlling unit 314 identifies that the data length of the first processor authentication information "KEY1" is N-bit based on the processor authentication information length stored in association with the first memory 320a in the processor-side authentication information storage table 317. Further, the activation suspension controlling unit 314 identifies the data width of the first memory 320a as N/2-bit based on the data width stored in association with the first memory 320a in the processor-side authentication information storage table 317.

Based on the above information, the activation suspension controlling unit 314 decides that the transfer of the first processor authentication information "KEY1" is not completed by one data transmission and decides that two transmissions are required for the completion of the transfer of the first processor authentication information "KEY1". Thus, the activation suspension controlling unit 314 receives the first processor authentication information "KEY1" by two data transmissions (step S320).

Since the first processor authentication information "KEY1" is divided into two sections (Yes in step S321), the activation suspension controlling unit 314 reconfigures the first processor authentication information "KEY1" (step S322) therefrom.

Specifically, the activation suspension controlling unit 314 decides that the first processor authentication information "KEY1" transferred from the first memory 320a is allocated to the upper N/2-bit of the N-bit data transmitted over the bus 340 based on the connection information stored in association with the first memory 320a in the processor-side authentication information storage table 317. Thus, the activation suspension controlling unit 314 reconfigures the first processor authentication information "KEY1" by extracting the divided sections thereof from the upper N/2-bit of the received N-bit data.

Then, the reconfigured first processor authentication information "KEY1" is stored in the processor authentication information column of the entry indicated by the memory identifier "MEMORY01" of the first memory 320a in the processor-side authentication information storage table 317 (step S323).

The processor 310 similarly performs the above-described process with the second memory 320b. The processor 310 acquires the second processor authentication information "KEY2" from the second activation suspension controlling unit 324b and stores the acquired information in the processor authentication information column of the entry indicated by the memory identifier "MEMORY02" of the second memory 320b in the processor-side authentication information storage table 317.

Figure 20:
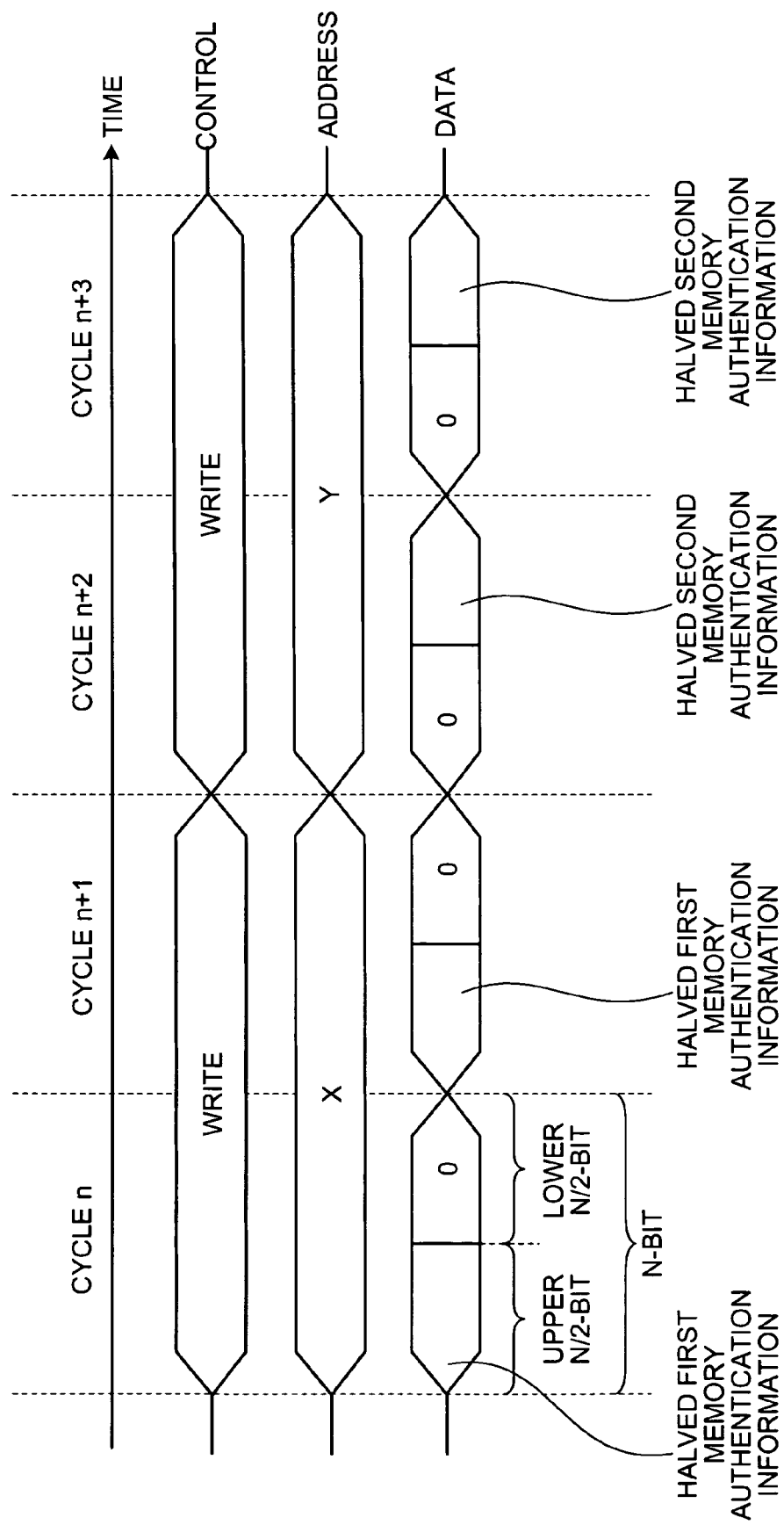
FIG. 20 is a schematic diagram showing how the memory authentication information is transferred.

FIG. 20 schematically shows how the bus 340 is used when the first memory authentication information is transferred from the activation suspension controlling unit 314 to the first activation suspension controlling unit 324a and the second memory authentication information is transferred from the activation suspension controlling unit 314 to the second activation suspension controlling unit 324b.

The activation suspension controlling unit 314 allocates X and the writing instruction (WRITE) respectively as the address signal and the control signal over cycle n to cycle n+1. Further, the activation suspension controlling unit 314 allocates the N-bit data as the data signal in each of the cycle n and n+1. Each of the N-bit data includes one of the halved first memory authentication information in the upper N/2-bit portion thereof. Thus, the activation suspension controlling unit 314 transfers the first memory authentication information to the first activation suspension controlling unit 324a. Similarly, the activation suspension controlling unit 314 allocates Y and the writing instruction (WRITE) respectively to the address signal and the control signal over cycle n+2 to cycle n+3. Further the activation suspension controlling unit 314 allocates N-bit data as the data signal in each of the cycle n+2 and N+3. Each of the N-bit data includes one of the halved second memory authentication information in the lower N/2-bit portion thereof.

Through the above-describe process, the sharing of the first memory authentication information between the processor 310 and the first memory 320a, and the sharing of the second memory authentication information between the processor 310 and the second memory 320b are finished.

Next, an authentication information sharing process (step S3124) between the first memory 320a and the processor 310 at the time of power supply suspension in the computer system 300 of the third embodiment will be described. The authentication information sharing process (step S3124) of the third embodiment is performed in place of the authentication information sharing process (step S124) of the first embodiment described with reference to FIG. 3. The authentication information sharing process (step S3124) of the third embodiment will be described with reference to FIG. 11.

The first activation suspension controlling unit 324a receives N/2-bit at most by one transmission when the bus 340 is employed for data transmission. Hence, the first activation suspension controlling unit 324a continues to receive the data transmitted over the bus 340 until the amount of received data reaches the amount of the N-bit first memory authentication information (step S330). Then, the first activation suspension controlling unit 324a decides whether the first memory authentication information is transmitted in plural divided sections from the activation suspension controlling unit 314.

The first memory authentication information is N-bit in data length, and the first memory 320a has data width of N/2-bit. Hence the first activation suspension controlling unit 324a decides that the first memory authentication information is transmitted in plural divided sections (Yes in step S331), and reconfigures the first memory authentication information from the received data (step S332). The reconfigured data is stored in the first authentication information storing unit 326a as the first memory authentication information (step S333).

Then, the activation suspension controlling unit 314 and the first activation suspension controlling unit 324a share the processor authentication information. First, it is decided whether the first processor authentication information "KEY1" can be transmitted over the bus 340 by one data transmission or not.

The data length of the first processor authentication information "KEY1" is N-bit, and the data width of the first memory 320a is N/2-bit. Hence, it is decided that the first processor authentication information "KEY1" cannot be transferred over the bus 340 by one data transmission (No in step S334).

Then, the number of sections the first processor authentication information "KEY1" is to be divided into is calculated (step S340). Specifically, the number is calculated as "2" based on the data length (N-bit) of the first processor authentication information "KEY1" and the data width (N/2-bit) of the first memory 320a. Then, the first processor authentication information "KEY1" is divided into two sections (step S341). Each of the two divided sections of the first processor authentication information is transferred to the activation suspension controlling unit 314 by one data transmission (step S343).

The authentication information sharing process (step S3134) between the second memory 320b and the processor 310 according to the third embodiment is similar to the authentication information sharing process (step S3124) between the first memory 320a and the processor 310 according to the third embodiment.

Figure 21:
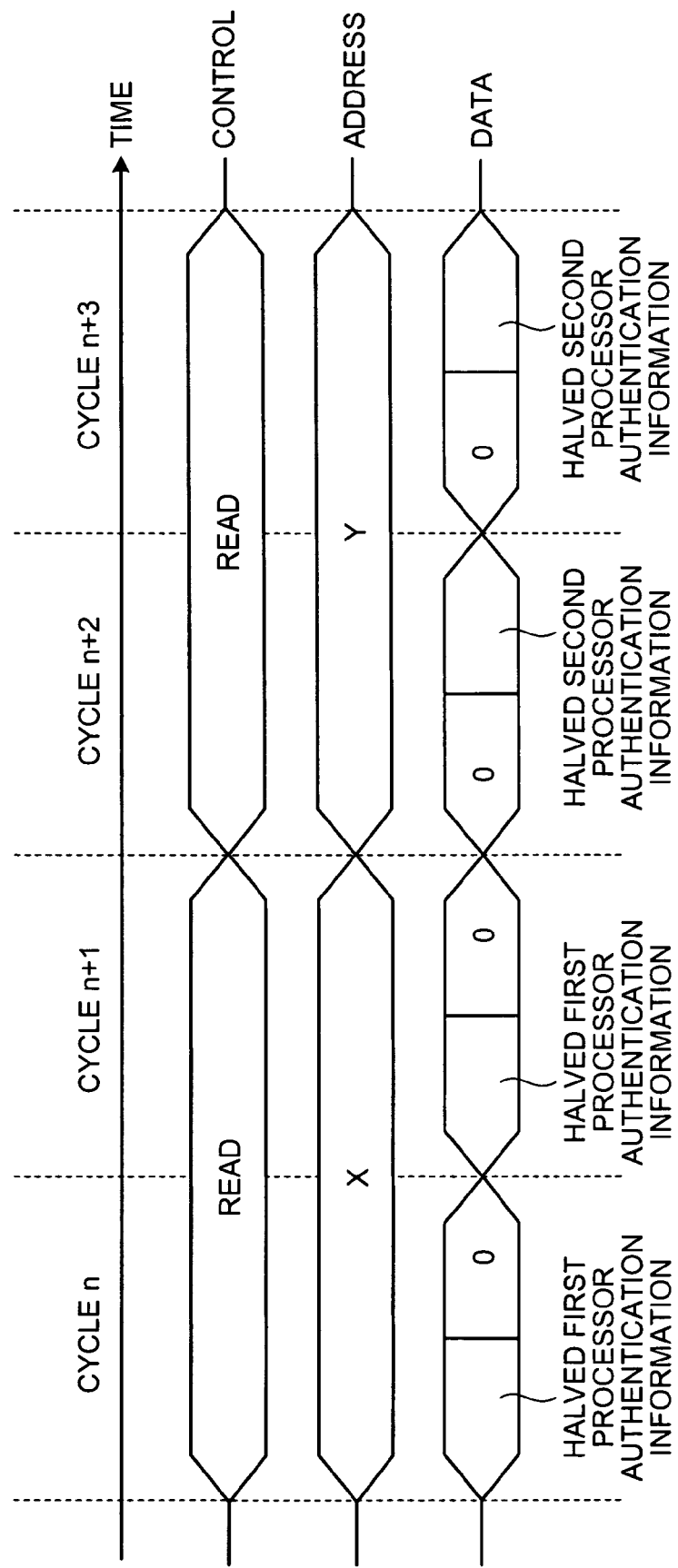
FIG. 21 is a schematic diagram showing how first processor authentication information is transferred.

FIG. 21 schematically shows how the bus 340 is used when the first processor authentication information "KEY1" and the second processor authentication information "KEY2" are transferred respectively from the first activation suspension controlling unit 324a and the second activation suspension controlling unit 324b to the activation suspension controlling unit 314.

The activation suspension controlling unit 314 allocates X and the reading instruction (READ) respectively as the address signal and the control signal over the cycle n to the cycle n+1. Accordingly, the first activation suspension controlling unit 324a transmits the halved sections of the first processor authentication information "KEY1" in cycles n and n+1. Further, the activation suspension controlling unit 314 allocates Y and the reading instruction (READ) respectively as the address signal and the control signal over the cycle n+2 to the cycle n+3. Accordingly, the second activation suspension controlling unit 324b transfers halved sections of the second processor authentication information "KEY2" in the cycles n+2 and n+3. The activation suspension controlling unit 314 receives the divided data sections and reconfigures the first processor authentication information "KEY1" and the second processor authentication information "KEY2" therefrom.

Thus, the sharing of the first processor authentication information "KEY1" between the processor 310 and the first memory 320a is finished, while the sharing of the second processor authentication information "KEY2" between the processor 310 and the second memory 320b is finished.

An authentication information exchanging process (step S3210) performed between the processor 310 and the first memory 320a in the computer system 300 according to the third embodiment when the power supply resumes will be described. The authentication information exchanging process (step S3210) of the third embodiment is performed in place of the authentication information exchanging process (step S210) of the first embodiment described with reference to FIG. 4. Here, the authentication information exchanging process (step S3210) of the third embodiment is described with reference to FIG. 13.

First, the activation suspension controlling unit 314 performs the following process for the transmission of the first processor authentication information "KEY1" stored in the authentication information storing unit 316 to the first memory 320a.

Specifically, the activation suspension controlling unit 314 extracts the bus information stored in association with the first memory 320a in the processor-side authentication information storage table 317 (step S350). Then, the activation suspension controlling unit 314 extracts the processor authentication information length stored in association with the first memory 320a in the processor-side authentication information storage table 317. The activation suspension controlling unit 314 decides whether the first processor authentication information "KEY1" can be transferred by one data transmission or not based on the extracted information.

In the third embodiment, the data length of the first processor authentication information is N-bit, the bus width of the first memory 320a is N/2-bit, and the data width of the bus 340 is N-bit. Hence, it is decided that the first processor authentication information "KEY1" cannot be transferred by one data transmission over the bus 340 (No in step S351), and the process proceeds to step S360.

Here, the data length of the first processor authentication information "KEY1" is N-bit, and the data width of the memory 320 is N/2-bit. Hence, the number of sections the first processor authentication information "KEY1" is to be divided into is calculated as two (step S360), and the first processor authentication information "KEY1" is actually divided into two sections (step S361).

Then, the placement positions of the first processor authentication information "KEY1" are decided based on the bus information stored in association with the first memory 320a in the processor-side authentication information storage table 317 (step S362).

Specifically, it can be seen that the first memory 320a is connected to the upper N/2-bit of the bus 340 according to the bus information. Hence, the upper N/2-bit of the N-bit data transmitted over the bus 340 is decided to be the placement position of the data for the data transmission to the first activation suspension controlling unit 324a.

Then, each of the halved sections of the first processor authentication information "KEY1" is arranged in the upper N/2-bit of the N-bit data and two pieces of N-bit data are created. Each of the created two pieces of data is transmitted over the bus 340 to the first activation suspension controlling unit 324a (step S363). The processor 310 similarly performs the above-described process with the second memory 320b.

After the transmission is completed (step S363), the activation suspension controlling unit 314 continues to receive the transmitted data until the amount of received data reaches the data size of the first memory authentication information (step S370). Then, the activation suspension controlling unit 314 decides whether the first memory authentication information is transmitted in plural divided sections or not.

Specifically, the activation suspension controlling unit 314 decides that the first memory authentication information is transmitted by two transmissions because the data length of the first memory authentication information generated by the memory authentication information generating unit 315 is N-bit according to the processor-side authentication information storage table 317, and the data width of the first memory 320a is N/2-bit according to the processor-side authentication information storage table 317 (Yes in step S371).

Further, the activation suspension controlling unit 314 decides that the data transmitted from the first activation suspension controlling unit 324a is placed in the upper N/2-bit of the N-bit data transmitted over the bus 340. The activation suspension controlling unit 314 then extracts the first memory authentication information from the upper N/2-bit of the received N-bit data. Then, the activation suspension controlling unit 314 reconfigures the first memory authentication information from the received data (step S372).

Then, the reconfigured first memory authentication information is stored in the memory authentication information column of the entry identified by the identifier "MEMORY01" of the memory 320a in the processor-side authentication information storage table 317 of the authentication information storing unit 316 (step S373). The processor 310 similarly performs the above-describe process with the second activation suspension controlling unit 324b, to share the second memory authentication information with the second processor authentication information.

Figure 22:
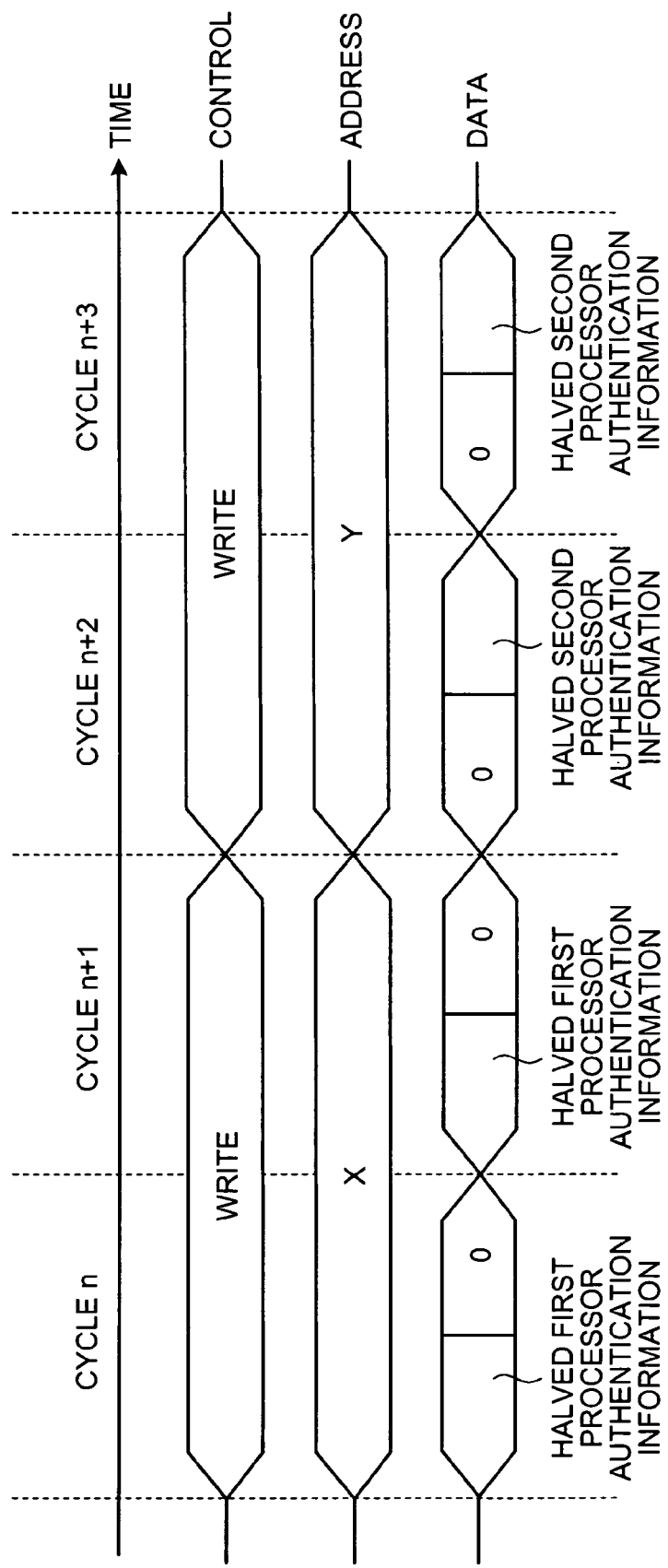
FIG. 22 is a schematic diagram showing how the activation suspension controlling unit transfers the processor authentication information according to the third embodiment.

FIG. 22 schematically shows how the bus 340 is used when the activation suspension controlling unit 314 transfers the first processor authentication information to the first activation suspension controlling unit 324a and transfers the second processor authentication information to the second activation suspension controlling unit 324b in the computer system 300 of the third embodiment.

The activation suspension controlling unit 314 allocates X and the writing instruction (WRITE) respectively as the address signal and the control signal over the cycle n to the cycle n+1, and allocates the N-bit data including the halved section of the first processor authentication information "KEY1" in the upper N/2-bit as the data signal for each of the cycles n and n+1. Thus, the activation suspension controlling unit 314 realizes the transmission of the first processor authentication information "KEY1" to the first activation suspension controlling unit 324a.

Further, the activation suspension controlling unit 314 allocates Y and the writing instruction (WRITE) respectively as the address signal and the control signal over the cycle n+2 to the cycle n+3, and allocates the N-bit data including the halved section of the second processor authentication information "KEY2" in the lower N/2-bit as the data signal for each of the cycles n+2 and n+3. Thus, the activation suspension controlling unit 314 realizes the transmission of the second processor authentication information "KEY2" to the second activation suspension controlling unit 324b.

Next, An authentication information exchanging process performed by the first memory 320a with the processor 310 in the computer system 300 of the third embodiment at the time the power supply resumes (step S3220) will be described. The authentication information exchanging process (step S3220) of the third embodiment is performed in place of the authentication information exchanging process (step S220) of the first embodiment described with reference to FIG. 4. Here, the process (step S3220) of the third embodiment will be described with reference to FIG. 15.

First, the first activation suspension controlling unit 324a performs the following process to receive the first processor authentication information "KEY1" transmitted from the activation suspension controlling unit 314. Specifically, the first activation suspension controlling unit 324a continues to receive data transmitted over the bus 340 until the amount of received data reaches the amount of the N-bit first processor authentication information "KEY1". Here, the first activation suspension controlling unit 324a can receive only N/2-bit data by one data transmission over the bus 340 (step S380).

Then, the first activation suspension controlling unit 324a decides that the first processor authentication information "KEY1" is transmitted in halved sections from the activation suspension controlling unit 314 (Yes in step S381) since the data length of the first processor authentication information "KEY1" is N-bit and the data width of the first memory 320a is N/2-bit. Then, the first activation suspension controlling unit 324a reconfigures the first processor authentication information "KEY1" from the received data (step S382), and stores the reconfigured first processor authentication information "KEY1" in the first authentication information storing unit 326a (step S383).

Then, it is decided whether the first memory authentication information can be transferred over the bus 340 by one data transmission or not based on the data length of the first memory authentication information and the connection information concerning the connection between the first memory 320a and the bus 340. In the third embodiment, the data length of the first memory authentication information is N-bit, and the data width of the first memory 320a is N/2-bit. Hence, it is decided that the first memory authentication information cannot be transferred over the bus 340 by one data transmission (No in step S384).

Then, the number of sections the first memory authentication information is to be divided into is calculated based on the data length (N-bit) of the first memory authentication information and the data width (N/2-bit) of the first memory 320a as two (step S390). Then, the first memory authentication information is divided into two sections (step S391). Each of the halved sections is transferred to the activation suspension controlling unit 314 by one data transmission (step S393).

The second memory 320b performs the similar process to the processor 310. The authentication information exchanging process (step S3230) by the second memory 320b with the processor 310 is similar to the authentication information exchanging process (Step S3220) by the first memory 320a with the processor 310 in the third embodiment.

Figure 23:
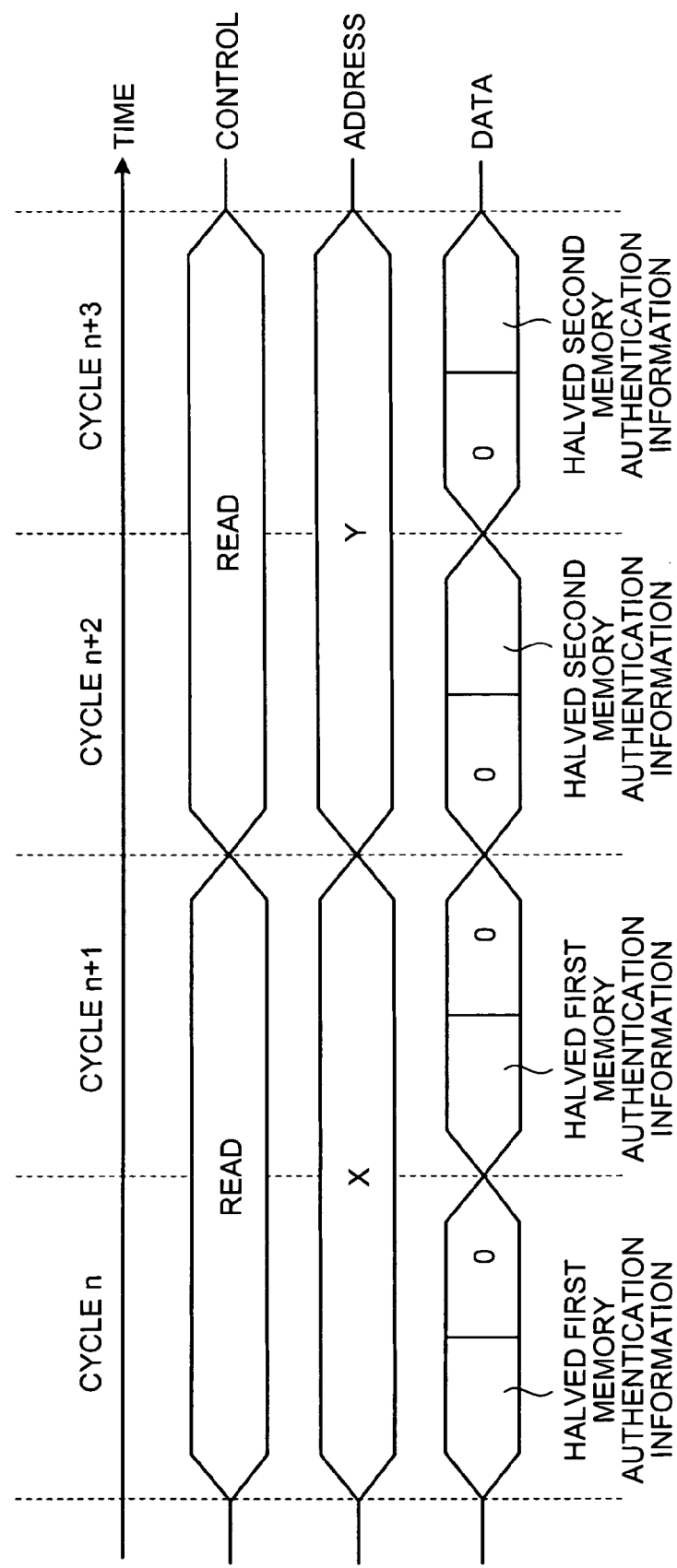
FIG. 23 is a schematic diagram showing how the memory authentication information is transferred.

FIG. 23 schematically shows how the bus 340 is used when the first memory authentication information is transferred from the first activation suspension controlling unit 324a to the activation suspension controlling unit 314 and the second memory authentication information is transferred from the second activation suspension controlling unit 324b to the activation suspension controlling unit 314.

The activation suspension controlling unit 314 allocates X and the reading instruction (READ) respectively as the address signal and the control signal over the cycle n to the cycle n+1. Accordingly, the first activation suspension controlling unit 324a transfers two pieces of the N-bit data each including halved section of the first memory authentication information in the upper N/2-bit over the cycle n and n+1. Further, the activation suspension controlling unit 314 allocates Y and the reading instruction (READ) respectively as the address signal and the control signal over the cycle n+2 to the cycle n+3. Accordingly, the second activation suspension controlling unit 324b transfers two pieces of the N-bit data each including the halved section of the N/2-bit second memory authentication information over the cycles n+2 and n+3.

The configuration and the process of the computer system 300 of the third embodiment are the same as those of the computer system 200 of the second embodiment, if not specified otherwise above.

Figure 24:
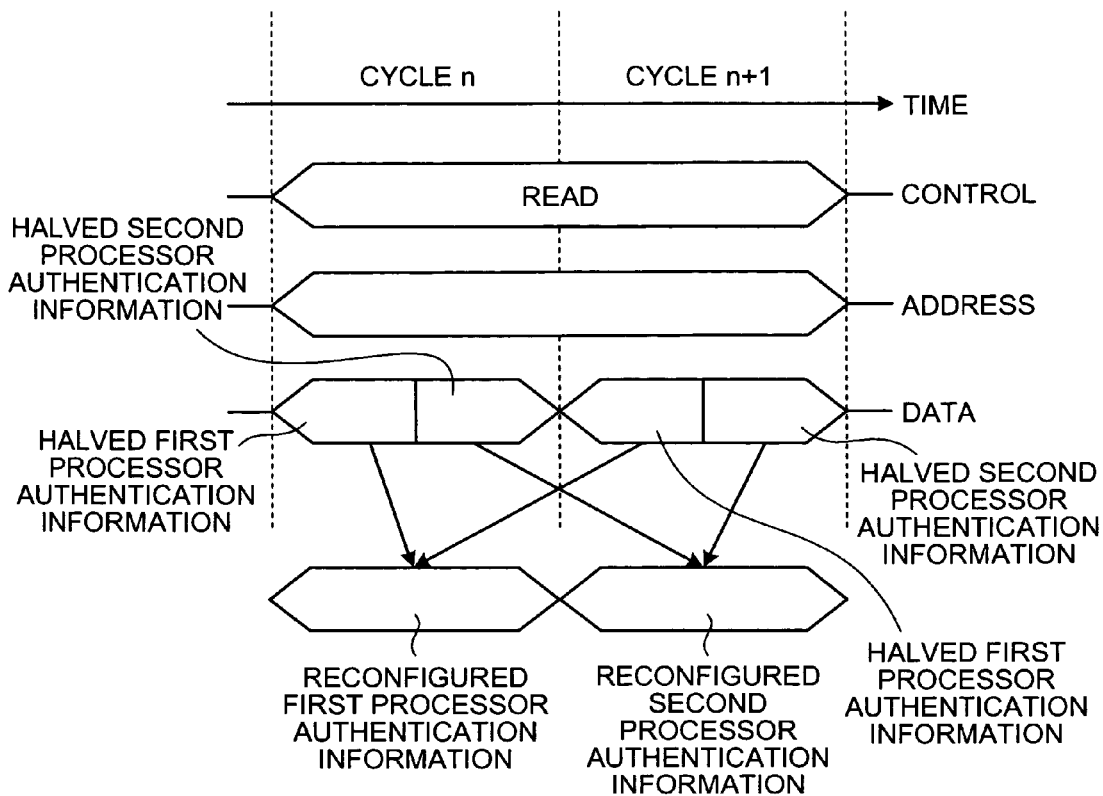
FIG. 24 is a schematic diagram showing how the processor authentication information is transferred according to a first modification of the third embodiment.

FIG. 24 schematically shows how the bus 340 is used when the first processor authentication information "KEY1" is transferred from the first activation suspension controlling unit 324a to the activation suspension controlling unit 314, and the second processor authentication information "KEY2" from the second activation suspension controlling unit 324b to the activation suspension controlling unit 314 in a computer system according to a first modification of the third embodiment. In FIG. 24, the second processor authentication information "KEY2" is placed in the lower N/2-bit, i.e., in the data lines that are not employed in the bus 340 in the state described with reference to FIG. 21 according to the third embodiment.

The reading instruction (READ) is given as the control signal over the cycle n to the cycle n+1. The first processor authentication information "KEY1" transferred from the first activation suspension controlling unit 324a is placed in the upper N/2 portion of the N-bit data, and the second processor authentication information "KEY2" transferred form the second activation suspension controlling unit 324b is placed in the lower N/2-bit portion of the N-bit data.

Thus, even when the first processor authentication information "KEY1" and the second processor authentication information "KEY2" are placed respectively in the upper N/2-bit and the lower N/2-bit of the N-bit data, the activation suspension controlling unit 314 can identify which part of the N-bit data is transferred from the first memory 320a and which part of the N-bit data is transferred from the second memory 320b based on the connection information stored in the processor-side authentication information storage table 317. Therefore, the activation suspension controlling unit 314 can correctly extract and acquire the first processor authentication information and the second processor authentication information. Thus, the bus can be more efficiently utilized and the number of cycles required for the exchange of the first and the second processor authentication information "KEY1" and "KEY2" can be reduced.

In the authentication information exchange, the processor authentication information storing position information stored in the processor-side authentication information storage table 317 can be used as an address.

Alternatively, specific addresses may be provided for the access to the first memory 320a and the second memory 320b. The address can be any information with any content as far as the information can makes the first memory 320a and the second memory 320b recognize that the intended operation is the authentication information exchanging process, and the information is not limited by the third embodiment.

Figure 25:
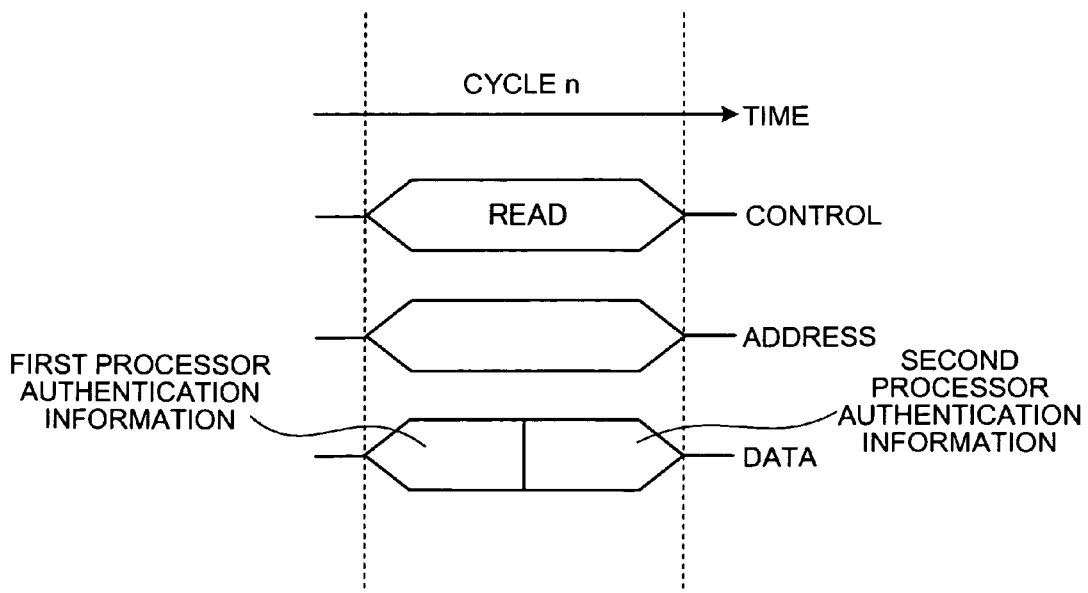
FIG. 25 is a schematic diagram showing how the processor authentication information is transferred according to a second modification of the third embodiment.

FIG. 25 shows how the bus 340 is used when the first processor authentication information "KEY1" is transferred from the first activation suspension controlling unit 324a to the activation suspension controlling unit 314 and the second processor authentication information "KEY2" is transferred from the second activation suspension controlling unit 324b to the activation suspension controlling unit 314 in a computer system according to a second modification of the third embodiment. Similarly to the first modification, the first and the second processor authentication information "KEY1" and "KEY2" are arranged in the data lines not employed in the third embodiment. It should be noted, however, that the data length of the first and the second processor authentication information "KEY1" and "KEY2" are both N/2-bit.

As shown in FIG. 25, the activation suspension controlling unit 314 allocates the reading instruction (READ) as the control signal in the cycle n. In the data of the cycle n, the first processor authentication information "KEY1" from the first activation suspension controlling unit 324a is allocated in the upper N/2-bit portion of the N-bit, and the second processor authentication information "KEY2" from the second activation suspension controlling unit 324b is allocated in the lower N/2-bit portion of the N-bit. Since the data length of each of the first processor authentication information "KEY1" and the second processor authentication information "KEY2" is N/2-bit, the data transmission completes only by one cycle dissimilar to FIG. 24, whereby the number of cycles required for the authentication information exchange can be further reduced.

Here, alternatively, the activation suspension controlling unit 314 may treat two N/2-bit data, i.e., the processor authentication information "KEY1" and "KEY2" as one piece of N-bit processor authentication information. When the first processor authentication information and the second processor authentication information respectively generated by the first and the second memories 320a and 320b are handled as one piece of the processor authentication information, a dividing process or a reconfiguring process of the processor authentication information can be made unnecessary at the time of sharing or exchange of the processor authentication information.

Still alternatively, the activation suspension controlling unit 314 may treat the first and the second memories 320a and 320b collectively as one memory according to a third modification of the third embodiment. In this case, the number of memory authentication information generated by the memory authentication information generating unit 315 becomes one.

Figure 26:
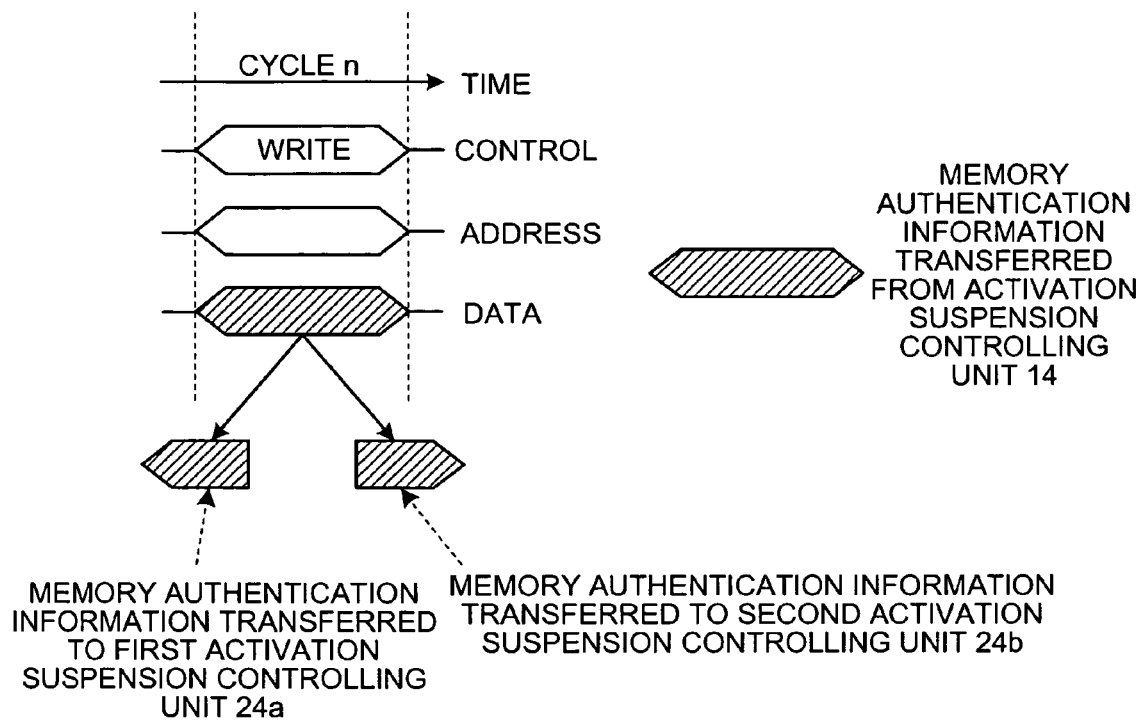
FIG. 26 is a schematic diagram showing how the memory authentication information is transferred through the bus when power supply is suspended according to a third modification of the third embodiment.

FIG. 26 schematically shows how the bus 340 is used when the memory authentication information is transferred from the activation suspension controlling unit 314 to the first activation suspension controlling unit 324a and to the second activation suspension controlling unit 324b at the time of the power supply suspension in the computer system according to the third modification of the third embodiment.

The activation suspension controlling unit 314 recognizes that there is only one memory mounted on the computer system. Hence, the activation suspension controlling unit 314 transfers one piece of N-bit memory authentication information, and the first activation suspension controlling unit 324a and the second activation suspension controlling unit 324b receive the upper N/2-bit and the lower N/2-bit, respectively. The first activation suspension controlling unit 324a and the second activation suspension controlling unit 324b store the received N/2-bit information as the first memory authentication information and the second memory authentication information in the first authentication information storing unit 326a and the second authentication information storing unit 326b.

Figure 27:
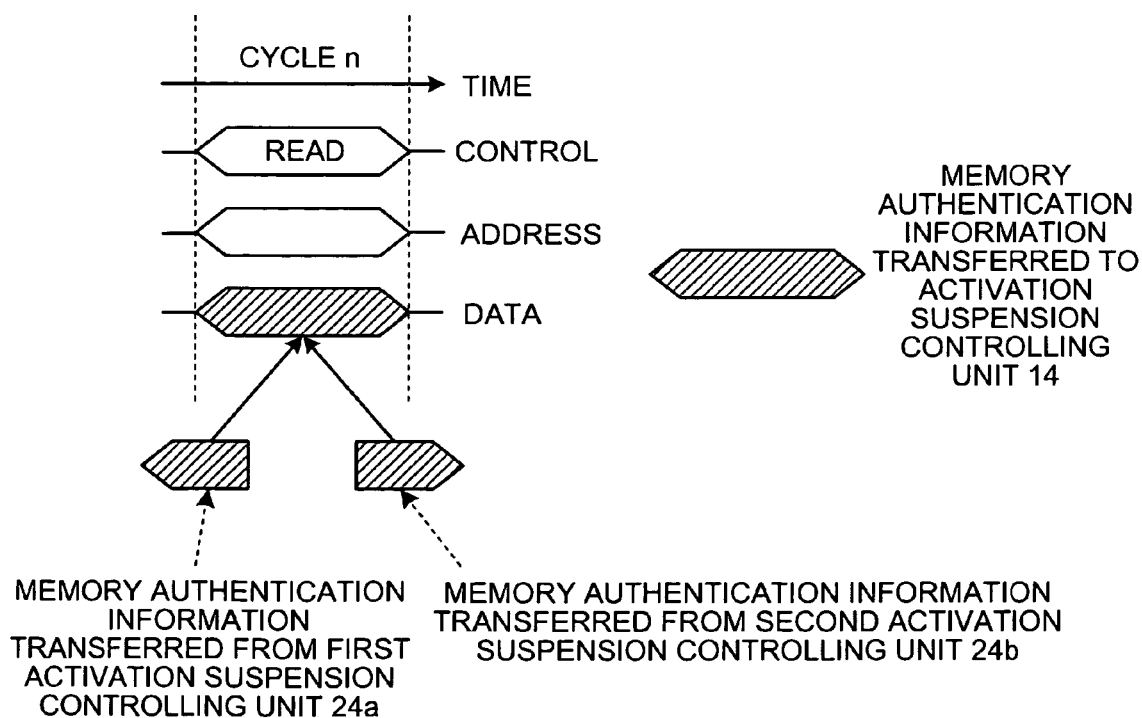
FIG. 27 is a schematic diagram showing how the memory authentication information is transferred through the bus when the power supply resumes according to the third modification of the third embodiment.

When the power supply resumes, each of the first activation suspension controlling unit 324a and the second activation suspension controlling unit 324b transfers N/2-bit data, and in total, N-bit memory authentication information is transferred to the activation suspension controlling unit 314 as shown in FIG. 27.

Since the activation suspension controlling unit 314 treats the computer system as having only one memory, the activation suspension controlling unit 314 does not specifically distinguish the first memory 320a from the second memory 320b. Hence, the activation suspension controlling unit 314 can authenticate the first memory 320a and the second memory 320b based on whether the transferred N-bit memory authentication information matches with the memory authentication information stored in the authentication information storing unit 316. When two pieces of memory authentication information match with each other, the activation suspension controlling unit 314 decides that the authentications of the first memory 320a and the second memory 320b are successful, and permits the access to both the first memory 320a and the second memory 320b.

When two pieces of memory authentication information do not match with each other, the activation suspension controlling unit 314 decides that the authentications of the first memory 320a and the second memory 320b are not successful, and prohibits the access to the first and the second memories 320a and 320b.

Thus, the activation suspension controlling unit 314 can authenticate both the first memory 320a and the second memory 320b by only one piece of N-bit memory authentication information generated by the memory authentication information generating unit 315 by treating the first memory 320a and the second memory 320b as one memory. Through such processing, while the authentication is properly performed, the number of cycles required for the authentication information sharing process can be reduced and the process load of the authenticating process can be reduced.

In the second modification and the third modification, similarly to the first modification, the processor authentication information storing position information stored in the processor-side authentication information storage table 317 can be employed as an address at the authentication information exchange. Alternatively, a special dedicated address may be employed for the access to the first memory 320a and the second memory 320b. Any information which can indicate to the first memory 320a and the second memory 320b that the intended operation is the authentication information exchanging process can be employed as the address and the content thereof is not limited by the embodiments.

The first memory 320a and the second memory 320b are connected to the bus 340 by N/2 data lines in the third embodiment, however, the number of data lines connecting each of the memories 320a and 320b to the bus 340 is not limited thereto as a fourth modification. When the number of data lines connecting the first memory 320a and the bus 340 is represented as j, and the number of data lines connecting the second memory 320b and the bus 340 is represented as k, it may be sufficient if the following expression (1) is satisfied. The connection information is determined based on the values of j and k.

$$j<N$$

$$k<N$$

$$j+k \leq N \quad (1)$$

When the computer system includes three or more memories, it may be sufficient if the total number of data lines connected to memories is equal to the number N of the data lines of the bus. In this case, the number of the data lines connected to each memory can take any value.

In the authentication information sharing process (step S3114) of the present embodiment, it is decided whether the authentication information to be transferred is to be divided or not in step S301 and it is decided whether the authentication information is transferred in plural divided sections in step S321 as described with reference to FIG. 9.

As a fifth modification, however, when it is already known that the authentication information is transferred in plural divided sections based on the connecting states among the bus 340, the processor 310, the first memory 320a, and the second memory 320b at the time the system is manufactured as in the present embodiment, the decisions in steps S301 and S321 do not need to be performed. In this case, the process proceeds directly from step S300 to step S310, and from step 320 to step 322.

Similarly, in the authentication information sharing process (step S3124), it is decided whether the authentication information is to be divided, and is transferred in a divided form respectively in steps S331 and S334 as described with reference to FIG. 11. Instead, the process may proceeds directly from step S330 to step S332, and from step S333 to step S340.

Similarly in the authentication information exchanging process (step S3210), as described with reference to FIG. 13, the process step S351 and step S371 may be eliminated, so that the process proceeds directly from step S350 to step S360, and from step S370 to step S372.

Similarly in the authentication information exchanging process (step S3220), as described with reference to FIG. 15, the process step S381 and step S384 may be eliminated, so that the process proceeds directly from step S380 to step S382, and from step S383 to step S390.

Figure 28:
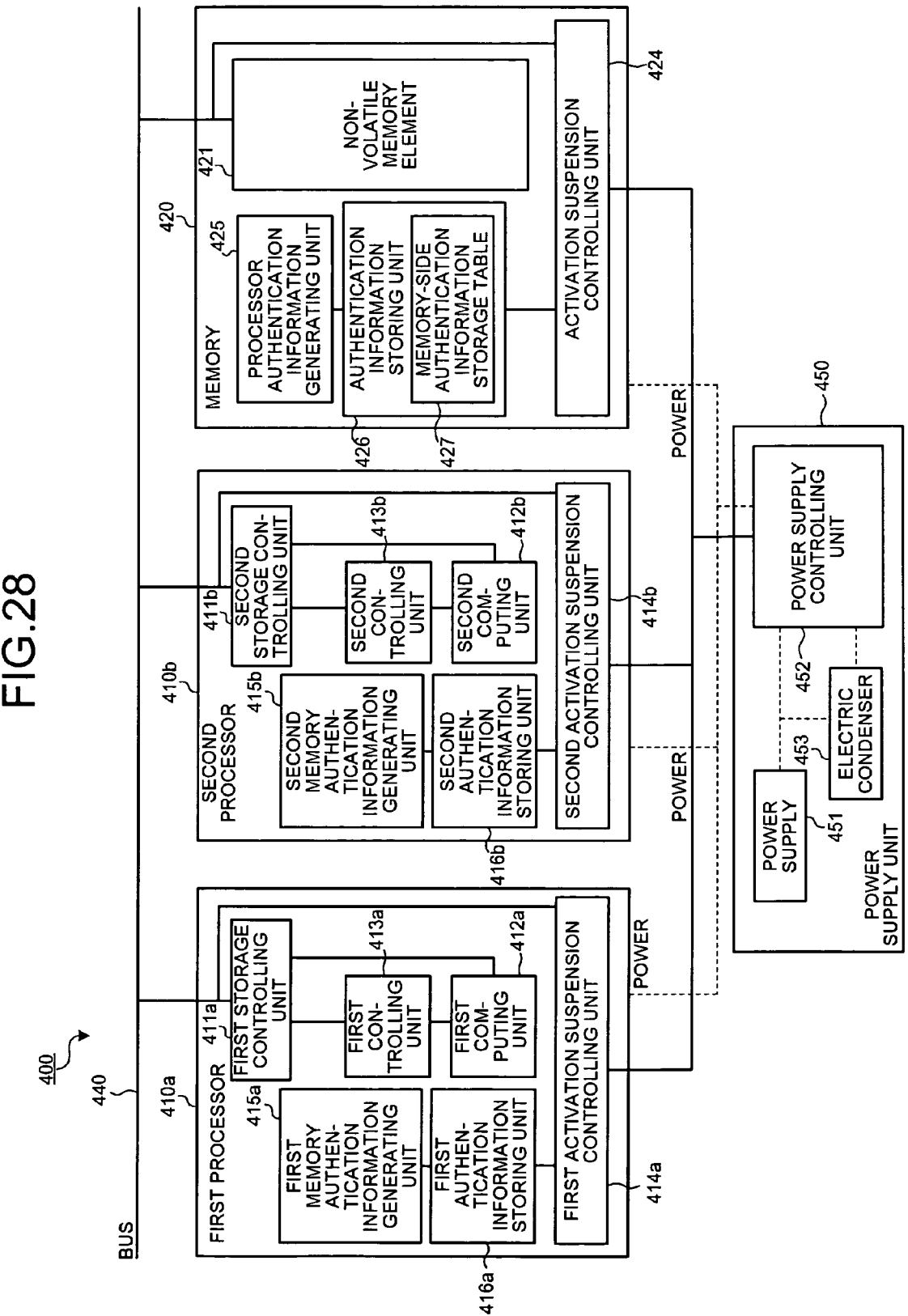
FIG. 28 is a block diagram of an overall configuration of a computer system according to a fourth embodiment.

FIG. 28 is a block diagram of an overall configuration of a computer system 400 according to a fourth embodiment. The computer system 400 according to the fourth embodiment includes plural processors. Specifically, the computer system 400 according to the fourth embodiment includes a first processor 410a, a second processor 410b, a memory 420, a power supply unit 450, and a bus 440. The first processor 410a includes a first storage controlling unit 411a, a first computing unit 412a, a first controlling unit 413a, a first activation suspension controlling unit 414a, a first memory authentication information generating unit 415a, and a first authentication information storing unit 416a. The second processor 410b includes a second storage controlling unit 411b, a second computing unit 412b, a second controlling unit 413b, a second activation suspension controlling unit 414b, a second memory authentication information generating unit 415b, and a second authentication information storing unit 416b. The memory 420a has a non-volatile memory element 421, an activation suspension controlling unit 424, a processor authentication information generating unit 425, and an authentication information storing unit 426 which has a memory-side authentication information storage table 427. The power supply unit 450 has a power supply 451, a power supply controlling unit 452, and an electric condenser 453.

Each of the first processor 410a and the second processor 410b performs authentication with the memory 420. In other words, the first processor 410a and the second processor 410b perform authentication only with the memory 420. Hence, the first processor 410a and the second processor 410b do not need to have the processor-side authentication information storage table.

On the other hand, the memory 420 performs authentication with both the first processor 410a and the second processor 410b. Hence, the authentication information storing unit 426 of the memory 420 has the memory-side authentication information storage table 427. With the use of the memory-side authentication information storage table 427, the first memory authentication information generated by the first processor can be distinguished from the second memory authentication information generated by the second processor 410b. Further, the first processor authentication information for the authentication of the first processor 410a can be distinguished from the second processor authentication information for the authentication of the second processor 410b.

FIG. 29 schematically shows a data structure of the memory-side authentication information storage table 427. In the memory-side authentication information storage table 427, processor identifiers "PROCESSOR01" and "PROCESSOR02" for the identification of the processors, the first memory authentication information "KEY11" and the second memory authentication information "KEY12" generated by the respective processors 410a and 410b, and the first processor authentication information "KEY13" and the second processor authentication information "KEY14" generated by the processor authentication information generating unit 425 are stored in association with each other.

The processor identifier is a content of a signal employed for the identification of each of the processors 410a and 410b on the computer system 400. The processor identifier is, for example, a combination of a manufacturer's name and a production number of the processor.

Instead of storing the memory authentication information itself in the memory-side authentication information storage table 427, information for identifying the storing position of the memory authentication information may be stored. Similarly, instead of storing the processor authentication information itself in the memory-side authentication information storage table 427, information for identifying the storing position of the processor authentication information may be stored.

Of information stored in the memory-side authentication information storage table 427, contents other than the memory authentication information and the processor authentication information can be set after the initial activation of the computer system 400 through system configuration check.

It is preferable, however, to previously set the contents at the system manufacture or the shipment so as to prevent later rewriting, in view of security, i.e., for the prevention of rewriting by illegal accesses, for example. Further, similarly to the memory authentication information and the processor authentication information, the memory-side authentication information storage table 427 is preferably stored in a non-volatile memory.

When the bus is shared by plural units, as in the case of the bus 440 of the computer system 400 of the fourth embodiment, information indicating which unit is currently using the bus is generally transmitted (hereinafter such information is referred to as "bus master information"). For example, when the first processor 410a attempts to read out the content of the memory 420 over the bus 440, information having a content that "the first processor 410a is using" is transmitted over the bus 440. The activation suspension controlling unit 424 identifies which of the processors 410a and 410b is seeking the authentication information exchange based on the bus master information at the authentication information exchange.

Further, on receiving the instruction for authentication information exchange, the memory 420 can identify which of the first processor 410a and the second processor 410b is the sender of the instruction by referring to the bus master information.

Figure 30:
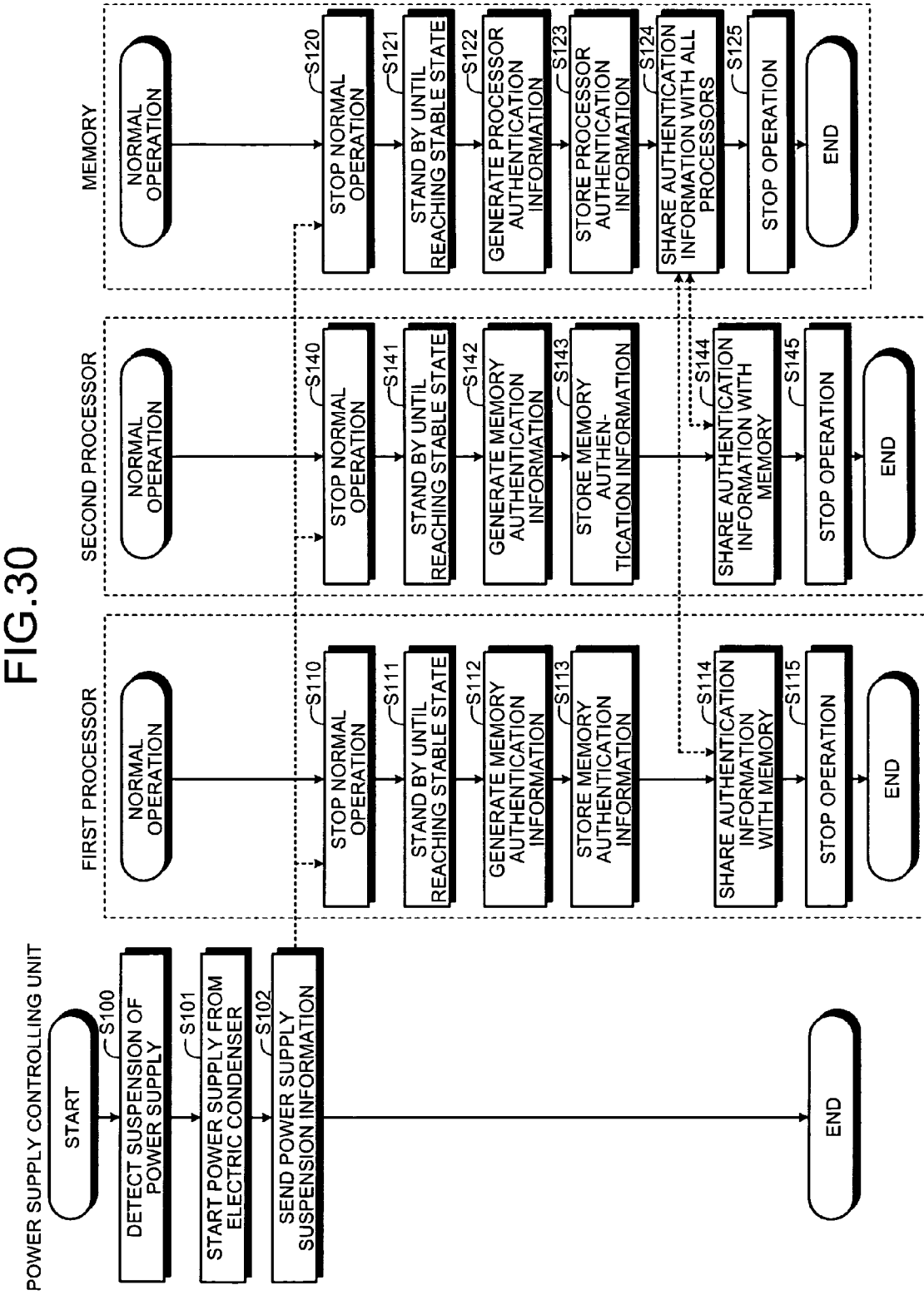
FIG. 30 is a flowchart of a suspending process which is executed in the computer system according to the fourth embodiment when the power supply is suspended.

FIG. 30 is a flowchart of a suspending process which is executed in the computer system 400 of the fourth embodiment when the power supply stops. In FIG. 30, the same reference characters as those in FIG. 3 indicate the same process steps. The power supply controlling unit 452 of the power supply unit 450 detects that the power supply stops (step S100), and starts the power supply from the electric condenser 453 to the first processor 410a, the second processor 410b, and the memory 420 (Step S101). Then, the power supply controlling unit 452 sends the power supply suspension information to the first activation suspension controlling unit 414a, the second activation suspension controlling unit 414b, and the activation suspension controlling unit 424 (step S102).

On receiving the power supply suspension information from the electric condenser 453, the first processor 410a stops the normal operation which is under way when the power supply suspension information is received (step S110). The process from step S111 to step S113 is performed in the same manner as in the first embodiment described with reference to FIG. 3.

Similarly, on receiving the power supply suspension information from the electric condenser 453, the second processor 410b stops the normal operation which is under way when the power supply suspension information is received (step S140). The process from step S141 to step S143 is the same as the process from step S111 to step S113 of the first processor 410a.

On the other hand, on receiving the power supply suspension information from the power supply controlling unit 452 of the power supply unit 450, the memory 420 stops the normal operation which is under way when the power supply suspension information is received (step S120). The memory 420 stands by until attaining a stable state, in other words, a state from which the normal operation can be resumed when the power is turned on again from the state at the time power supply suspension information is received (step S121).

Then, the processor authentication information generating unit 425 generates the first processor authentication information for the authentication of the first processor 410a and the second processor authentication information for the authentication of the second processor 410b according to the instruction from the activation suspension controlling unit 424 (step S122). Then, the generated first processor authentication information and the second processor authentication information are stored in the memory-side authentication information storage table 427 of the authentication information storing unit 426 (step S123).

Specifically, the first processor authentication information is stored in the memory-side authentication information storage table 427 of the authentication information storing unit 426 in association with the processor identifier "PROCESSOR01" indicating the first processor 410a. In other words, the first processor authentication information is written into a processor authentication information column of the entry identified by the identifier "PROCESSOR01" of the first processor 410a. Further, the second processor authentication information is stored in the memory-side authentication information storage table 427 of the authentication information storing unit 426 in association with the processor identifier "PROCESSOR02" indicating the second processor 410b. In other words, the second processor authentication information is written into the processor authentication information column of the entry identified by the identifier "PROCESSOR02" of the second processor 410b.

Then, in steps S114 and S124, the first processor 410a and the memory 420 perform the authentication information sharing process. In steps S144 and S124, the second processor 410b and the memory 420 perform the authentication information sharing process.

Specifically, the first activation suspension controlling unit 414a sends the first memory authentication information "KEY11" generated by the first memory authentication information generating unit 415a to the activation suspension controlling unit 424 over the bus 440. The activation suspension controlling unit 424 sends the first memory authentication information "KEY11" red out from the first activation suspension controlling unit 414a to the authentication information storing unit 426 together with the processor identifier red out from the bus master information.

Then, in the authentication information storing unit 426, the first memory authentication information is written into and stored in the memory authentication information column of the entry identified by the processor identifier "PROCESSOR01" of the first processor 410a of the memory-side authentication information storage table 427. Further, the first activation suspension controlling unit 414a acquires the first processor authentication information from the activation suspension controlling unit 424 and stores the same in the first authentication information storing unit 416a.

Further, the second activation suspension controlling unit 414b sends the second memory authentication information "KEY12" generated by the second memory authentication information generating unit 415b to the activation suspension controlling unit 424 over the bus 440. The activation suspension controlling unit 424 sends the second memory authentication information "KEY12" red out from the second activation suspension controlling unit 414b to the authentication information storing unit 426 together with the processor identifier red out from the bus master information.

In the authentication information storing unit 426, the second memory authentication information is written into and stored in the memory authentication information column of the entry identified by the processor identifier "PROCESSOR02" of the second processor 410b in the memory-side authentication information storage table 427. Further, the second activation suspension controlling unit 414b acquires the second processor authentication information from the activation suspension controlling unit 424 to store the same in the second authentication information storing unit 416b. Then, the memory 420, the first processor 410a, and the second processor 410b stop the operation (steps S115, S145, S125).

Figure 31:
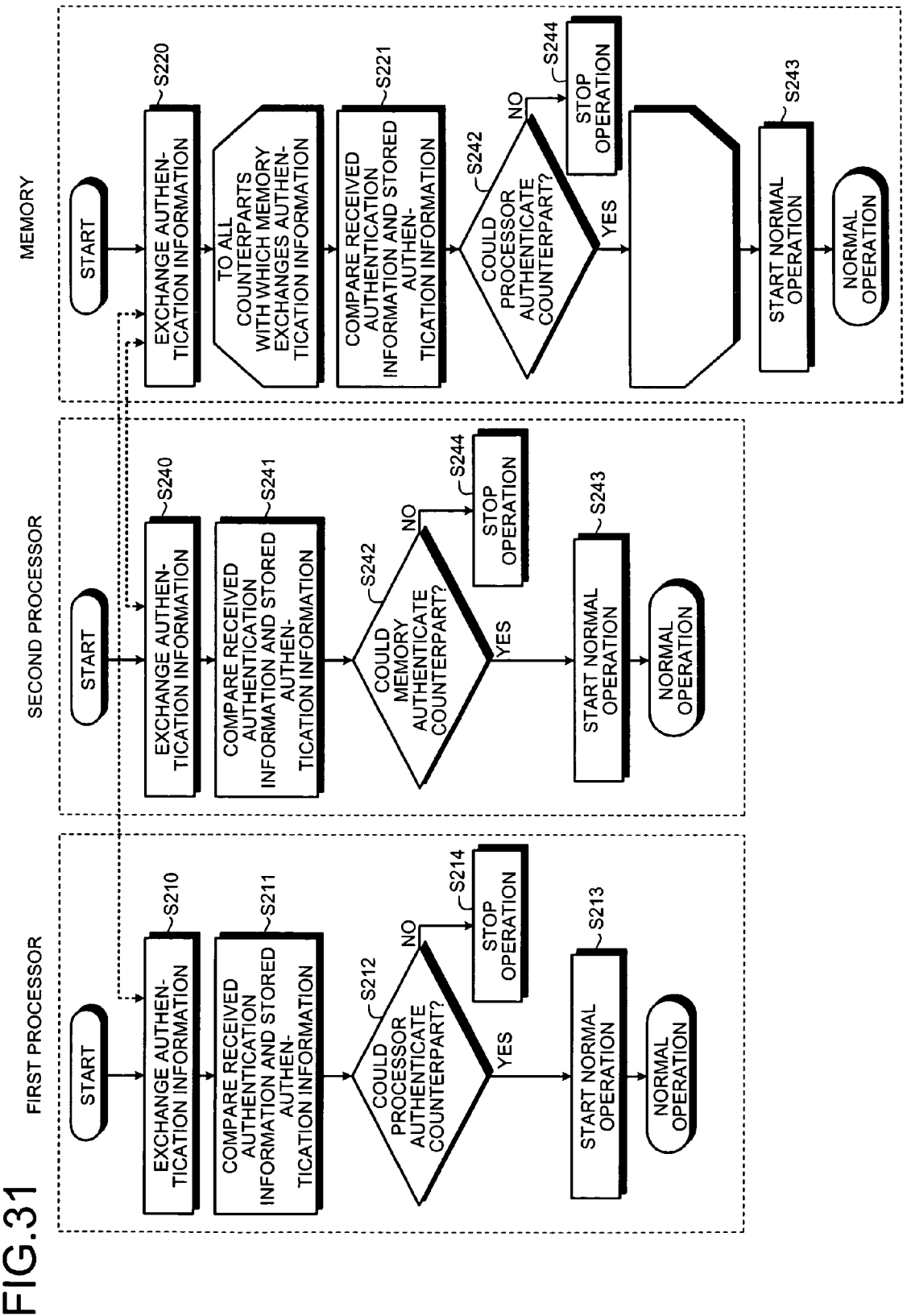
FIG. 31 is a flowchart of an authenticating process according to the fourth embodiment when the power supply resumes after the suspension of the power supply.

FIG. 31 is a flowchart of an authenticating process to be performed when the power supply resumes after the power supply suspension in the computer system 400 according to the fourth embodiment. When the power supply resumes, the first processor 410a exchanges the first memory authentication information "KEY11" and the first processor authentication information "KEY13" shared with the memory 420 in the power supply suspending process over the bus 440 (steps S4210, S4220).

Similarly, the second processor 410b, when the power supply resumes, exchanges the second memory authentication information "KEY12" and the second processor authentication information "KEY14" shared with the memory 420 at the power supply suspending process over the bus 440 (steps S4240 and S4220).

The memory authentication information "KEY11" and "KEY12" are exchanged specifically in the following manner. The first activation suspension controlling unit 414a sends the reading instruction (READ) as the control signal to the activation suspension controlling unit 424. Similarly, the second activation suspension controlling unit 414b sends the reading instruction (READ) as the control signal to the activation suspension controlling unit 424.

Then, the activation suspension controlling unit 424 checks the bus master information on the bus 440 to identify from which of the first processor 410a and the second processor 410b the instruction is sent. Then, the activation suspension controlling unit 424 sends the memory authentication information "KEY11" and "KEY12" stored in the memory authentication information storage table 427 to the respective processors 410a and 410b over the bus 440.

The processor authentication information "KEY13" and "KEY14" are exchanged specifically in the following manner. The first activation suspension controlling unit 414a and the second activation suspension controlling unit 414b send the writing instruction (WRITE) as the control signal over the bus 440, and send the first processor authentication information and the second processor authentication information, respectively, as the data signal.

The activation suspension controlling unit 424 identifies which of the first processor 410a and the second processor 410b sends the processor authentication information based on the bus master information of the bus 440 and acquires the processor authentication information. Here, the memory authentication information and the processor authentication information are desirably transferred by a secure communication means such as encryption.

Then, the first activation suspension controlling unit 414a compares the memory authentication information "KEY11" received from the activation suspension controlling unit 424 and the memory authentication information "KEY11" generated by the first memory authentication information generating unit 415a and stored in the first authentication information storing unit 416a (step S211). When two pieces of memory authentication information "KEY11" match with each other, in other words, when the authentication of the memory 420 is successful (Yes in step S212), the first activation suspension controlling unit 414a resumes the normal operation (step S213).

On the other hand, when the two pieces of the memory authentication information "KEY11" do not match with each other in step S212, in other words, when the authentication of the memory is not successful (No in step S212), the operation stops (step S214).

The process from step S241 to S244 of the second activation suspension controlling unit 414b in the computer system 400 of the fourth embodiment is the same as the process from step S211 to step S214 of the first activation suspension controlling unit 414a of the computer system 400 of the fourth embodiment.

On the other hand, on finishing the exchanges of the authentication information, the activation suspension controlling unit 424 performs authentication of all processors with which the activation suspension controlling unit 424 exchanges the authentication information, i.e., the first processor 410a and the second processor 410b. Specifically, first, the activation suspension controlling unit 424 compares the first processor authentication information and the second authentication information transferred from the first processor 410a and the second processor 410b with the first processor authentication information and the second authentication information generated by the processor authentication information generating unit 425 and stored in the authentication information storing unit 427 of the authentication information storing unit 426 (step S221).

When two pieces of processor authentication information match with each other for each of the first processor 410a and the second processor 410b, in other words, the authentication of the processors are successful (Yes in step S222), the process returns to step S221, and the process following step S221 is performed for the remaining processor. When the authentication is successfully finished for all the processors, the process proceeds to step S223, and the normal operation starts.

On the other hand, when authentication is not successful for one of the processors (No in step S222), the operation stops (step S224). Thus, the authenticating process performed at the resumption of the power supply finishes.

In the computer system 400 of the fourth embodiment only one memory is provided. In a first modification of the fourth embodiment, a computer system may include plural memories. More specifically, the computer system may include plural processors and plural memories. In this case the authenticating process is performed between each of the plural processors and each of the plural memories.

In the computer system 400 of the fourth embodiment, the memory 420 starts the normal operation only when the authentication of all the processors is successful. In a second modification, however, the memory 420 may start the normal operation when at least one of the processors in the computer system is successfully authenticated.

In such case, however, it is preferable that the processor whose authentication fails cannot access the memory 420 for security, e.g., for the prevention of the illegal access. Thus, even when one of the processors in the computer system is illegally accessed, the system can use the processor which is not illegally accessed to continue the operation.

In the computer system 400 of the fourth embodiment, the first processor authentication information generated by the processor authentication information generating unit 425 is shared with the first processor 410a, and the second processor authentication information generated by the processor authentication information generating unit 425 is shared with the second processor 410b, and the memory 420 performs authentication of the first processor 410a and the second processor 410b based on the first processor authentication information and the second processor authentication information. In a third modification, however, the memory 420 may use same processor authentication information for the authentication of both the first processor 410*a* and the second processor 410*b*.

In this case, during the suspension of power supply, the memory authentication information generating unit 425 in the memory 420 generates one piece of the processor authentication information for the authentication of the first processor 410*a* and the second processor 410*b* according to the instruction from the activation suspension controlling unit 424, and stores the same in the memory-side authentication information storage table 427 of the authentication information storing unit 426. In other words, the processor authentication information "KEY13" stored in the processor authentication information column of the entry associated with the identifier "PROCESSOR01" of the first processor 410*a* in the memory-side authentication information storage table 427 has the same content as the processor authentication information "KEY14" stored in the processor authentication information column of the entry associated with the identifier "PROCESSOR02" of the second processor 410*b*. Then, the processor authentication information is transferred to the first and the second activation suspension controlling units 414*a* and 414*b*.

Thus, since the same processor authentication information is employed for the authentication of all processors, even when the number of the incorporated processors increases, illegal access can be prevented. At the same time, the number of the pieces of the processor authentication information to be generated can be reduced and the time required for the processor authentication information generation can be shortened. Further, when the authentication information storage table 427 is configured so that the processor authentication information column stores only the information indicating the storing position of the memory authentication information, the processor authentication information of all the entries of all the processors indicate the same storing position, whereby the storing area required for the storage of the processor authentication information can be reduced.

In the present embodiment, since it is not necessary to distinguish the processor authentication information for one processor from the processor authentication information for another processor, instead of storing the same processor authentication information in association with each of the identifier "PROCESSOR01" of the first processor 410*a* and the identifier "PROCESSOR02" of the second processor 410*b* as described above, it may be possible to store only one piece of the processor authentication information.

In the first to the third embodiments, the computer system which includes one processor and plural memories is described. It should be obvious, however, that the computer system of the first to the third embodiments can be applied to the computer system of the fourth embodiment which includes one memory and plural processors by treating the processor in the first to the third embodiments as the memory and vice versa.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A processor communicating with a first memory configured to store first information and first data, and communicating with a second memory configured to store second information and second data, comprising:
    a computing unit configured to perform computation using the first data and the second data;
    a generating unit configured to, when power supply suspension information is sent, generate first authentication information and second authentication information, send the first authentication information to the first memory, and send the second authentication information to the second memory;
    a first storing unit configured integrally with the computing unit to store the first authentication information and the second authentication information generated by the generating unit;
    a reading unit configured to read out the first information from the first memory and the second information from the second memory when the power supply resumes, the first information representing the first authentication information received by the first memory from the generating unit before the power supply stops, and the second information representing the second authentication information received by the second memory from the generating unit before the power supply stops;
    an authenticating unit configured to authenticate the first memory by comparing the first information and the first authentication information stored in the first storing unit, and to authenticate the second memory by comparing the second information and the second authentication information stored in the first storing unit, when the power supply resumes; and
    a controlling unit configured to control an access of the computing unit to the first memory and the second memory based on a result of the authentications.

2. The processor according to claim 1, wherein the first authentication information is identical to the second authentication information.

3. The processor according to claim 1, wherein the first authentication information is different from the second authentication information.

4. The processor according to claim 1, wherein the processor is connected to N data lines, j data lines (where j<N) among the N data lines are connected to the first memory, k data lines (where k<N, k≦N−j) among the N data lines are connected to the second memory, the processor further comprising:
    a second storing unit configured to store first connection information for identification of the j data lines in association with first memory identification information for identification of the first memory, and to store second connection information for identification of the k data lines in association with second memory identification information for identification of the second memory;
    wherein the reading unit reads out the first information over the j data lines as the first information from the first memory based on the first connection information associated with the first memory identification information in the second storing unit, and the second information over the k data lines as the second information from the second memory based on the second connection information associated with the second memory identification information in the second storing unit.

5. The processor according to claim 4, wherein
    the first information is m-bit in data length (where m<N), and the second information is n-bit in data length (where n<N, n≦N−m), and the reading unit reads out the first information over m data lines, and the second information over n data lines in a single identical cycle.

6. The processor according to claim 1, wherein the access controlling unit permits an access to the first memory when the authenticating unit successfully authenticates the first memory.

7. The processor according to claim 1, wherein the access controlling unit permits an access to the second memory when the authenticating unit successfully authenticates the second memory.

8. The processor according to claim 1, wherein the access controlling unit permits an access to the first memory and to the second memory when the memory authenticating unit successfully authenticates the first memory and the second memory.

9. A memory communicating with a first processor configured to store first information and a second processor configured to store second information, comprising:
   a memory element configured to store information utilized by the first processor and the second processor;
   a generating unit configured to, when power supply suspension information is sent, generate first authentication information and second authentication, send the first authentication information to the first processor, and send the second authentication information to the second processor;
   a storing unit configured integrally with the memory element, to store the first authentication information and the second authentication information generated by the generating unit;
   a reading unit configured to read out the first information from the first processor and to read out the second information from the second processor when the power supply resumes, the first information representing the first authentication information received by the first processor from the generating unit before the power supply stops, and the second information representing the second authentication information received by the second processor from the generating unit before the power supply stops;
   an authenticating unit configured to authenticate the first processor by comparing the first information and the first authentication information stored in the storing unit, and to authenticate the second processor by comparing the second information and the second authentication information stored in the storing unit; and
   a controlling unit configured to control an access from the first processor and the second processor based on a result of authentication by the processor authenticating unit.

10. The memory according to claim 9, wherein the first authentication information is identical to the second authentication information.

11. The memory according to claim 9, wherein the first authentication information is different from the second authentication information.

12. The memory according to claim 9, wherein the controlling unit permits an access from the first processor when the authenticating unit successfully authenticates the first processor.

13. The memory according to claim 9, wherein the controlling unit permits an access from the second processor when the authenticating unit successfully authenticates the second processor.

14. The memory according to claim 9, wherein the controlling unit permits an access from the first processor and from the second processor when the authenticating unit successfully authenticates the first processor and the second processor.

15. A computer system comprising:
a processor;
a first memory configured to store information used by the processor; and
a second memory configured to store information used by the processor, wherein the first memory includes
   a first memory element configured to store the information used by the processor, and
   a first storing unit configured integrally with the first memory element to store first information;
the second memory includes
   a second memory element configured to store the information used by the processor, and
   a second storing unit configured integrally with the second memory element to store second information; and
the processor includes
   a computing unit configured to perform computation using the information stored in the first memory element and the second memory element,
   a generating unit configured to, when power supply suspension information is sent, generate first authentication information and second authentication information, send the first authentication information to the first memory, and send the second authentication information to the second memory,
   a third storing unit configured integrally with the computing unit to store the first authentication information generated by the generating unit and to store the second authentication information generated by the generating unit,
   a first reading unit configured to read out the first information from the first memory and the second information from the second memory when the power supply resumes, the first information representing the first authentication information received by the first memory from the generating unit before the power supply stops, and the second information representing the second authentication information received by the second memory from the generating unit before the power supply stops,
   a first authenticating unit configured to authenticate the first memory by comparing the first information and the first authentication information stored in the third storing unit and to authenticate the second memory by comparing the second information and the second authentication information stored in the third storing unit, and
   a first controlling unit configured to control an access to the first memory and the second memory based on a result of authentication by the memory authenticating unit.

16. The computer system according to claim 15, wherein the processor further includes
   a fourth storing unit configured integrally with the computing unit to store third information and fourth information,
the first memory further includes
   a fifth storing unit configured integrally with the first memory element to store third authentication information,
   a second reading unit configured to read out the third information, a second authenticating unit configured to authenticate the computing unit by comparing the third information and the third authentication information, and a second controlling unit configured to control an access to the first memory from the computing unit based on a result of authentication by the first processor authenticating unit, the second memory further includes a sixth storing unit configured integrally with the second memory element to store fourth authentication information, a third reading unit configured to read out the fourth information, a third authenticating unit configured to authenticate the computing unit by comparing the fourth information and the fourth authentication information, and a third access controlling unit configured to control an access to the second memory from the computing unit based on a result of authentication by the second processor authenticating unit.

17. The computer system according to claim 16, wherein the fourth storing unit of the processor stores the third information in association with first memory identification information for identification of the first memory, and stores the fourth information in association with second memory identification information for identification of the second memory, the second reading unit of the first memory reads out the third information stored in association with the first memory identification information in the fourth storing unit, and the third reading unit of the second memory reads out the fourth information stored in association with the second memory identification information in the fourth storing unit.

18. The computer system according to claim 17, wherein the processor is connected to N data lines, j data lines (where j<N) among the N data lines are connected to the first memory, k data lines (where k<N, k≦N−j) among the N data lines are connected to the second memory, the computer system further comprising:

a seventh storing unit configured to store first connection information for identification of the j data lines in association with the first memory identification information and to store second connection information for identification of the k data lines in association with the second memory identification information, and a transferring unit configured to transfer the third information to the j data lines associated with the first memory identification information in the connection information storing unit, and to transfer the fourth information to the k data lines associated with the second memory identification information in the connection information storing unit, wherein the second reading unit of the first memory reads out the third information transferred to the j data lines by the transferring unit, and the third reading unit of the second memory reads out the fourth information transferred to the k data lines by the transferring unit.

19. The computer system according claim 18, wherein the first information is m-bit in data length (where m<N), and the second information is n-bit in data length (where n<N, n≦N−m), and the first reading unit reads out the first information over the m data lines, and the second information over the n data lines in a single identical cycle.

20. A computer system comprising:
a first processor;
a second processor; and
a memory configured to store information used by the first processor and the second processor, wherein
the first processor includes
a first computing unit configured to perform computation using the information stored in the memory, and
a first storing unit configured integrally with the first computing unit to store first information;
the second processor includes
a second computing unit configured to perform computation using the information stored in the memory, and
a second storing unit configured integrally with the second computing unit to store second information; and
the memory includes
a memory element configured to store information used by the first processor and the second processor,
a generating unit configured to, when power supply suspension information is sent, generate first authentication information and second authentication information, send the first authentication information to the first processor, and send the second authentication information to the second processor;
a third storing unit configured integrally with the memory element to store the first authentication information and the second authentication information generated by the generating unit,
a first reading out unit configured to read out the first information from the first processor and the second information from the second processor when the power supply resumes, the first information representing the first authentication information received by the first processor from the generating unit before the power supply stops, and the second information representing the second authentication information received by the second processor from the generating unit before the power supply stops,
a first authenticating unit configured to authenticate the first processor by comparing the first information and the first authentication information stored in the third storing unit, and to authenticate the second processor by comparing the second information and the second authentication information stored in the third storing unit, and
a first access controlling unit configured to control an access from the first processor and the second processor based on a result of authentication by the processor authenticating unit.

21. The computer system according to claim 20, wherein the memory further includes:

a fourth storing unit configured integrally with the memory element to store third information and fourth information, the first processor further includes
a fifth storing unit configured integrally with the first computing unit to store third authentication information,
a second reading out unit configured to read out the third information,
a second authenticating unit configured to authenticate the memory by comparing the third information and the third authentication information,
a second controlling unit configured to control an access to the memory based on a result of authentication by the first memory authenticating unit, the second processor further includes
  a sixth storing unit configured integrally with the second computing unit to store fourth authentication information,
  a third reading unit configured to read out the fourth information,
  a third authenticating unit configured to authenticate the memory by comparing the fourth information and the fourth authentication information and
  a third access controlling unit configured to control an access to the memory based on a result of authentication by the second memory authenticating unit.

22. The computer system according to claim 21, wherein
the fourth storing unit of the memory stores the third information in association with first processor identification information for identification of the first processor, and stores the fourth information in association with second processor identification information for identification of the second processor,
the second reading unit of the first processor reads out the third information stored in association with the first processor identification information in the fourth storing unit,
the third reading unit of the second processor reads out the fourth information stored in association with the second processor identification information in the fourth storing unit.

23. A method of authentication, comprising:
generating first authentication information and second authentication when power supply suspension information is sent;
sending the first authentication information to a first non-volatile memory;
sending the second authentication information to a second non-volatile memory;
reading out first information from the first non-volatile memory, and second information from the second memory, when the power supply resumes, the first information representing the first authentication information received by the first non-volatile memory before the power supply stops, and the second information representing the second authentication information received by the second non-volatile memory before the power supply stops;
authenticating the first memory by comparing first authentication information stored in an authentication information storing unit with the first information read out from the first memory, and authenticating the second memory by comparing the second authentication information stored in the authentication information storing unit with the second information read out from the second memory, the authentication information storing unit being configured integrally with a computing unit to store the first authentication information and the second authentication information, the computing unit performing computation using information stored in the first memory and the second memory; and
controlling an access to the first and the second memories based on a result of authentication in the authenticating information storing unit.

24. A method of authentication, comprising:
generating first authentication information and second authentication when power supply suspension information is sent;
sending the first authentication information to a first processor;
sending the second authentication information to a second processor;
reading out first information for authentication of the first processor from the first processor, and second information for authentication of the second processor from the second processor, when the power supply resumes, the first information representing the first authentication information received by the first processor before the power supply stops, and the second information representing the second authentication information received by the second processor before the power supply stops;
authenticating the first processor by comparing the first authentication information stored by an authentication information storing unit with the first information read out from the first processor, and authenticating the second processor by comparing the second authentication information stored by the authentication information storing unit with the second information read out from the second processor, the authentication information storing unit being configured integrally with the memory element to store the first authentication information and the second authentication information, the memory element storing information used by the first processor and the second processor; and
controlling an access from the first processor and the second processor based on a result of authentication in the authenticating information storing unit.

* * * * *

UNITED STATES PATENT AND TRADEMARK OFFICE
CERTIFICATE OF CORRECTION

PATENT NO. : 8,060,925 B2
APPLICATION NO. : 11/508935
DATED : November 15, 2011
INVENTOR(S) : Yoshii et al.

It is certified that error appears in the above-identified patent and that said Letters Patent is hereby corrected as shown below:

Title page, Item 57, in the Abstract, line 6, change "an storing" to --a storing--.

Title page, Item 57, in the Abstract, line 14, change "an controlling" to --a controlling--.

Signed and Sealed this
Fourteenth Day of February, 2012

David J. Kappos
*Director of the United States Patent and Trademark Office*